United States Patent [19]

Kitagishi et al.

[11] Patent Number: 5,054,898
[45] Date of Patent: Oct. 8, 1991

[54] COMPACT HIGH-RANGE VARIFOCAL OBJECTIVES

[75] Inventors: Nozomu Kitagishi, Tokyo; Hiroki Nakayama; Jun Hattori, both of Kanagawa; Shigeyuki Suda; Akihisa Horiuchi, both of Tokyo, all of Japan

[73] Assignee: Canon Kabushiki Kaisha, Tokyo, Japan

[21] Appl. No.: 800,553

[22] Filed: Nov. 21, 1985

[30] Foreign Application Priority Data

| | | | |
|---|---|---|---|
| Nov. 26, 1984 | [JP] | Japan | 59-249074 |
| Dec. 12, 1984 | [JP] | Japan | 59-262250 |
| Jan. 23, 1985 | [JP] | Japan | 60-010501 |
| Jan. 25, 1985 | [JP] | Japan | 60-013178 |
| Jan. 31, 1985 | [JP] | Japan | 60-017061 |
| Apr. 26, 1985 | [JP] | Japan | 60-090126 |

[51] Int. Cl.$^5$ .......................................... G02B 15/14
[52] U.S. Cl. ..................................... 359/654; 359/683
[58] Field of Search ........................ 350/427, 413, 415

[56] References Cited

U.S. PATENT DOCUMENTS

| | | | |
|---|---|---|---|
| 3,486,808 | 12/1969 | Hamblen | 350/413 |
| 4,215,914 | 8/1980 | Muchel et al. | 350/413 |
| 4,457,590 | 7/1984 | Moore | 350/413 |
| 4,518,228 | 5/1985 | Sugiura | 350/415 |
| 4,571,032 | 2/1986 | Someya et al. | 350/413 |
| 4,582,399 | 4/1986 | Mihara . | |
| 4,641,928 | 2/1987 | Hamanishi | 350/427 |
| 4,776,679 | 10/1988 | Kitagishi et al. | 350/427 |

FOREIGN PATENT DOCUMENTS

| | | |
|---|---|---|
| 2638999 | 3/1977 | Fed. Rep. of Germany . |
| 3037524 | 4/1981 | Fed. Rep. of Germany . |
| 3330689 | 3/1984 | Fed. Rep. of Germany . |
| 0153913 | 9/1983 | Japan .................................... 350/427 |
| 2062890 | 10/1980 | United Kingdom . |

OTHER PUBLICATIONS

"Introduction to Classical and Modern Optics", J. R. Meyer-Arendt, pp. 362-365, 1984.
"Design of a Gradient-Index Photographic Objective", L. G. Atkinson et al, Applied Optics, vol. 21, No. 6, Mar. 15, 1982, pp. 993-998.
"Gradient-index Wide-angle Photographic Objective Design", L. G. Atkinson et al., Applied Optics, vol. 23, Noll, Jun. 1, 1984, pp. 1735-1741.

Primary Examiner—Bruce Y. Arnold
Assistant Examiner—Rebecca D. Gass
Attorney, Agent, or Firm—Toren, McGeady & Associates

[57] ABSTRACT

A zoom lens comprising a plurality of lens units in which at least one of the air separations between the units is varied to effect zooming, whereby at least one of the plurality of lens units is included with at least one refractive index distribution type lens element on a common optical axis of the other elements.

31 Claims, 41 Drawing Sheets f=100 f=280 f=570

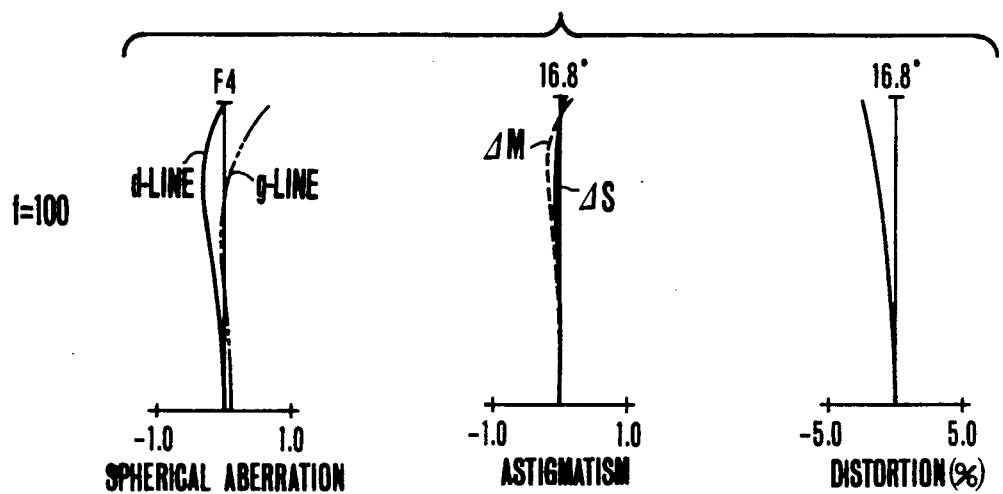
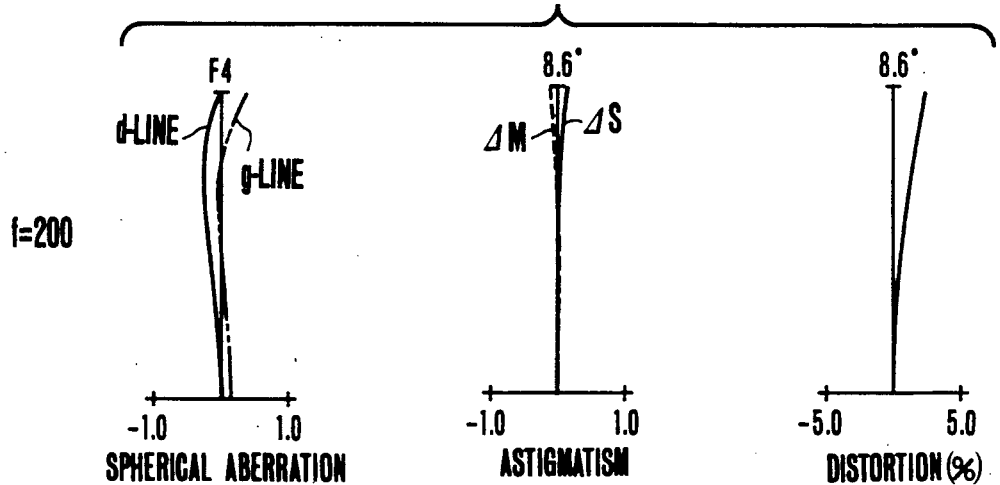
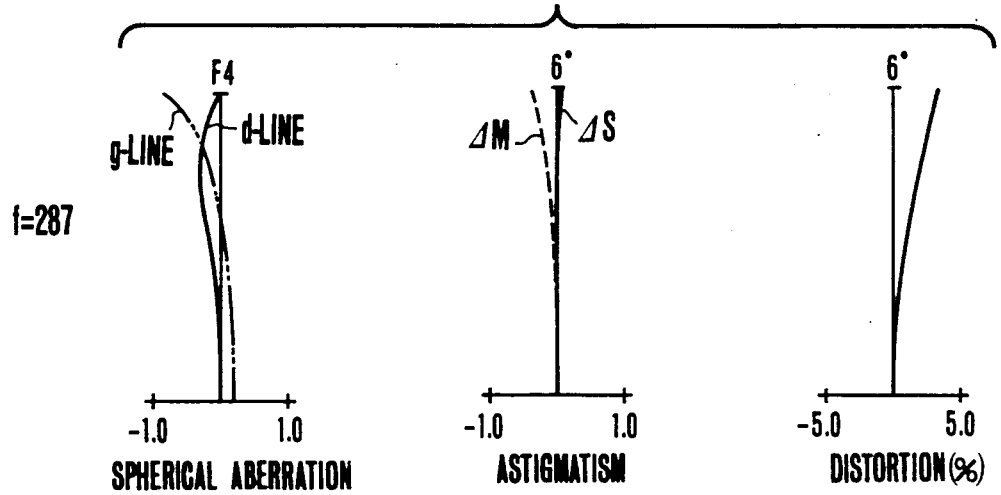

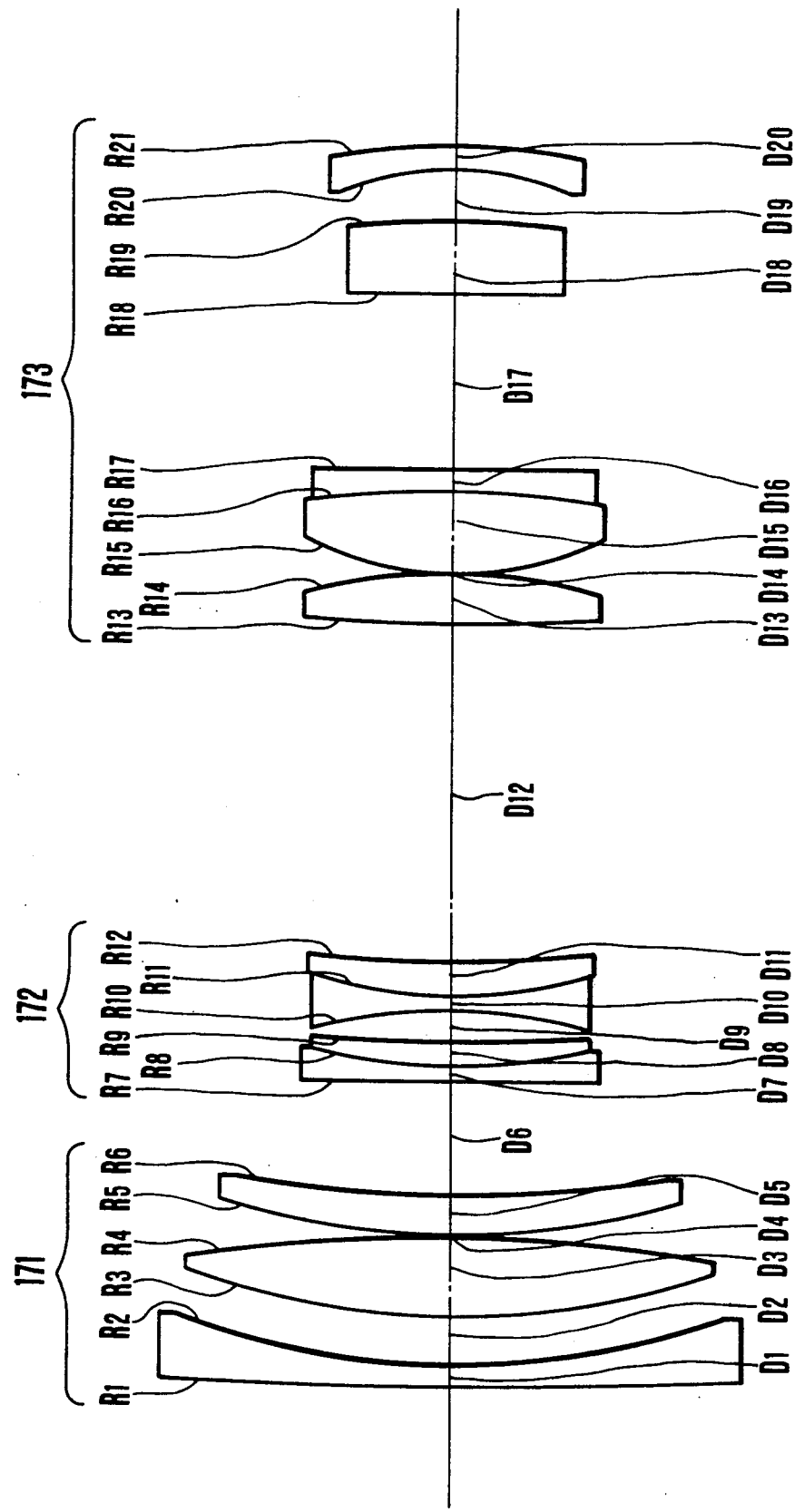
F I G. 33

COMPACT HIGH-RANGE VARIFOCAL OBJECTIVES

BACKGROUND OF THE INVENTION

1. Field of the Invention

This invention relates to optical objectives of variable focal length having at least two axially movable lens units for variation of the focal length

2. Description of the Related Art

In general, zoom lenses need, besides good correction of aberrations in the standard position, to have another requirement of maintaining the aberration correction as stable throughout the entire zooming range as possible Hence, there is need to correct all the lens units individually for spherical aberration, coma and astigmatism. It has, therefore, been the common practice to use several lens elements in constructing any one of the lens units.

Recently, there has been increasing demand for a much-desired reduction of the bulk and size of the zoom lens along with a greater zoom ratio. To decrease the longitudinal length of the zoom lens, paraxially speaking, either the power of each lens unit may be strengthened, or the interval between the principal points in each pair of adjacent two lens units be shortened. To extend the zooming range, if it is only at the paraxial zone that good stability of image aberrations may be established, either the power or the axial movement of each zoom unit can be increased.

To fulfill both requirements of achieving a great advance in the compactness of the zoom lens and a great increase of the zoom ratio, as far as the paraxial zone is concerned, to be sure, the choice of the method of stregthening the power of each lens unit is recommendable. But, for an actual useful zoom lens with good image quality over the entire area of the image format under the condition that the power of each lens unit is strengthened, the necessary number of lens elements in each unit must be greatly increased to permit limitation of produced aberrations to a minimum. If so, the overall axial thickness of the lens unit will increase. This calls for an increase in the principal point interval, leading to an impossibility of shortening the longitudinal length of the entire system. Such increase in the overall axial thicknesses of the lens units also causes decrease of the axial length of the space in which the variator lens unit moves. A valuable increase in the zoom ratio will, therefore, become impossible to achieve. Further, as the overall axial thickness of either the first or front, or the second lens unit increases, the passage of an oblique beam as large as the axial beam is permitted, the diameter of the front lens unit must be increased. Thus, the complete objective will become bulkier. Since there is such a bad endless chain, so long as the conventional spherical lens system is not drastically altered, the problem of achieving a much-desired advance in the compactness with a great increase in the zoom ratio in such a manner that all aberrations can be well corrected, cannot be solved.

Among others, the Petzval sum becomes very difficult to correct when it is by strengthening the power of each lens unit that the total optical length of the entire lens system, or the distance from the front vertex to the image plane, is shortened.

In this connection, taking an example of the well-known 4-unit zoom lens, which the positive first, negative second and positive or negative third lens units, counting from front, constitute a zoom section, and the positive fourth lens unit constitutes a relay section, it should be pointed out that there are two methods of shortening such a zoom lens in the longitudinal direction, namely (1) by strengthening the power of each of the lens units in the zoom section, or (2) by decreasing the telephoto ratio of the relay section. According to (1) method, the second lens unit, as the variator which is usually strongest in the negative sense of power, takes a large value of the Petzval sum with the result that curvature of field is extremely overcorrected. In (2) also, the decrease in the telephoto ratio of the relay lens tends to change the sign of the value of Petzval sum to the negative one. The use of the latter method, therefore, also results in over-correction of field curvature.

In aiming to correct the Petzval sum, if the refractive index of the positive lens is lowered, or a positive lens of strong power is combined with a negative lens, very large spherical aberration or higher order aberration is, in turn, produced which cannot be corrected by the suitable design of the other lens units. It is to be understood that the reducing of the size of the zoom lens is incompatible with good correction of Petzval sum as far as the spherical lens system is concerned.

Such a situation is not confined to the aforesaid kind of zoom-unit configuration, but is valid to other kinds of configuration such as those in which the positive first lens unit axially moves forward when zooming from the wide angle to the telephoto end, or the fourth lens unit also axially moves during zooming.

An attempt has been made to get around this difficulty by employing a compound-eyes optical system having a function of forming an erected image of unity magnification in place of the relay lens unit. In this method, the relay lens unit is constructed with a lens of simple form and a network of a great number of self-convergent spherilenslets or barlenslets. Though the relay lens unit itself is of simple structure, because the means for relaying the image formed at a constant position by the zoom section to the last image plane is in the form of compound eyes, there are many restrictions.

In FIG. 41 there is shown a prior known zoom lens of the kind in which the two air separations between the successive two of positive first, negative second and negative third lens units A, B and C are varied to vary the focal length while compensating for the image shift. As is obvious from the drawing, usually the unit A is necessarily of the largest diameter among the four lens units A to D and, because of its having two or more members, is very heavy. In this connection it should be explained that the positive front unit A is designed with the prerequisites that the on-axis F-number has a prescribed value in the telephoto end, and the diameter is so large as to admit of the light beams that proceed to the corners of the image frame even when in the wide angle end, and that to allow for the zoom ratio to be taken at a desired value, an object point for the negative second unit B is formed in an appropriate position, and its focal length of positive sign is so short as to be suited to a prescribed focusing range. Meanwhile, to assist in stabilizing aberrations during zooming, the unit A is corrected very often in itself for spherical aberration including chromatic aberrations with a greater emphasis than on the other aberrations. Under such a circumstance, therefore, so long as the designer relied on the employment of a single lens for the unit A, it has been impossible to realize an achievement of the much-desired reduction of the bulk and size of the unit A, since among the homogeneous optical materials there exists no one that allows for sufficient correction of chromatic aberrations. Another method of constructing the unit A from two lenses of which the positive lens is made of a material of relatively low dispersion and another lens which is negative and made of relatively high dispersive material, has also sometimes been employed. But the addition of such a negative lens into the unit of positive overall power requires that the focal length of the positive lens be short enough to cancel the power of the negative lens, or its surface curvature becomes stronger. To hold the prescribed value of the diameter, therefore, the minimum acceptable axial thickness of the positive lens is caused to rapidly increase. Correcting spherical aberration also is limited to the extent of the possible amount of correction by the two spherical lenses. In many cases, therefore, it has been unavoidable to introduce an aspherical lens.

That the increase of the axial thickness of the first or second lens unit of the zoom lens gives a serious problem to the advance in compactness has already been mentioned. Particularly to the second unit, when its power is increased in the negative sense, because of the necessity of increasing the necessary number of constituent lens elements, its overall axial thickness tends to increase rapidly.

In another zoom lens comprising at least three lens units, or, from front to rear, a positive first lens unit, a negative second lens unit, and a third lens unit of strong power, the zooming arrangement being such that as zooming from the wide angle to the telephoto end, the axial separation between the first and second units increases and the axial separation between the second and third units first descreases and then increases, the method of minimizing the total optical length is either to strengthen the power of the third unit, or to shorten the interval between the principal points of the second and third units. However, when the power of the second unit is strengthened, the necessary number of lens elements in the second unit to correct aberrations increases with increase in the overall axial thickness thereof. Therefore, the principal point interval must be increased and the total optical length of the entire system cannot be appreciably shortened. Also when the power of the positive third unit is strengthened, all those aberrations which arise within the positive third lens unit, in most cases, particularly spherical aberration and astigmatism, are caused to increase. To correct these aberrations to desired values, it is unavoidable to increase the number of constituent lens elements of the positive third unit.

Meanwhile, as to reduce the size of the relay section of the zoom lens, mention may be made of the method of strengthening its telephoto form. To do this, the positive power must be concentrated in the front part of the relay section, while the negative power at the rear part. With the use of this method, however, because the front and rear parts are necessarily spaced apart to allow for the decreasing of the telephoto ratio of the relay section, and because the number of the ones of the lens elements whose powers are strong enough to correct curvature of field, spherical aberration and distortion becomes large, a very long physical length of the relay lens unit has resulted. In fact, despite the minimum possible back-focal distance, there has been a limitation on the extent of reduction of the distance from the front vertex of the relay section to the image plane.

Further, since the zoom lens has its relay unit made of a largest number of constituent lens elements among all the units and also since each element has a strong power, it takes a long time and great effort to manufacture such lens elements and mountings therefor, and, because a severe tolerance must be assigned to the axial alignment of the lens elements, another long time is required for the adjusting operations on the assembly line. Also since the total sum of the constituent lens elements over the zoom lens is very large, there are produced many adverse effects to improvements of the image quality, such as those of surface reflections, ghost light and flare spots, which are peculiar to the zoom lenses.

SUMMARY OF THE INVENTION

An object of the present invention is to eliminate all of the above-described drawbacks of the prior art, and to provide a varifocal objective of greatly reduced size and weight with a high range and a high imaging performance.

Another object is to provide a varifocal objective amenable to quick and easy assembling and adjusting techniques.

In embodiments of the invention to be described later, use is made of two types of refractive index-distributive lenses selectively or in combination, one of which is that the refractive index varies with height from the optical axis (hereinafter described as the "radial type"), and the other of which is that it varies with axial distance from the front vertex or bevel of that (hereinafter described as the "axial type"). It should be noted that there is still another type having the combined refractive index distribution of the radial and axial types. Of the radial type lenses, the one whose refractive index decreases as the height from the optical axis increases is hereinafter called a positive power-transit lens, and the other whose refractive index increases as the height increases is hereinafter called a negative power-transit lens. Also, in the axial type, there are four different distributions such that, as the axial distance from the front vertex or bevel of the lens, the refractive index increases, or decreases, or takes a minimum or a maximum at an intermediate point in the axial thickness.

Particularly for the purpose of correcting chromatic aberrations, use is made of either a radial type refractive index distributive lens in which the gradient of refractive index for short wavelengths in the paraxial region is made smaller than that for long wavelengths, or an axial type one in which the gradient of refractive index for short wavelengths at or near the front vertex is made smaller than that for long wavelengths.

As has been described above, the varifocal objective of the invention is provided with at least one refractive index-distributive lens in at least one of the lens units thereof to achieve a valuable reduction of the number of consituent lens elements of that unit in such a manner as to preserve high image quality over the entire area of the format. If any other lens unit is designed with the use of a lens of the aforesaid refractive index distribution type, an additional advantage can be obtained. These refractive index distributive lenses may be of any shapes and can be given any desired properties when their surface curvatures, focal lengths and refractive index distributions are so controlled.

In the application of a radial type refractive index distributive lens to the aforesaid negative second lens unit, letting the power of that lens be denoted by $\phi$ and the refractive index distribution over the height from the optical axis be expressed as $N_i(h) = N_0 + N_1 h^2 + N_2 h^4 \ldots$, it is desirable to satisfy the following condition:

$$\phi \cdot N_1 < 0.$$

The term "power" used just above means the combination of the refraction and transition.

And when said condition is satisfied, the interior of the lens becomes able to contribute to a refractive power, thereby it being made possible to weaken the surface curvatures of that lens. Therefore, an advantage is produced that higher order aberrations can be limited to a minimum. Another advantage is that the minimum acceptable center thickness of the lens at the necessary edge thickness, or the maximum acceptable air space at the necessary marginal thickness can be further reduced. This leads to a possibility of achieving a much-desired reduction of the bulk and size of the complete objective.

BRIEF DESCRIPTION OF THE DRAWINGS

Odd-numbered FIGS. 1 to 39 are longitudinal section views of first to twentieth embodiments of varifocal objectives according to the present invention.

Even-numbered

DETAILED DESCRIPTION OF THE PREFERRED EMBODIMENTS

Figure 1:
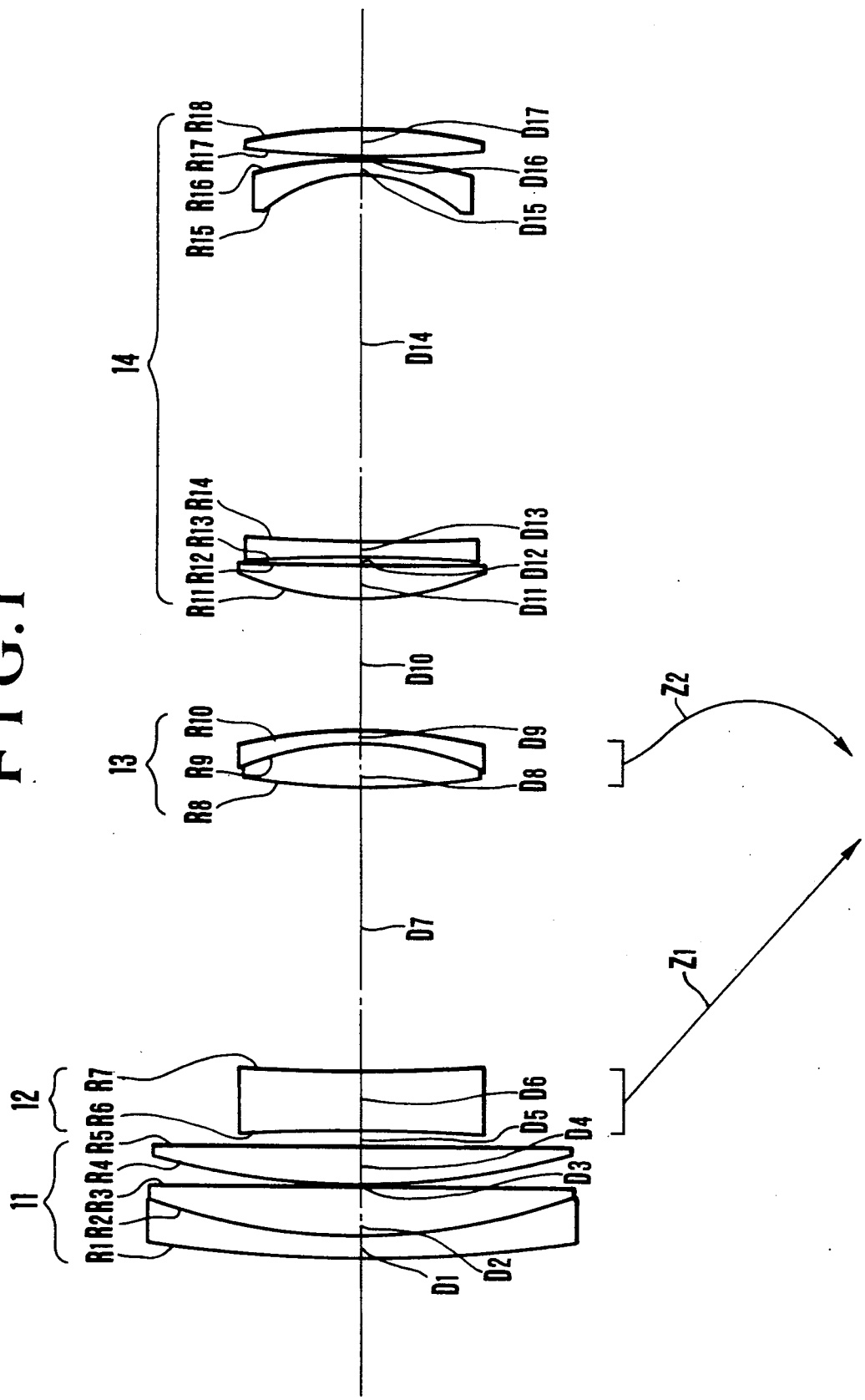

In FIG. 1, there is shown a first example of a specific zoom lens of the invention (of which the numerical data are listed in Numerical Example 1) comprising, from front to rear, a positive first lens unit 11 which is stationary during zooming, a negative second lens unit 12 axially movable for varying the image magnification, a positive third lens unit 13 axially movable for compensating for the image shift, and a positive fourth lens unit 14 which remains stationary during zooming. The second unit 12, or the so-called variator, is provided with a negative power-transit lens of the radial refractive index distribution type.

The refractive index distribution type lens is different from the ordinary lens of homogeneous material in that even the interior of the lens has a convergent or divergent action, contributing to an increase in the power. In this example, the interior power accounts for 5/6 of the overall power of the variator Also the ability of correcting aberrations is superior. This makes it possible that, while usually three to five homogeneous lenses are necessary to constitute the variator, a single lens of the type described suffices. Moreover, this lens may be formed to weak surface curvatures.

The refractive index distribution type lens with its front and rear surfaces R6 and R7 of FIG. 1, though only one in number, has a capability of stabilizing aberrations against zooming and is well adapted particularly to correct Petzval sum and spherical aberration.

The Petzval sum of the aforesaid type lens may be expressed by $P = \phi_{gi}/N_0^2$ where $\phi_{gi}$ is the power due to the converging or diverging effect of its interior in terms of the focal length of the entire system normalized to unity and $N_0$ is the refractive index as the base. Because it is inversely proportional to the square of the refractive index N, compared with the ordinary lens whose Petzval sum is $P = \phi/N$, the aforesaid type lens has a smaller value of the Petzval sum.

In the first example, the Petzval sum takes a small value of negative sign. Suppose a spherical system of the same power arrangement as in this example, the value of the Petzval sum of the variator is on the order of $-1.25$ to $-1.30$. But it is in this example of the invention that it is reduced to $-1.025$. This implies that the power of the zoom section is allowed to increase, or the telephoto ratio of the relay section to decrease to effect an equivalent image quality, and that the use of the aforesaid type lens provides a possibility of reducing the total length of the entire system as compared with the spherical system. That is, in the past, to do shortening of the total length, if the power of the zoom section was strengthened, or the telephoto ratio of the relay section was decreased, the Petzval sum would have a large negative value which was impossible to correct. This constituted a greatest obstacle. According to the invention, however, the variator produces a smaller negative value of the Petzval sum than was heretofore possible, thereby giving an advantage that room is created for employing the aforesaid method in shortening the total length of the entire system. In the specific example 1, the method of decreasing the telephoto ratio of the relay section is employed so that the length of the entire system is 254.8 mm and the ratio to the longest focal length is as small as 0.836. Another advantage arising from the improvement of the Petzval sum is that the refractive index of the first lens element of positive power in the relay section is increased to achieve good correction of spherical aberration.

Figure 2A:
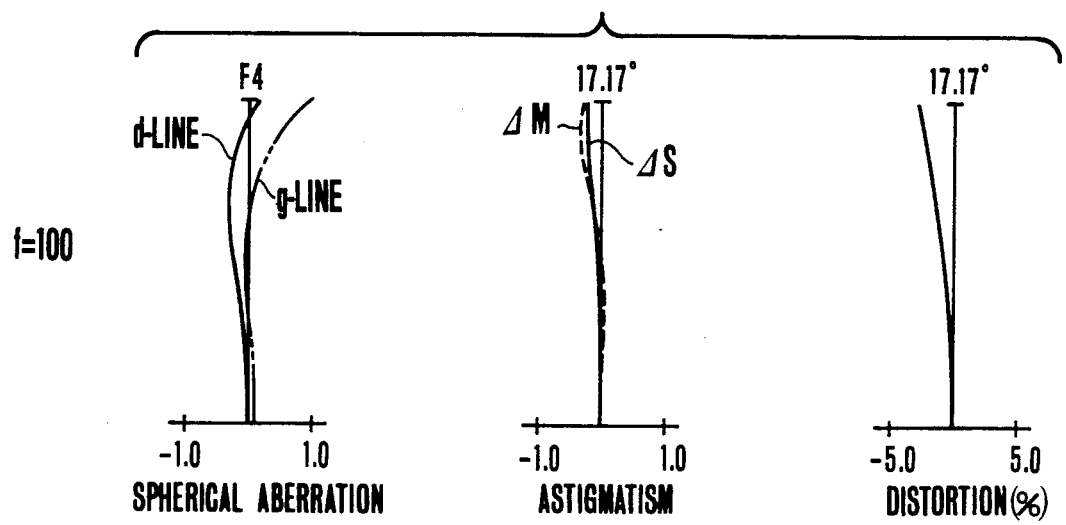
FIGS. 2A-2C to 40A-40C are graphic representations of the various aberrations of the first to twentieth objectives in the wide angle, intermediate and telephoto positions, respectively.
Figure 2B:
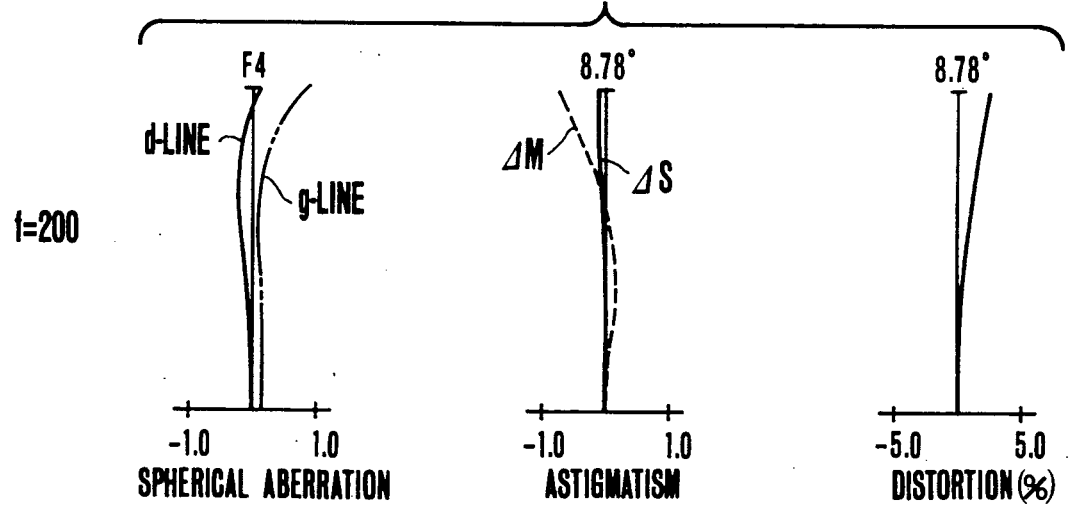
Figure 2C:
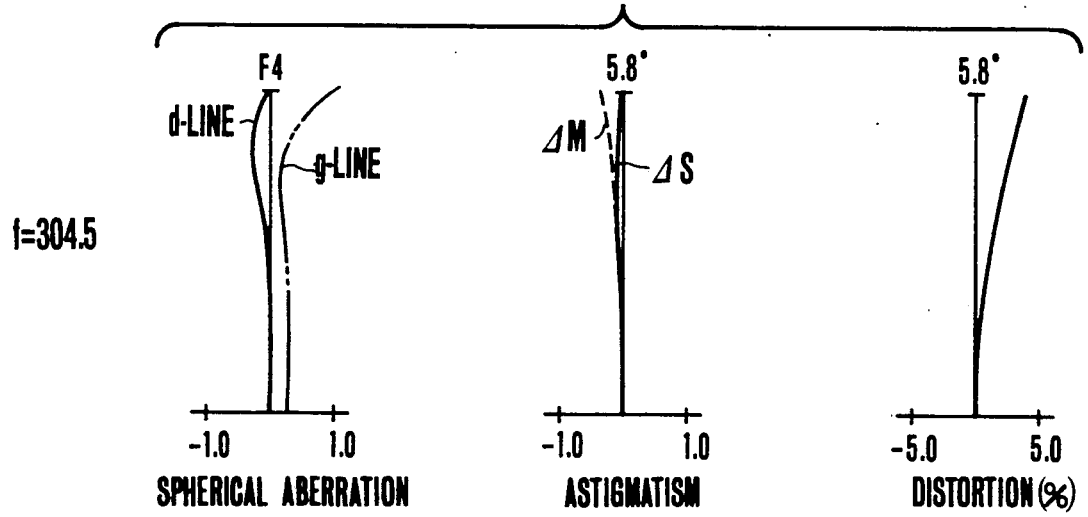

That is, while it has been the common practice in the prior art that, as the variator is constructed with three to five lens elements, the method of correcting spherical aberration is to control the cemented surface between two of the lens elements, the present invention has, despite, in the example, the number of constituent lens elements in the variator is only one, attained a good result in correction of spherical aberration as will be seen from FIGS. 2A to 2C.

The refractive index distribution type lens has an ability of self-correcting spherical aberration as rays of light pass in curved paths therethrough. This curvature is determined by what form the refractive index distribution takes in the interior of that lens Defining the form of distribution by $N(h) = N_0 + N_1 h^2 + N_2 h^4 + N_3 h^6 + \ldots$, we can realize it by controlling the coefficient $N_2$.

Figure 3:
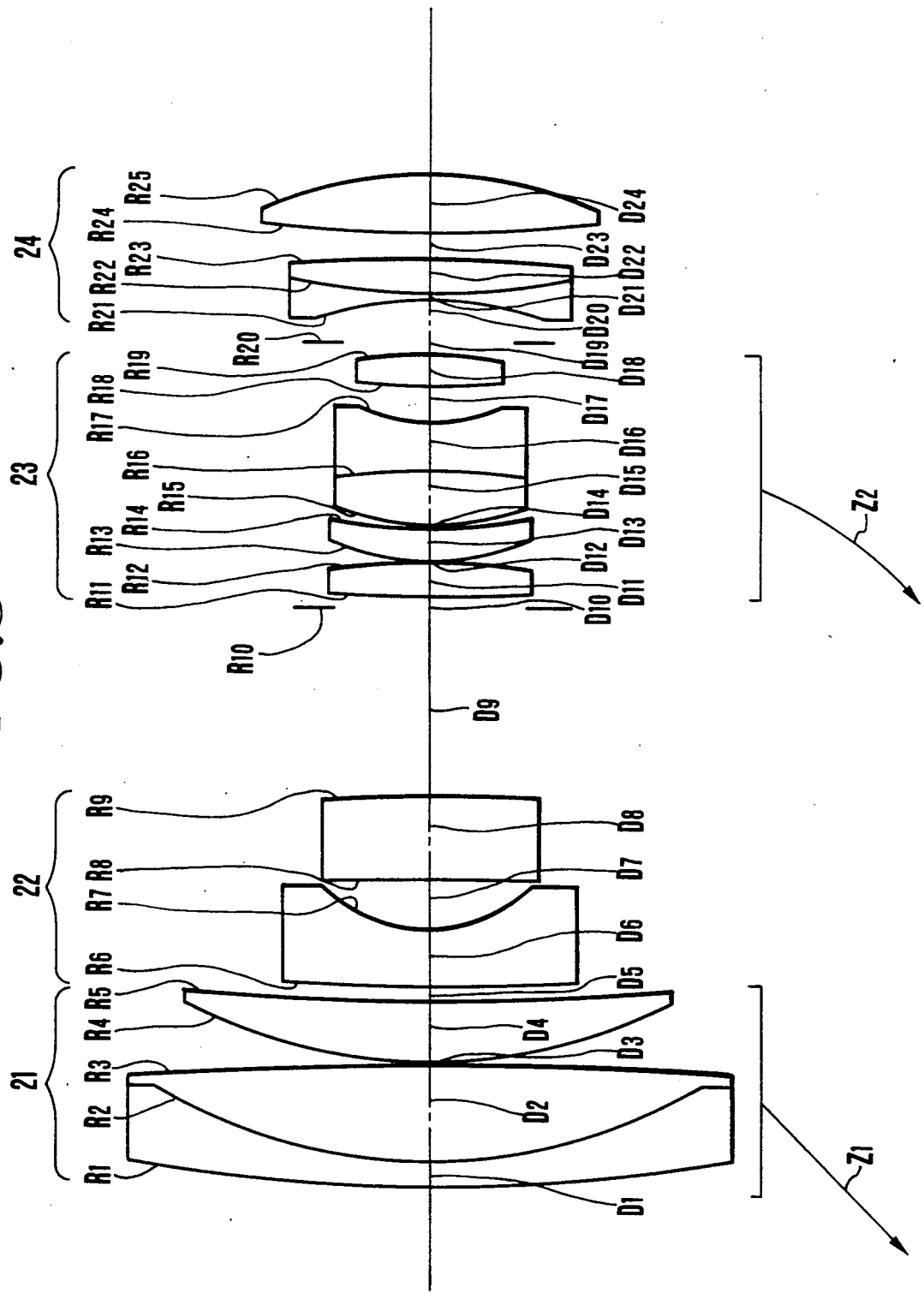
Figure 4A:
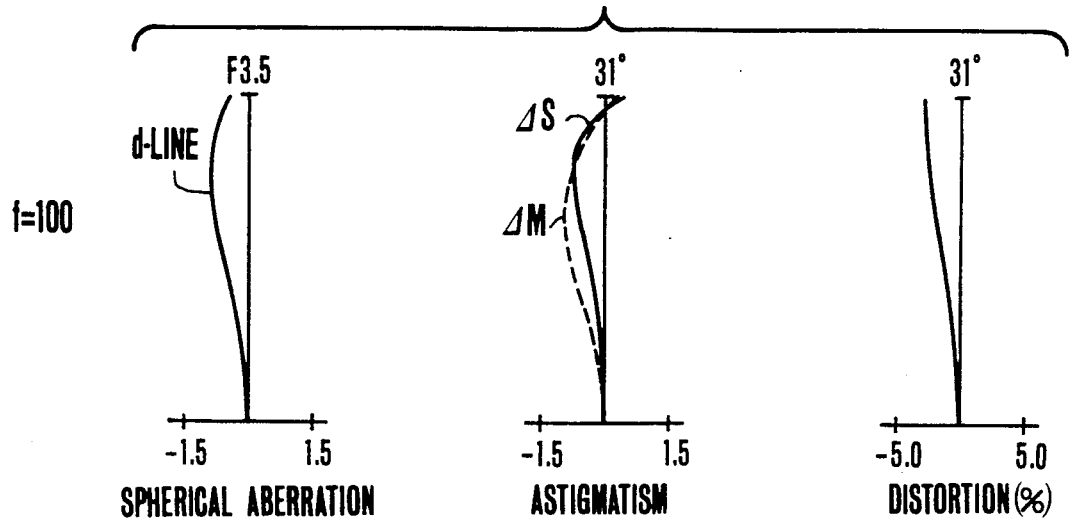
Figure 4B:
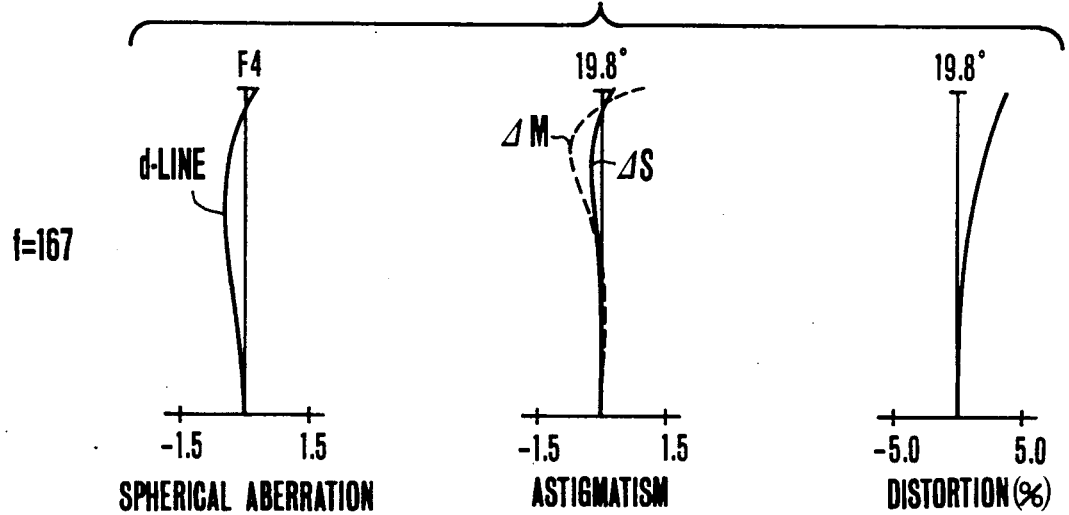
Figure 4C:
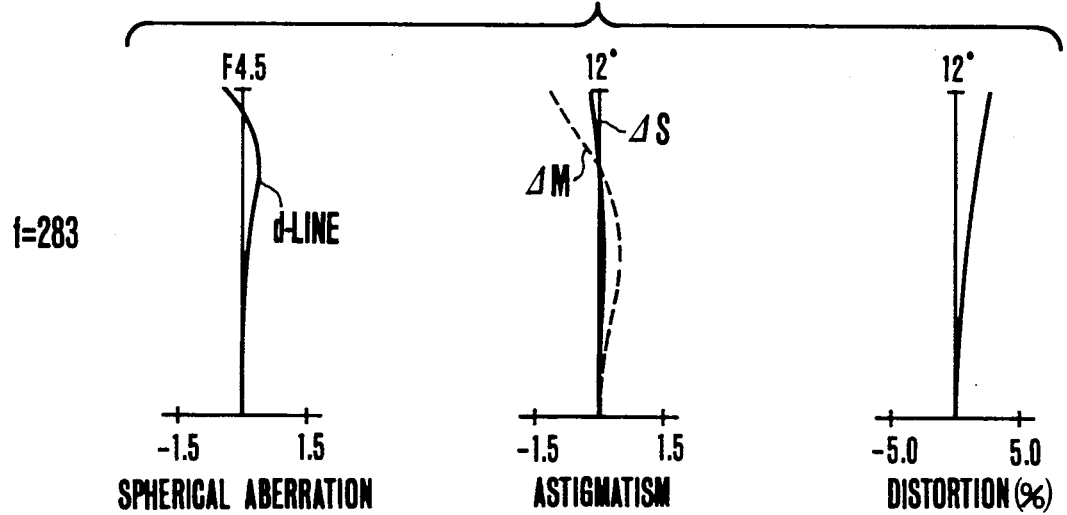

FIG. 3 shows the use of two radial type refractive index distributive lenses in making up the negative second lens unit of a second example of a specific zoom lens (of which the numerical data are listed in Numerical Example 2) comprising, from front to rear, a positive first lens unit 21, a negative second lens unit 22, a positive third lens unit 23 and a positive fourth lens unit 24, the first and third units 21 and 23 axially moving in differential relation, while the second and fourth units remain stationary during zooming. The negative second unit 22 though held stationary shares a greatest fraction of the image magnification varying action, and because of its being stationary, gives an advantage of simplifying the structure of an operating mechanism as compared with when the front three units are made movable for zooming.

This type of zoom lens is generally adopted when the shortest focal length is decreased. But in order to increase the zoom ratio up to 3 or thereabout, the focal length of the second unit must be considerably shortened. Therefore, the radius of curvature of the concave surface of a lens element constituting part of the second unit becomes small, leaving large residual aberrations which were difficult to remove so long as the method of increasing the number of constituent elements was employed.

By using the refractive index distribution type lenses, because, particularly, the negative meniscus-shaped one which is especially adapted to contribute to the overall negative power of the second unit can gain a surplus negative power to the distribution of refractive indices in the interior thereof, it is made possible to weaken its rearward concave rear surface curvature with the result that aberrations are prevented from producing.

Figure 5:
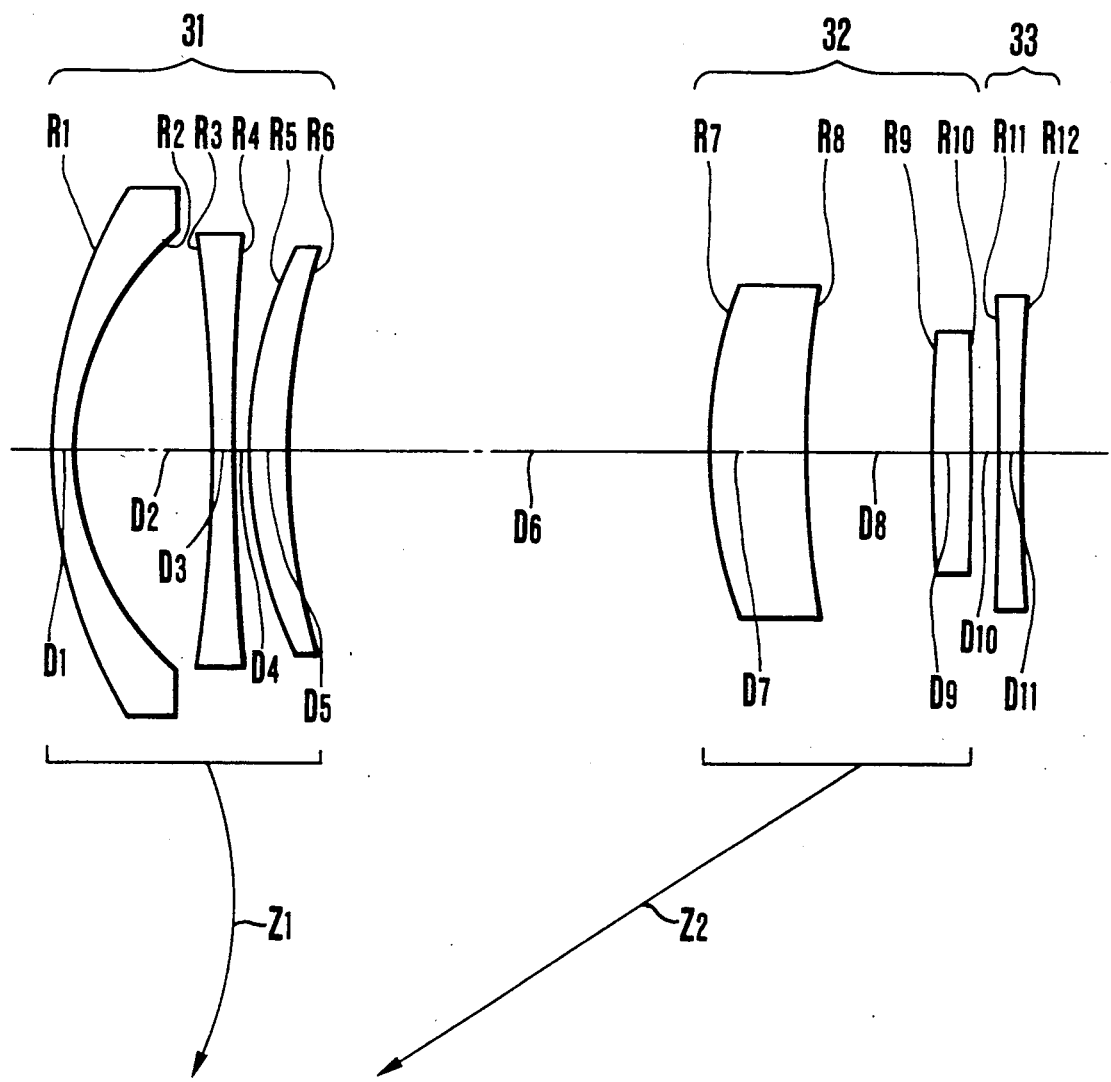
Figure 6A:
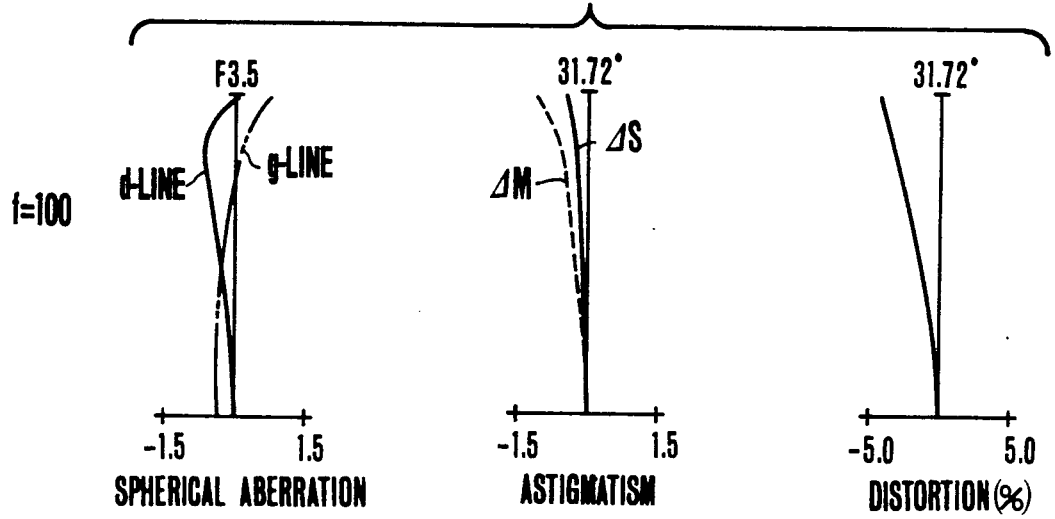
Figure 6B:
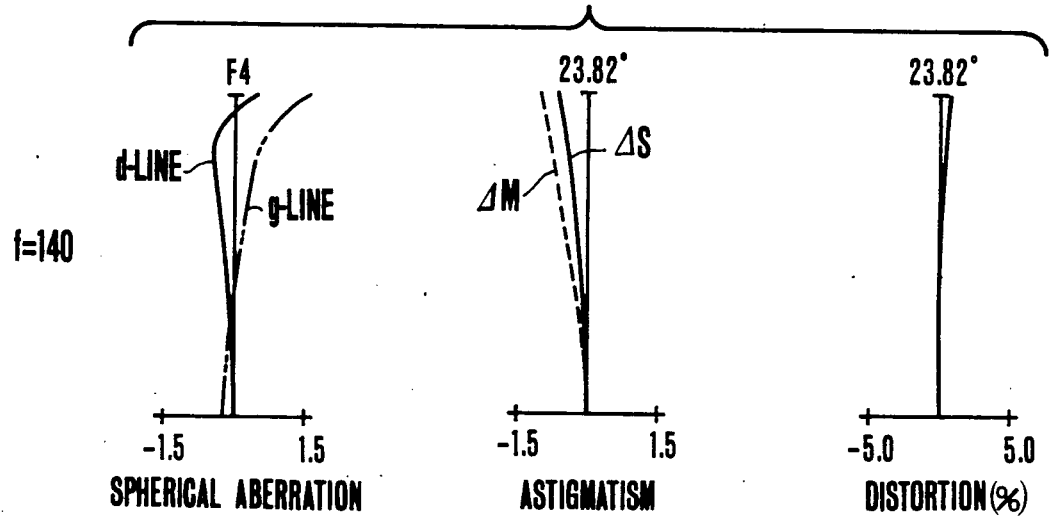
Figure 6C:
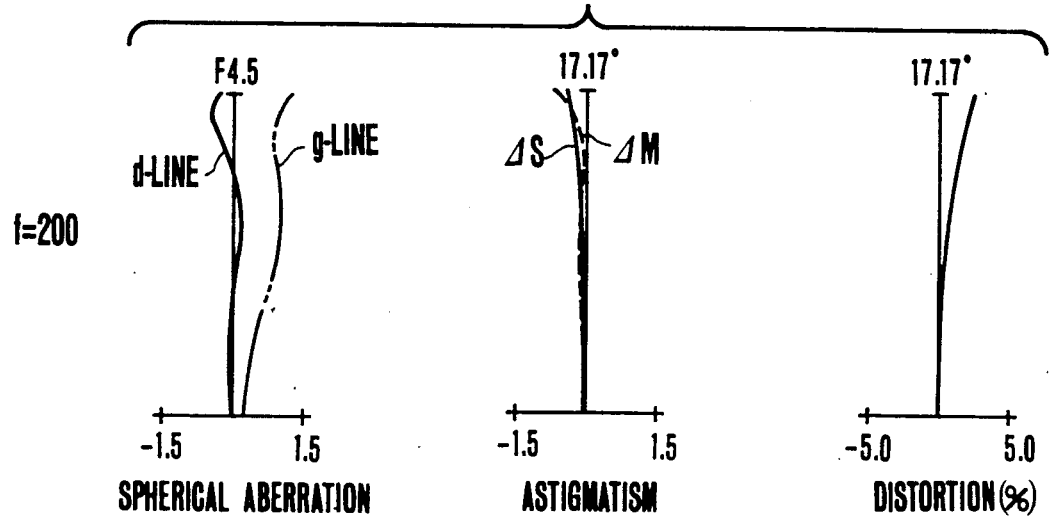

FIG. 5 illustrates a third example of a specific zoom lens of the invention (of which the numerical data are listed in Numerical Example 3) comprising, from front to rear, a negative first lens unit 31 and a positive second lens unit 32 axially movable for zooming in front of a third lens unit 33 which remains stationary during zooming. The second unit is constructed with two radial type refractive index distributive lenses. The third unit may be considered as introduced to shorten the total length. So, the zoom lens of this example can be said to be of the expanded 2-unit zoom lens type.

As far as this type is concerned, the conventional second unit of the same power as in this example usually has its necessary number of constituent lens elements at more than five. The second unit of the invention, on the other hand, necessitates only two refractive index distribution type lenses of which the first, counting from front, is of positive power-transit, and the second is of negative power-transit, and is, therefore, shorter than the conventional one by an amount corresponding to the decrease in the number of elements. Thus, the total length of the complete objective is considerably shortened.

Another conventional feature of that zoom lens type is that the second unit is of the modified Ernostar type. Hence, particularly for the front part, a severe tolerance has to be assigned to the spacings between the lens elements and their axial alignment. The present invention, because of its using only two elements, therefore produces an advantage of simplifying the assembling process.

Figure 7:
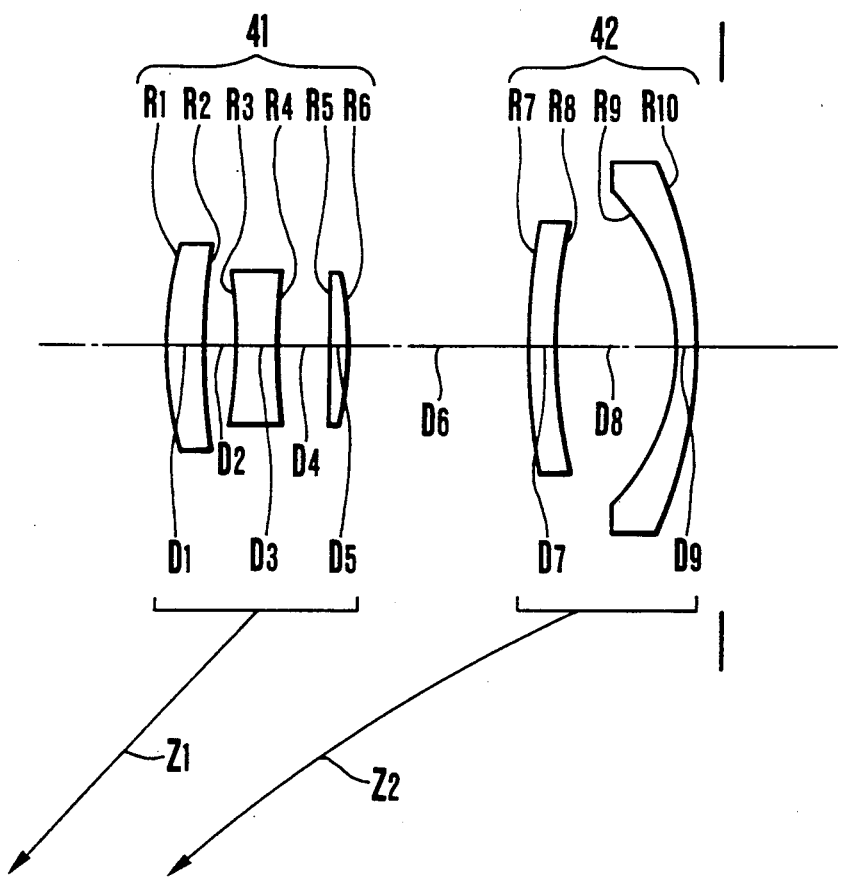
Figure 8A:
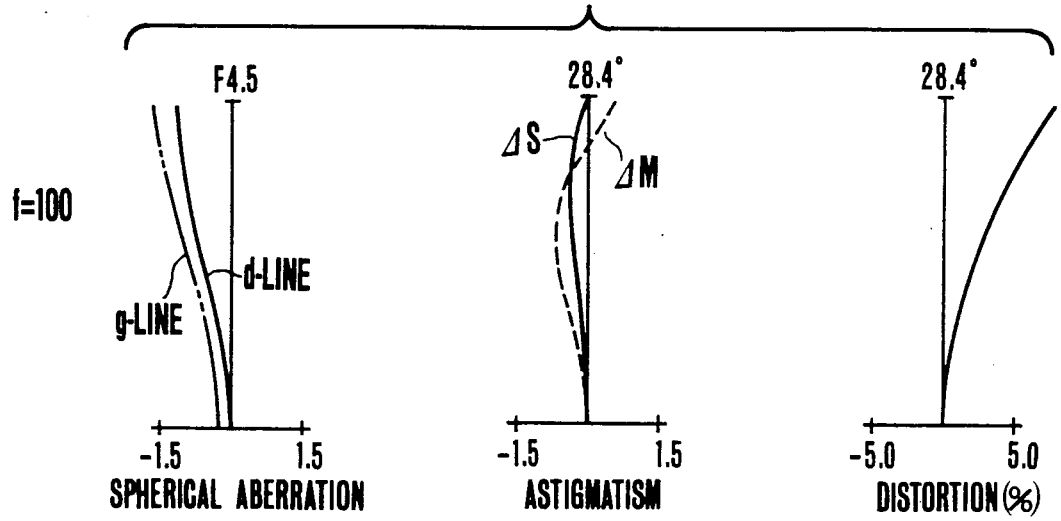
Figure 8B:
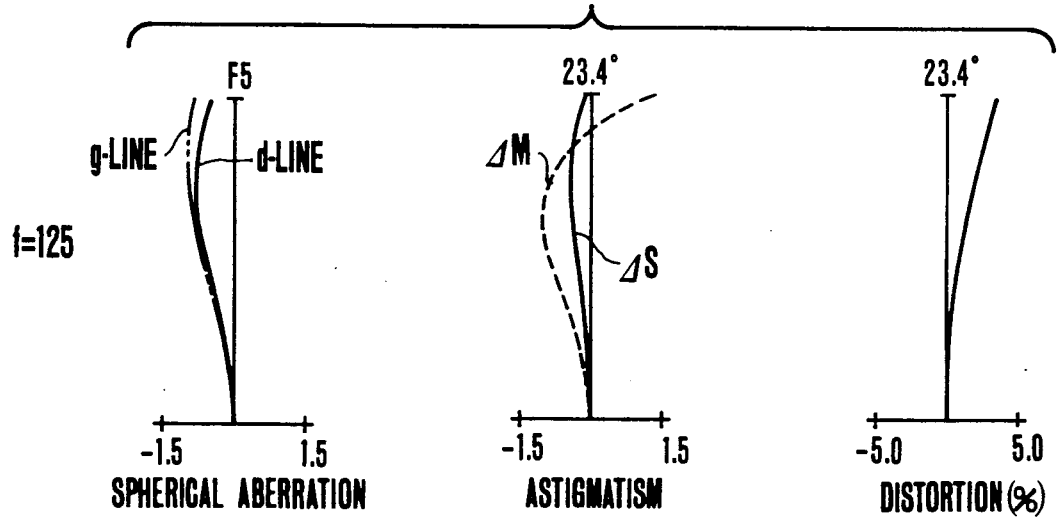
Figure 8C:
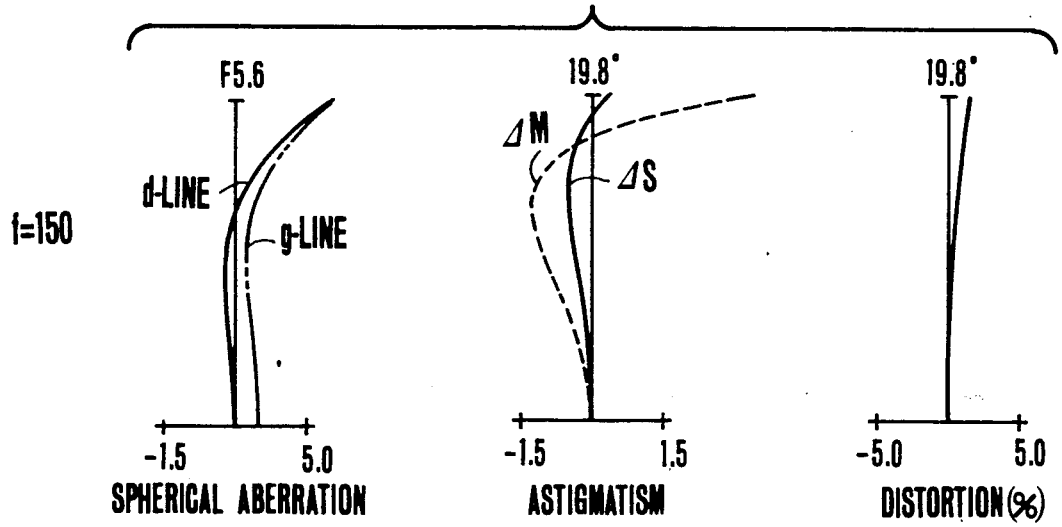

FIG. 7 illustrates, as a fourth specific example, a small-sized zoom lens (of which the numerical data are listed in Numerical Example 4) suited to be built in a medium-priced camera. This zoom lens is of the 2-unit type having a positive front lens unit 41 and a negative rear lens unit 42 both of which axially move forward while decreasing their air separation as the focal length increases and in which the back focal distance is very short. In the first lens element of the front unit 41, use is made of a radial type negative power-transmit lens, thereby the number of elements is reduced from more than 4, as in the prior art, to 3. This has made it possible to realize the much-desired reduction of the weight and size of the entire system in such a manner that spherical aberration, astigmatism and Petzval sum are well corrected by utilizing the reverseoriented aberrations produced in the interior of the first lens element.

Figure 9:
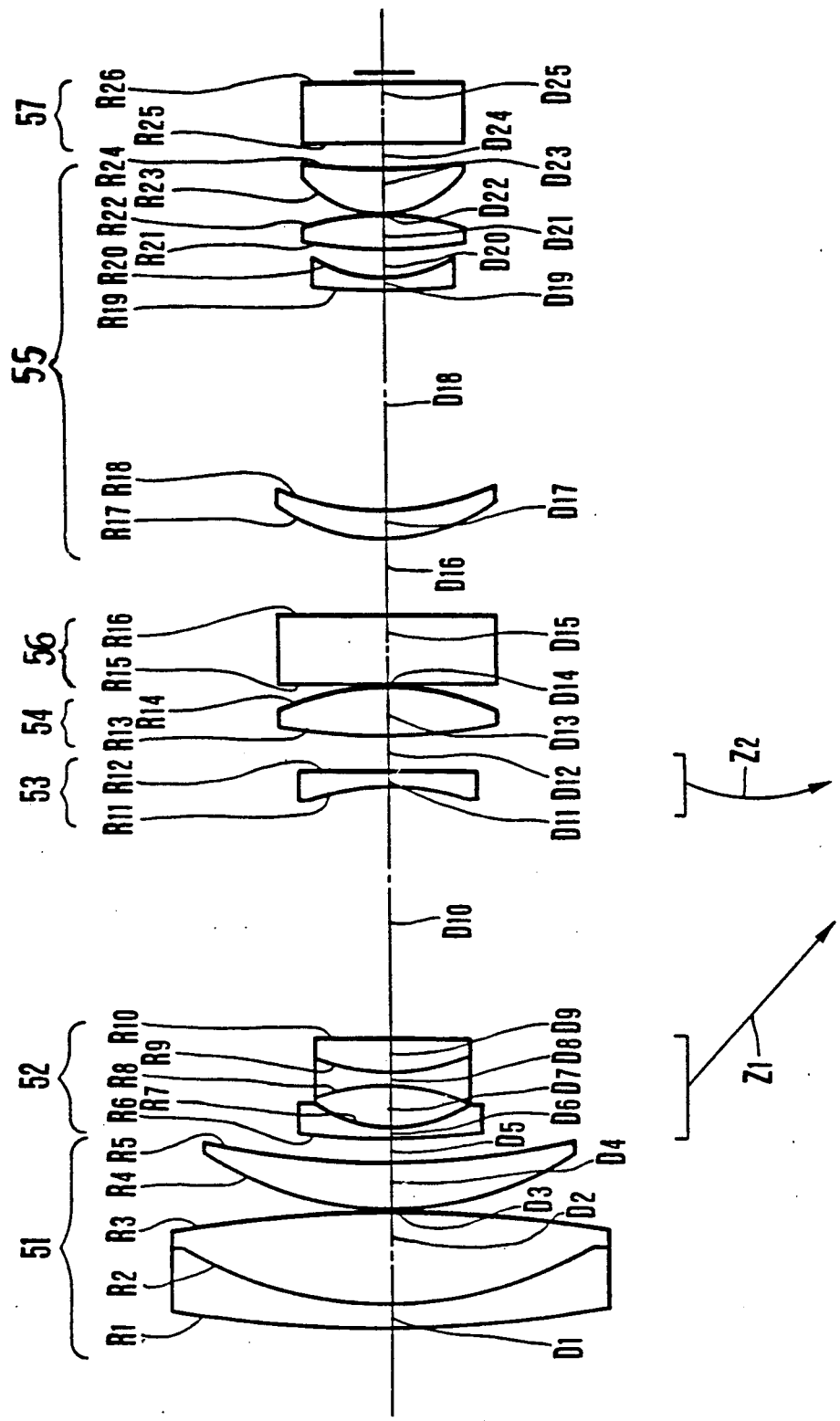
Figure 10A:
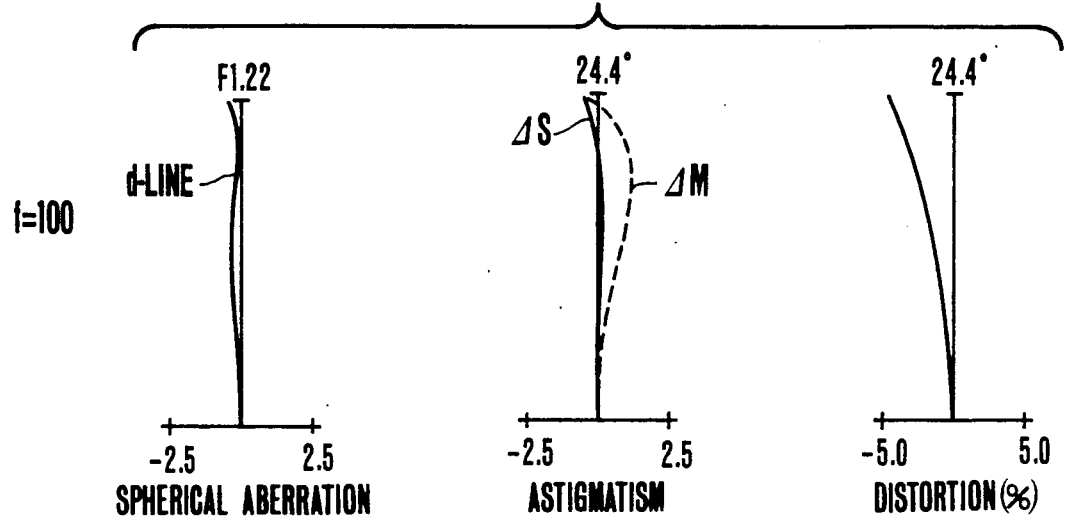
Figure 10B:
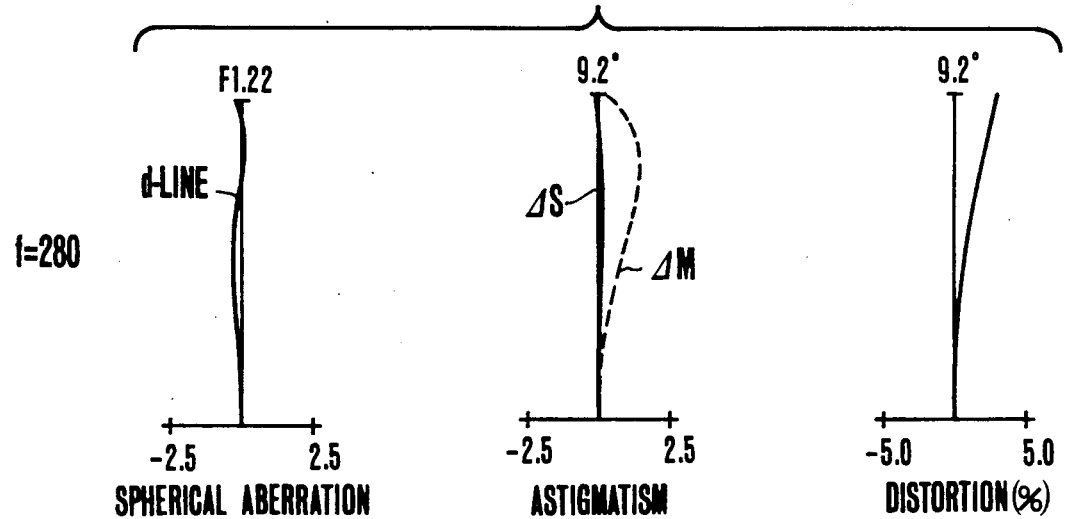
Figure 10C:
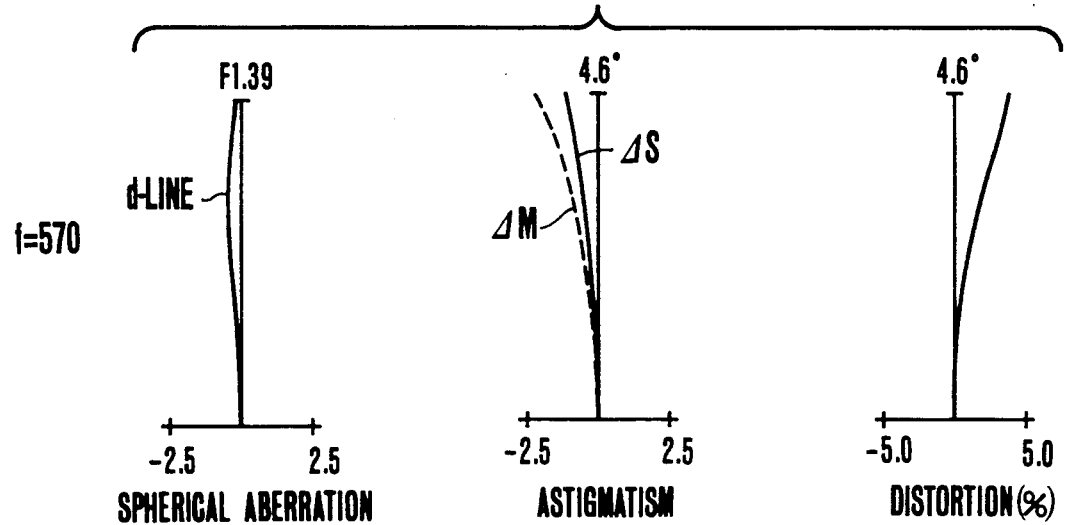
Figure 11:
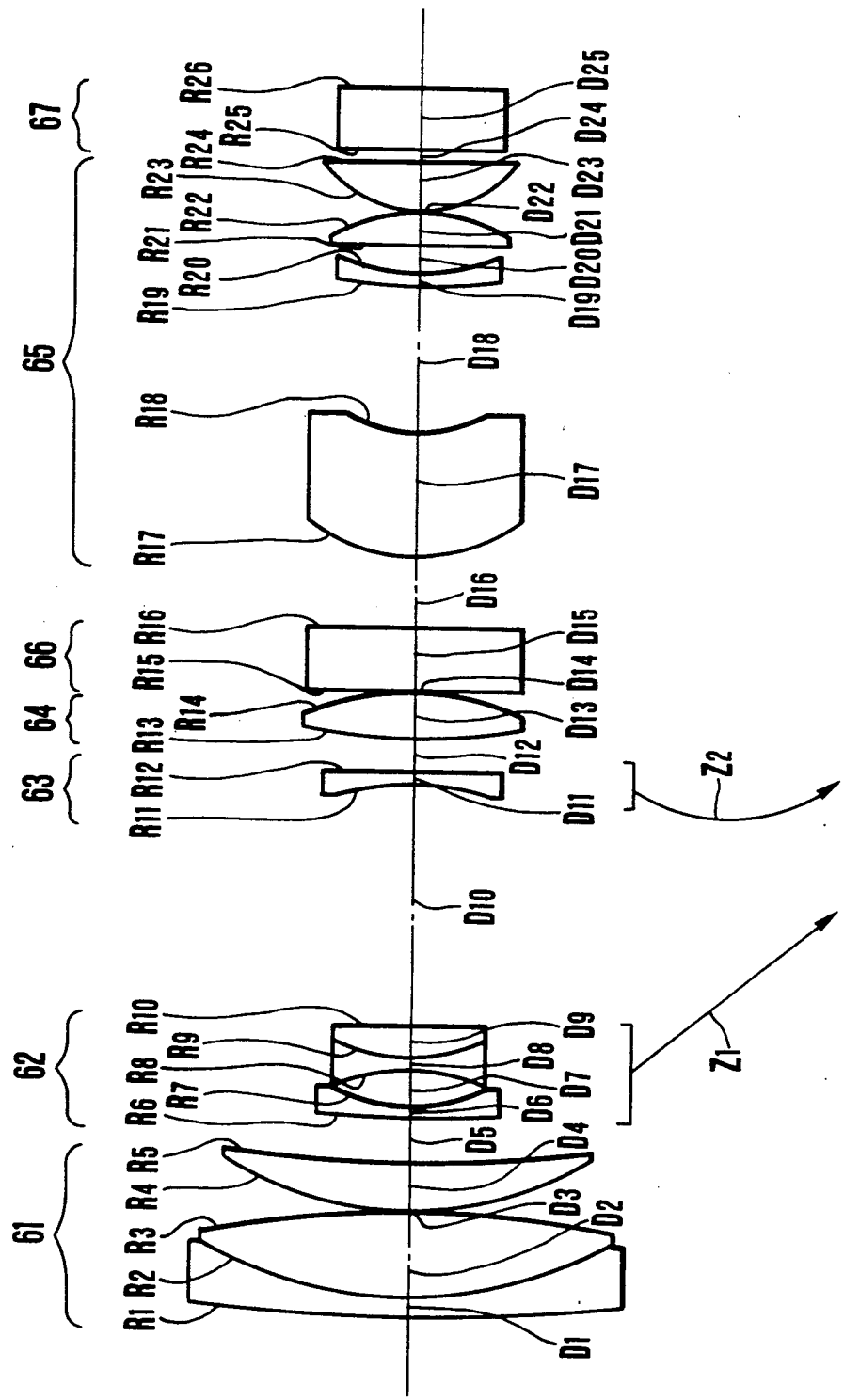
Figure 12A:
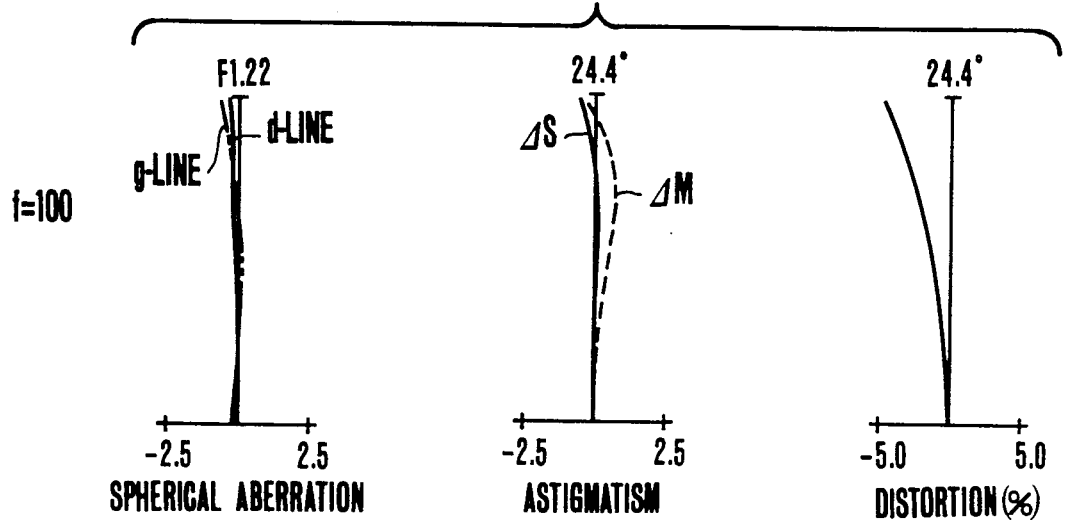
Figure 12B:
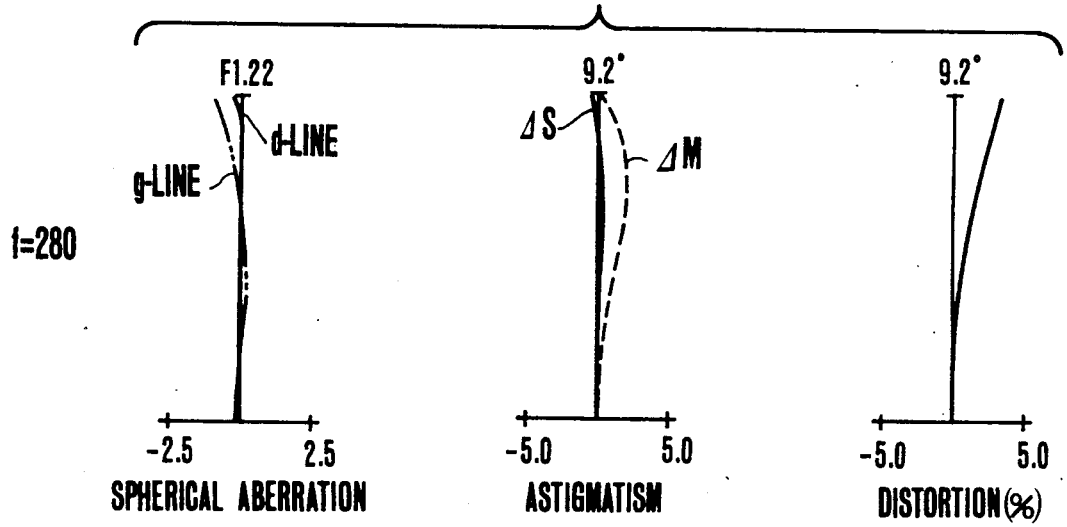
Figure 12C:
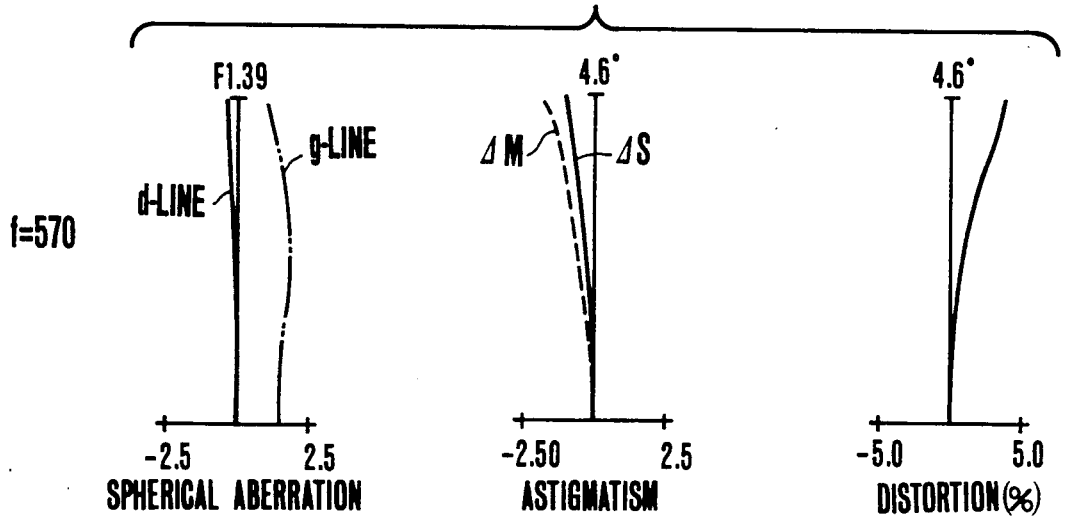

FIGS. 9 and 11 illustrate fifth and sixth examples of specific zoom lenses (of which the numerical data are listed in Numerical Examples 5 and 6, respectively) each comprising a positive first lens unit 51, 61 movable for focusing, a negative second lens unit 52, 62 as the variator, a negative third lens unit 53, 63 as the compensator, and a positive fourth lens unit 54, 64 of afocal function, followed, after a beam splitter 56, 66 for a finder, by a relay lens unit 55, 65 of positive power. The second and third units are moved axially in differential relation to effect zooming. There is another beam splitter 57, 67 for a light meter.

In the fifth example, use is made of an axial type refractive index distributive lens for the first lens of the positive fifth lens unit 55, and in the sixth example, it is changed to the radial type, thereby the relay section is reduced in size and weight.

In designing the conventional relay lens, it is customary to use the Petzval type of which the lens comprises two units of positive power with a long spacing therebetween, thanks to the favorite aberration correction. In most cases, three lens elements are used for constructing each of these front and rear units. In addition, the front unit has a power arrangement of positive-negative-positive as is similar to that in the front unit of the telephoto objective and is used for correcting mainly spherical aberration and coma, while the rear unit of negative-positive-positive is used for astigmatism.

The fifth and sixth examples are to reduce the number of elements of the front part of the relay lens to only one, while still preserving high grade of image quality.

Another advantage is that the process for assembling the relay lens is remarkably simplified as compared with the conventional zoom lens which has required an elaborate, time-consuming operation of assembling the three lens elements to the front unit of the relay lens while simultaneously removing the errors of relative positions (optical decentering).

Figure 13:
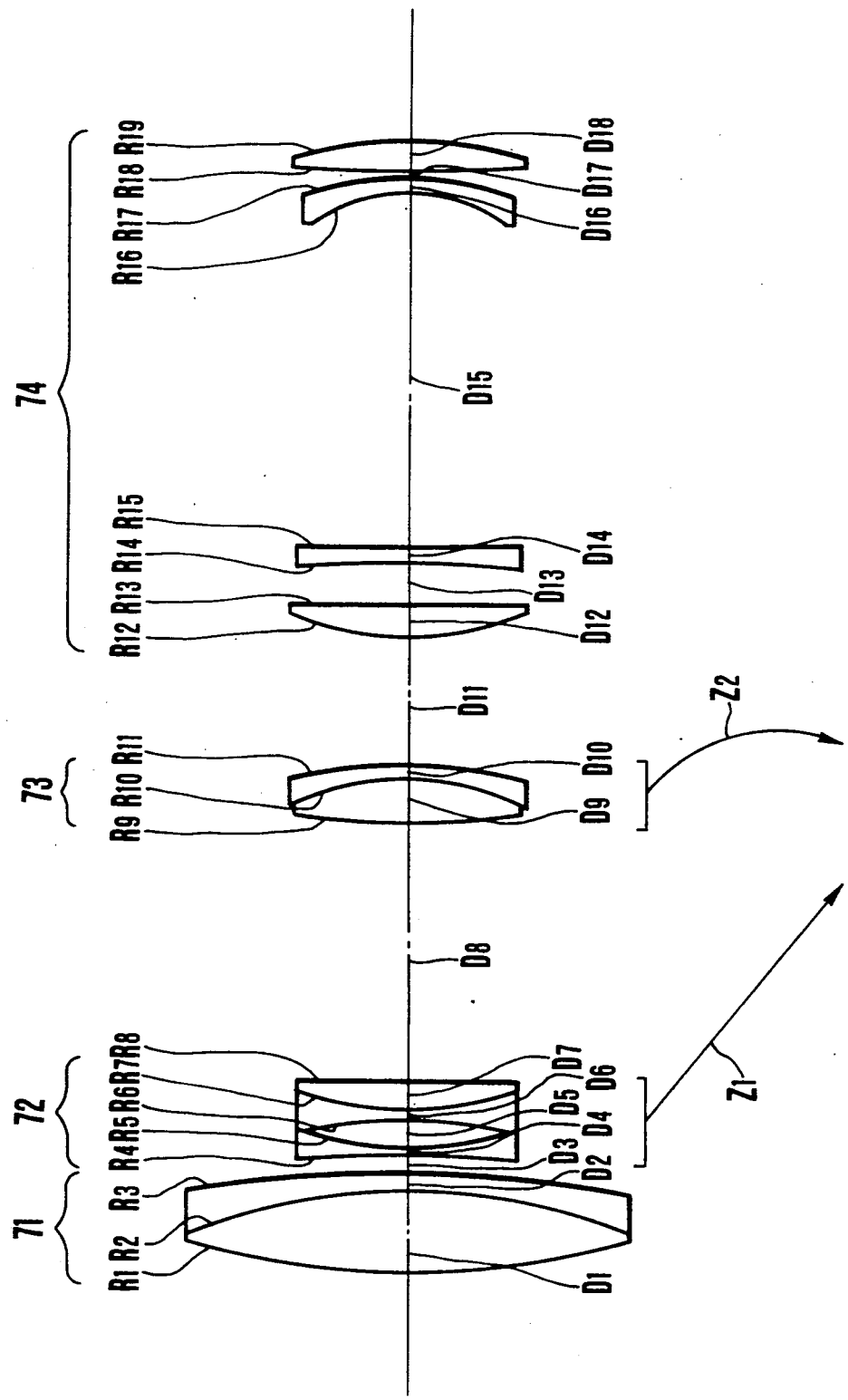
Figure 14A:
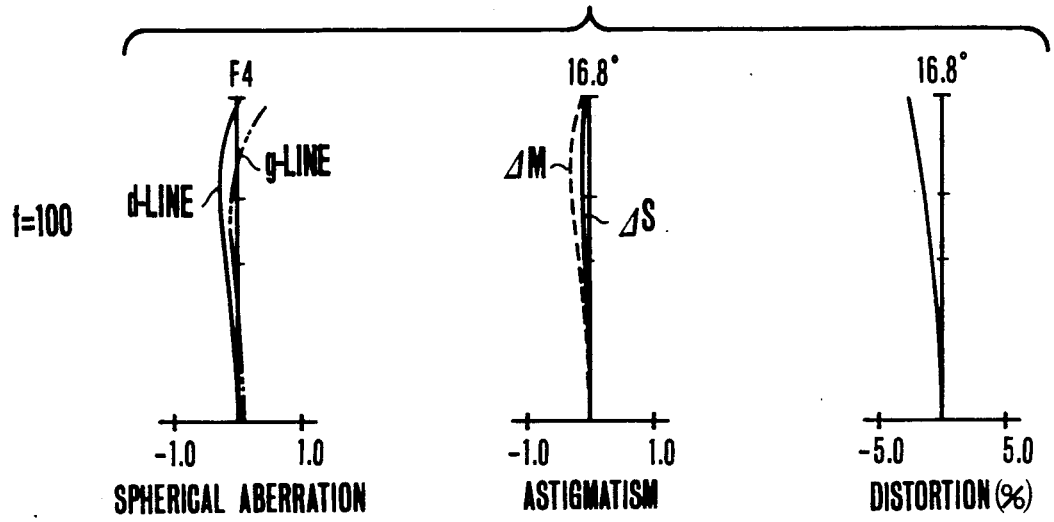
Figure 14B:
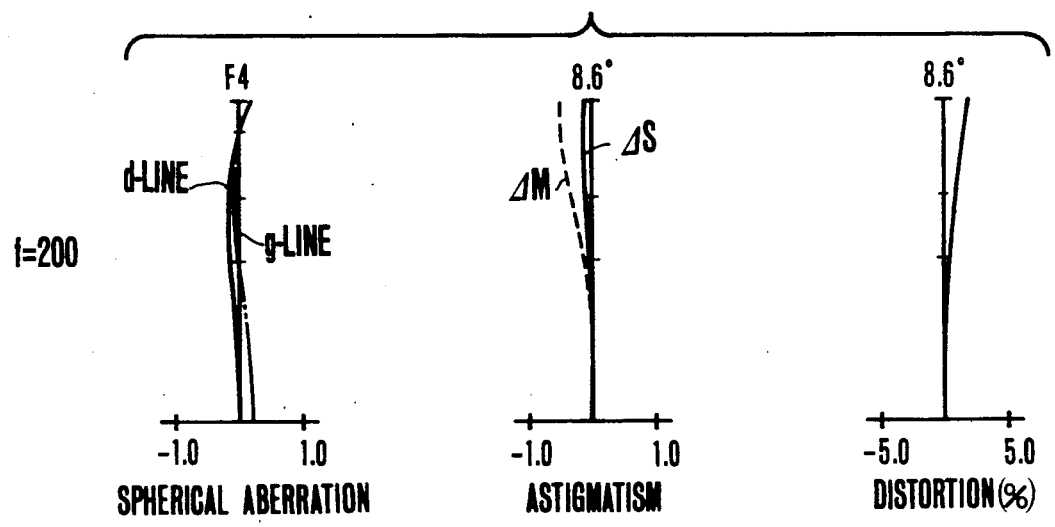
Figure 14C:
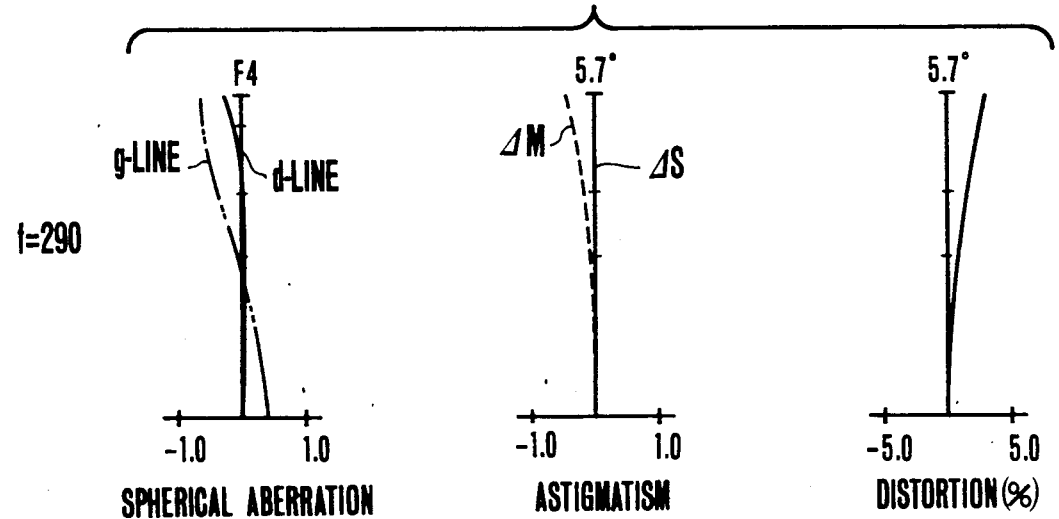

A seventh example is illustrated in FIG. 13 (of which the numerical date are given in Numerical Example 7). This zoom lens comprises, from front to rear, a positive first lens unit 71, a negative second lens unit 72, a positive third lens unit 73 and a positive fourth lens unit 74, whereby the first unit 71 is provided with an axial type refractive index distributive lens. In more detail, this lens constitutes the first lens element of the first unit and has a bi-convex form in which the distribution of refractive indices along the optical axis has a minimum at an intermediate point of 3.66 mm as measured from the vertex of the first surface R1. As the first and second surfaces R1 and R2 are approached from this point, the refractive index increases.

While it is customary to construct the first unit from three lens elements, the invention makes it possible that only one doublet suffices. This is because, with such refractive index distribution, when the surface curvatures cut across the distribution, the exposed areas have progressively lower values of refractive index as the height from the optical axis increases, thereby an effect of correcting spherical aberration and coma is produced.

Since the first unit 71, because of its having a far larger diameter than those of the other units, accounts for a large proportion of the total weight, the achievement of the possibility of only one cemented lens sufficing for constructing it leads to a great advantage in the reduction of the total weight. Also, the overall thickness of the first unit 71 can be decreased. Therefore, to admit of as large oblique beam as the axial beam, a reduced diameter of the first unit suffices. This leads to reduce the diameter of the outer lens barrel and the filter for use therewith.

Figure 15:
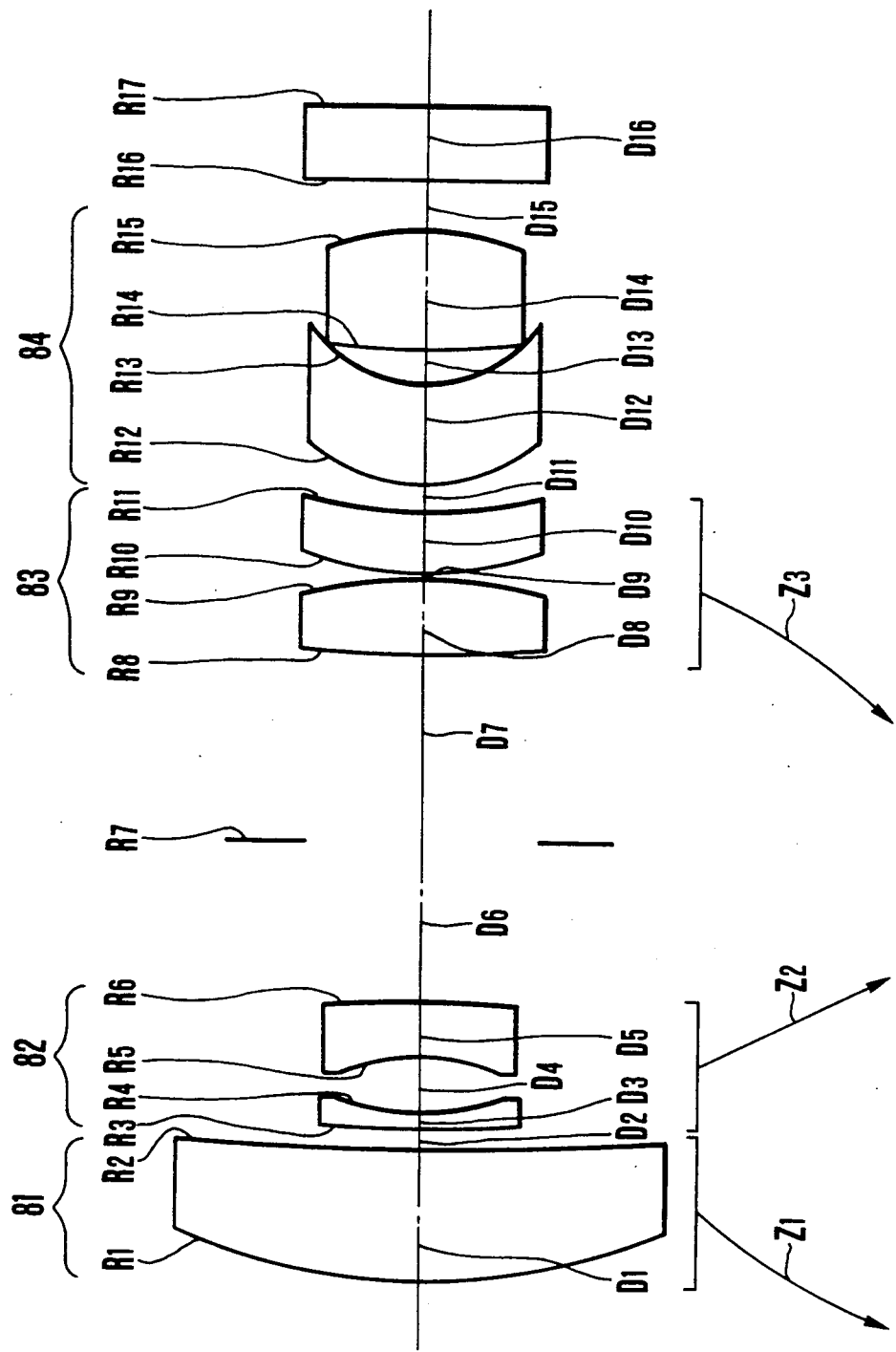
Figure 16A:
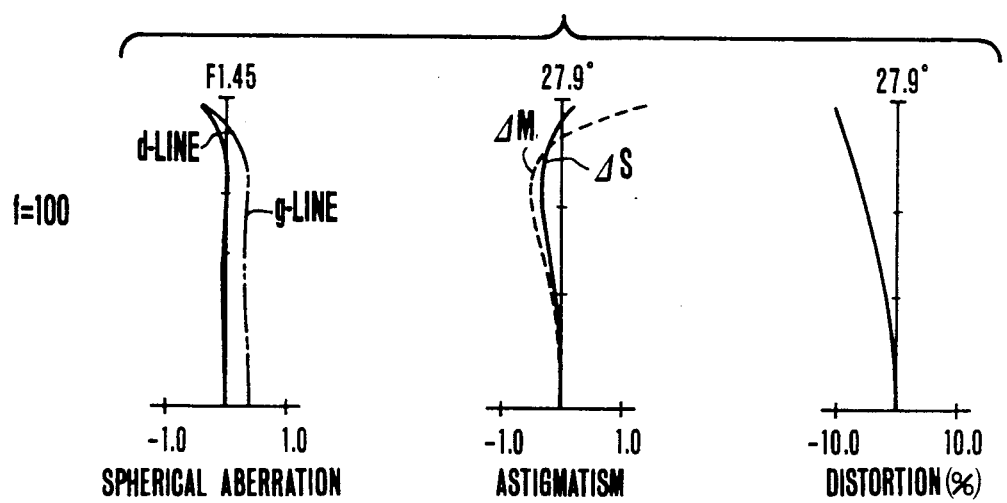
Figure 16B:
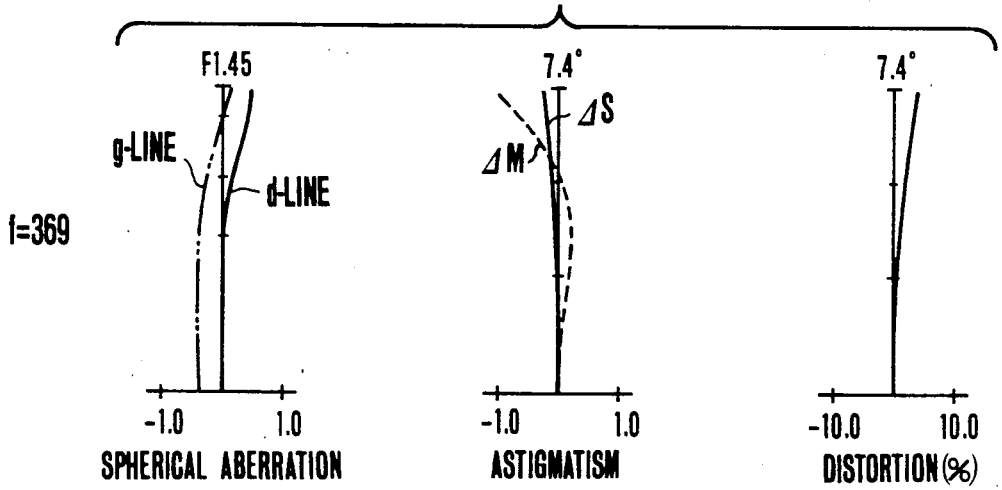
Figure 16C:
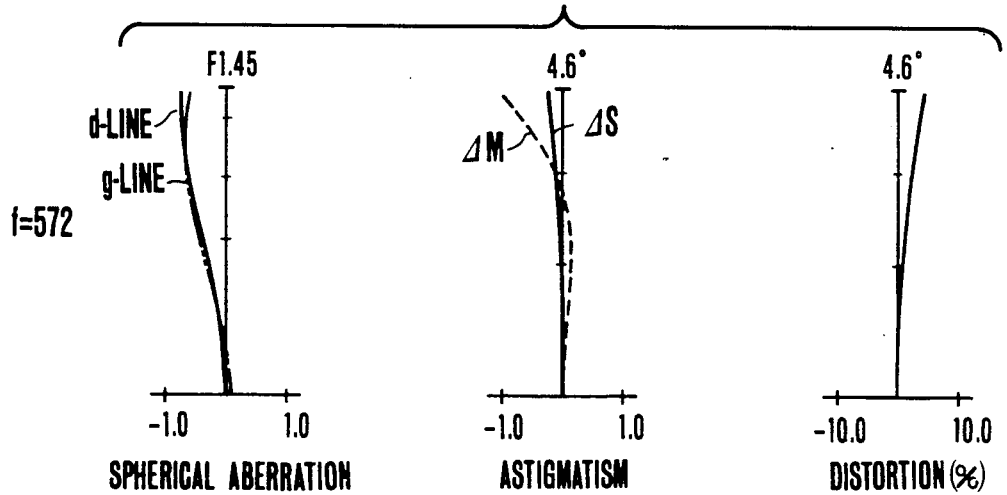

An eighth example of a zoom lens is illustrated in FIG. 15 (of which the numerical data are given in Numerical Example 8) wherein each unit includes at least one radial type refractive index distributive lens. Positive first, negative second, positive third and positive fourth lens units 81 to 84 are arranged on a common optical axis in this order from the front, and the first three units 81 to 83 move axially in differential relation to effect zooming.

In the past, for this type zoom lens, the first three units each are included with three lens elements, and the last unit with about four elements to facilitate aberration correction. By using the refractive index distribution type lens in each unit, the amounts of aberration characteristic of the individual units can be reduced, and the number of lens elements in each unit can be also reduced. Also, by cancelling the aberrations associated with the powers of the units, the aberrations are maintained stable during zooming.

Next, the numerical data of the examples 1 to 8 are presented in Numerical Examples 1 to 8 for the radii of curvature, R, the axial thicknesses or air separations, D, and the refractive indices, N, and Abbe numbers, $\nu$, of the glasses of the various lens elements with subscripts numbered consecutively from front to rear, where $N_i$ (h) and $N_i$ (x) represent the distribution of refractive indices in the interior of the i-th lens element along the radius or the optical axis, respectively, wherein h is the height from the optical axis, and x is the axial distance measured from the vertex or bevel of the front surface of that lens, $N_0$ is the refractive index at the vertex or bevel of the front surface of the lens element, and $N_1$, $N_2$, $N_3$ . . . . are the coefficients in the second, third, fourth . . . terms of the formula for the distribution of refractive indices.

Numerical Example 1

F = 100.0–304.5  FNO = 1:4  $2\omega$ = 34.34°–11.6°

| | | | |
|---|---|---|---|
| R1 = 210.378 | D1 = 3.90 | N1 = 1.80518 | $\nu$1 = 25.4 |
| R2 = 95.402 | D2 = 9.40 | N2 = 1.61272 | $\nu$2 = 58.7 |
| R3 = −4243.836 | D3 = 0.14 | | |
| R4 = 135.346 | D4 = 6.68 | N3 = 1.61272 | $\nu$3 = 58.7 |
| R5 = −2643.187 | D5 = Variable | | |
| R6 = −279.005 | D6 = 10.53 | N4 = N4 (h) | |
| R7 = 258.188 | D7 = Variable | | |
| R8 = 133.470 | D8 = 8.08 | N5 = 1.51633 | $\nu$5 = 64.1 |
| R9 = −46.653 | D9 = 2.09 | N6 = 1.75520 | $\nu$6 = 27.5 |
| R10 = −84.501 | D10 = Variable | | |
| R11 = 49.541 | D11 = 6.27 | N7 = 1.71300 | $\nu$7 = 55.2 |
| R12 = 1079.685 | D12 = 1.11 | | |
| R13 = −380.726 | D13 = 2.78 | N8 = 1.80518 | $\nu$8 = 25.4 |
| R14 = 271.435 | D14 = 64.41 | | |
| R15 = −25.406 | D15 = 2.78 | N9 = 1.76200 | $\nu$9 = 40.1 |
| R16 = −72.472 | D16 = 0.28 | | |
| R17 = 227.126 | D17 = 5.01 | N10 = 1.59551 | $\nu$10 = 30.5 |
| R18 = −75.129 | | | |

| | f | 100 | 200 | 304.5 |
|---|---|---|---|---|
| | D5 | 2.7787 | 47.8801 | 63.3781 |
| | D7 | 51.0469 | 26.2032 | 0.2132 |
| | D10 | 23.2531 | 2.9954 | 13.4873 |

N4 (h) = $N_0 + N_1 h^2 + N_2 h^4 + N_3 h^6 +$

| | $N_0$ | $N_1$ | $N_2$ | $N_3$ |
|---|---|---|---|---|
| N4 (h) | 1.47069 | 8.0759 × 10$^{-4}$ | −3.1382 × 10$^{-7}$ | 8.9457 × 10$^{-11}$ |
| g-line | 1.47925 | 8.0465 × 10$^{-4}$ | −3.1744 × 10$^{-7}$ | 9.5646 × 10$^{-11}$ |

Numerical Example 2

F = 100–283  FNO = 1:3.5–4.5  $2\omega$ = 62°–24°

| | | | |
|---|---|---|---|
| R1 = 407.459 | D1 = 6.94 | N1 = 1.80518 | $\nu$1 = 25.4 |
| R2 = 137.500 | D2 = 25.00 | N2 = 1.60311 | $\nu$2 = 60.7 |
| R3 = −1037.545 | D3 = 0.33 | | |
| R4 = 127.463 | D4 = 16.39 | N3 = 1.69680 | $\nu$3 = 55.5 |
| R5 = 614.861 | D5 = Variable | | |
| R6 = 468.216 | D6 = 15.25 | N4 = N4 (h) | |
| R7 = 39.286 | D7 = 13.44 | | |
| R8 = 967.214 | D8 = 22.92 | N5 = N5 (h) | |
| R9 = −669.488 | D9 = Variable | | |
| R10 = Stop | D10 = 2.78 | | |
| R11 = 217.164 | D11 = 8.89 | N6 = 1.77250 | $\nu$6 = 49.6 |
| R12 = −223.324 | D12 = 1.06 | | |
| R13 = 62.499 | D13 = 7.50 | N7 = 1.59551 | $\nu$7 = 39.2 |
| R14 = 127.754 | D14 = 13.39 | | |
| R15 = 53.560 | D15 = 15.86 | N8 = 1.51742 | $\nu$8 = 52.4 |
| R16 = −410.952 | D16 = 12.36 | N9 = 1.84666 | $\nu$9 = 23.9 |
| R17 = 40.082 | D17 = 10.22 | | |
| R18 = 256.491 | D18 = 8.33 | N10 = 1.67003 | $\nu$10 = 47.3 |
| R19 = −127.251 | D19 = Variable | | |
| R20 = Movable stopper | D20 = Variable | | |
| R21 = −113.395 | D21 = 3.33 | N11 = 1.77250 | $\nu$11 = 49.6 |
| R22 = 227.778 | D22 = 8.06 | N12 = 1.51742 | $\nu$12 = 52.4 |
| R23 = −426.515 | D23 = 6.92 | | |

-continued

| R24 = 392.060 | D24 = 15.00 | N13 = 1.62279 | $\nu 13$ = 58.2 |
| R25 = −103.840 | | | |

| | f | 100 | 167 | 283 |
|---|---|---|---|---|
| | D5 | 4.06 | 33.33 | 56.32 |
| | D9 | 48.63 | 27.00 | 3.14 |
| | D19 | 3.16 | 14.45 | 18.09 |
| | D20 | 11.11 | 21.44 | 41.67 |

$$Ni(h) = N_0 + N_1 h^2 + N_2 h^4 + N_3 h^6 + N_4 h^8 + \ldots$$

| | $N_0$ | $N_1$ | $N_2$ | $N_3$ | $N_4$ |
|---|---|---|---|---|---|
| N4 (h) | 1.58646 | $2.395 \times 10^{-4}$ | $-9.34648 \times 10^{-8}$ | $5.07906 \times 10^{-11}$ | $-1.16755 \times 10^{-14}$ |
| N5 (h) | 1.85 | $1.47898 \times 10^{-5}$ | $-6.09657 \times 10^{-8}$ | $-1.52336 \times 10^{-11}$ | $-1.97975 \times 10^{-14}$ |

Numerical Example 3

F = 100–200   FNO = 1:3.5–4.5   $2\omega = 63.44°–34.35°$

| R1 = 79.442 | D1 = 4.27 | N1 = 1.69680 | $\nu 1$ = 55.5 |
| R2 = 45.721 | D2 = 25.58 | N2 = 1.69680 | $\nu 2$ = 55.5 |
| R3 = −223.812 | D3 = 3.72 | | |
| R4 = 458.898 | D4 = 1.10 | | |
| R5 = 69.535 | D5 = 7.35 | N3 = 1.75520 | $\nu 3$ = 27.5 |
| R6 = 98.647 | D6 = Variable | | |
| R7 = 63.894 | D7 = 19.38 | N4 = N4 (h) | |
| R8 = 182.790 | D8 = 22.76 | | |
| R9 = 253.153 | D9 = 7.28 | N5 = N5 (h) | |
| R10 = −3226.156 | D10 = Variable | | |
| R11 = 1408.323 | D11 = 4.13 | N6 = 1.48749 | $\nu 6$ = 70.2 |
| R12 = 264.158 | | | |

| | f | 100 | 140 | 200 |
|---|---|---|---|---|
| | D6 | 77.0198 | 39.0995 | 10.6593 |
| | D10 | 4.9553 | 27.9256 | 62.3810 |

$$Ni(h) = N_0 + N_1 h^2 + N_2 h^4 + N_3 h^6 + N_4 h^8 + \ldots$$

| | $N_0$ | $N_1$ | $N_2$ | $N_3$ | $N_4$ |
|---|---|---|---|---|---|
| N4 (h) | 1.63854 | $-1.59742 \times 10^{-4}$ | $-6.11417 \times 10^{-8}$ | $-2.20806 \times 10^{-11}$ | $-1.40928 \times 10^{-14}$ |
| g-line | 1.65292 | $-1.57014 \times 10^{-4}$ | $-6.20127 \times 10^{-8}$ | $-1.15164 \times 10^{-11}$ | $-2.18006 \times 10^{-14}$ |
| N5 (h) | 1.58313 | $3.53334 \times 10^{-4}$ | $3.46552 \times 10^{-7}$ | $2.07317 \times 10^{-10}$ | $1.51309 \times 10^{-13}$ |
| g-line | 1.59529 | $3.59411 \times 10^{-4}$ | $3.8565 \times 10^{-7}$ | $4.5463 \times 10^{-12}$ | $4.54978 \times 10^{-13}$ |

Numerical Example 4

F = 100–150   FNO = 1:4.5–5.6   $2\omega = 56.8°–39.7°$

| R1 = 75.929 | D1 = 6.87 | N1 = N1 (h) | |
| R2 = 125.570 | D2 = 5.85 | | |
| R3 = −101.074 | D3 = 7.88 | N2 = 1.71736 | $\nu 2$ = 29.5 |
| R4 = 268.591 | D4 = 9.52 | | |
| R5 = 495.805 | D5 = 3.75 | N3 = 1.69680 | $\nu 3$ = 56.5 |
| R6 = −48.717 | D6 = Variable | | |
| R7 = 159.933 | D7 = 5.00 | N4 = 1.60311 | $\nu 4$ = 60.7 |
| R8 = 97.420 | D8 = 22.79 | | |
| R9 = −33.692 | D9 = 3.75 | N5 = 1.61800 | $\nu 5$ = 63.4 |
| R10 = −82.971 | | | |

| | f | 100 | 125 | 150 |
|---|---|---|---|---|
| | D6 | 33.8 | 19.4 | 9.7 |

$$N1(h) = N_0 + N_1 h^2 + N_2 h^4 + N_3 h^6 + \ldots$$

| | $N_0$ | $N_1$ | $N_2$ | $N_3$ |
|---|---|---|---|---|
| N1 (h) | 1.77250 | $-2.00139 \times 10^{-4}$ | $5.03496 \times 10^{-8}$ | $3.40355 \times 10^{-10}$ |
| g-line | 1.79193 | $-2.00139 \times 10^{-4}$ | $5.03496 \times 10^{-8}$ | $3.40355 \times 10^{-10}$ |

Numerical Example 5

F = 100–570   FNO = 1:1.22–1.39   $2\omega = 49°–9°$

| R1 = 1656.780 | D1 = 22.73 | N1 = 1.80518 | $\nu 1$ = 25.4 |
| R2 = 460.895 | D2 = 92.04 | N2 = 1.60311 | $\nu 2$ = 60.7 |
| R3 = −1206.452 | D3 = 1.70 | | |
| R4 = 355.491 | D4 = 51.14 | N3 = 1.69680 | $\nu 3$ = 55.5 |
| R5 = 1154.930 | D5 = Variable | | |
| R6 = 971.150 | D6 = 11.36 | N4 = 1.77250 | $\nu 4$ = 49.6 |
| R7 = 155.806 | D7 = 43.84 | | |
| R8 = −202.438 | D8 = 11.36 | N5 = 1.73500 | $\nu 5$ = 49.8 |
| R9 = 213.710 | D9 = 36.36 | N6 = 1.84666 | $\nu 6$ = 23.9 |
| R10 = −2717.151 | D10 = Variable | | |
| R11 = −276.943 | D11 = 11.36 | N7 = 1.69680 | $\nu 7$ = 55.5 |
| R12 = 15112.843 | D12 = Variable | | |
| R13 = 621.683 | D13 = 47.73 | N8 = 1.71300 | $\nu 8$ = 53.8 |
| R14 = −310.849 | D14 = 2.27 | | |
| R15 = ∞ | D15 = 68.18 | N9 = 1.51633 | $\nu 9$ = 64.1 |
| R16 = ∞ | D16 = 77.84 | | |

-continued

| | | |
|---|---|---|
| R17 = 196.329 | D17 = 30.11 | N10 = N10 (x) |
| R18 = 345.805 | D18 = 215.91 | |
| R19 = 471.294 | D19 = 12.50 | N11 = 1.80518    $\nu11 = 25.4$ |
| R20 = 128.728 | D20 = 30.68 | |
| R21 = 477.444 | D21 = 34.09 | N12 = 1.51633    $\nu12 = 64.1$ |
| R22 = −332.339 | D22 = 1.14 | |
| R23 = 115.479 | D23 = 44.32 | N13 = 1.72000    $\nu13 = 50.2$ |
| R24 = 1068.278 | D24 = 22.73 | |
| R25 = ∞ | D25 = 62.50 | N14 = 1.51633    $\nu14 = 64.1$ |
| R26 = ∞ | | |

| f | 100 | 280 | 570 |
|---|---|---|---|
| D5 | 21.50 | 196.44 | 269.14 |
| D10 | 257.50 | 60.72 | 29.30 |
| D12 | 37.91 | 59.75 | 18.47 |

$$N10(x) = N_0 + N_1 x + N_2 x^2 + N_3 x^3 +$$

| | $\lambda$ | $N_0$ | $N_1$ | $N_2$ | $N_3$ |
|---|---|---|---|---|---|
| N10 (x) | d | 1.88867D+00 | −4.15256D−03 | −1.53134D−05 | 2.05803D−07 |

Numerical Example 6

F = 100–570   FNO = 1:1.22–1.39   $2\omega = 49°–9°$

| | | | |
|---|---|---|---|
| R1 = 1656.780 | D1 = 22.73 | N1 = 1.80518 | $\nu1 = 25.4$ |
| R2 = 460.895 | D2 = 92.04 | N2 = 1.60311 | $\nu2 = 60.7$ |
| R3 = −1206.452 | D3 = 1.70 | | |
| R4 = 355.491 | D4 = 51.14 | N3 = 1.69680 | $\nu3 = 55.5$ |
| R5 = 1154.930 | D5 = Variable | | |
| R6 = 971.149 | D6 = 11.36 | N4 = 1.77250 | $\nu4 = 49.6$ |
| R7 = 155.806 | D7 = 43.84 | | |
| R8 = −202.438 | D8 = 11.36 | N5 = 1.73500 | $\nu5 = 49.8$ |
| R9 = 213.710 | D9 = 36.36 | N6 = 1.84666 | $\nu6 = 23.9$ |
| R10 = −2717.151 | D10 = Variable | | |
| R11 = −276.943 | D11 = 11.36 | N7 = 1.69680 | $\nu7 = 55.5$ |
| R12 = 15112.844 | D12 = Variable | | |
| R13 = 621.683 | D13 = 47.73 | N8 = 1.71300 | $\nu8 = 53.8$ |
| R14 = −310.849 | D14 = 2.27 | | |
| R15 = 0.0 | D15 = 68.18 | N9 = 1.51633 | $\nu9 = 64.1$ |
| R16 = 0.0 | D16 = 77.84 | | |
| R17 = 188.081 | D17 = 129.89 | N10 = N10 (h) | |
| R18 = 130.653 | D18 = 160.23 | | |
| R19 = 436.232 | D19 = 12.50 | N11 = 1.80518 | $\nu11 = 25.4$ |
| R20 = 191.471 | D20 = 30.68 | | |
| R21 = 1800.375 | D21 = 34.09 | N12 = 1.51633 | $\nu12 = 64.1$ |
| R22 = −204.201 | D22 = 1.14 | | |
| R23 = 125.316 | D23 = 51.14 | N13 = 1.72000 | $\nu13 = 50.2$ |
| R24 = 1653.314 | D24 = 14.77 | | |
| R25 = 0.0 | D25 = 62.50 | N14 = 1.51633 | $\nu14 = 64.1$ |
| R26 = 0.0 | | | |

| f | 100 | 280 | 570 |
|---|---|---|---|
| D5 | 21.50 | 196.44 | 269.14 |
| D10 | 257.50 | 60.72 | 29.30 |
| D12 | 37.91 | 59.75 | 18.47 |

$$N10(h) = N_0 + N_1 h^2 + N_2 h^4 + N_3 h^6 + N_4 h^8 + N_5 h^{10}$$

| | $\lambda$ | $N_0$ | $N_1$ | $N_2$ | $N_3$ | $N_4$ | $N_5$ |
|---|---|---|---|---|---|---|---|
| N10 (h) | d | 1.8457 | −5.76408 × 10$^{-6}$ | 6.72888 × 10$^{-11}$ | 1.83029 × 10$^{-15}$ | 6.51016 × 10$^{-20}$ | 6.69015 × 10$^{-24}$ |
| | g | 1.86557 | −5.45905 × 10$^{-6}$ | 8.8922 × 10$^{-11}$ | 8.24188 × 10$^{-16}$ | 1.50515 × 10$^{-20}$ | 1.51127 × 10$^{-23}$ |

Numerical Example 7

F = 100–290   FNO-1:4   $2\omega = 33.6°–11.4°$

| | | | |
|---|---|---|---|
| R1 = 128.849 | D1 = 15.13 | N1 = N1 (x) | |
| R2 = −96.127 | D2 = 3.34 | N2 = 1.80518 | $\nu2 = 25.4$ |
| R3 = −201.366 | D3 = Variable | | |
| R4 = −955.234 | D4 = 2.09 | N3 = 1.71300 | $\nu3 = 53.8$ |
| R5 = 61.318 | D5 = 5.19 | | |
| R6 = −72.719 | D6 = 2.09 | N4 = 1.71300 | $\nu4 = 53.8$ |
| R7 = 58.598 | D7 = 4.73 | N5 = 1.84666 | $\nu5 = 23.9$ |
| R8 = 1250.516 | D8 = Variable | | |
| R9 = 140.050 | D9 = 8.08 | N6 = 1.51633 | $\nu6 = 64.1$ |
| R10 = −44.832 | D10 = 2.09 | N7 = 1.75520 | $\nu7 = 27.5$ |
| R11 = −81.014 | D11 = Variable | | |
| R12 = 52.943 | D12 = 6.27 | N8 = 1.61272 | $\nu8 = 56.8$ |
| R13 = −6049.180 | D13 = 7.71 | | |
| R14 = −219.080 | D14 = 2.78 | N9 = 1.80518 | $\nu9 = 25.4$ |
| R15 = 1076.434 | D15 = 63.62 | | |
| R16 = −28.135 | D16 = 2.78 | N10 = 1.80610 | $\nu10 = 40.9$ |
| R17 = −58.485 | D17 = 0.28 | | |
| R18 = 311.033 | D18 = 5.01 | N11 = 1.59551 | $\nu11 = 37.9$ |
| R19 = −75.128 | | | |

-continued

| | f | 100 | 200 | 290 |
|---|---|---|---|---|
| | D3 | 2.6089 | 47.7099 | 61.7243 |
| | D8 | 47.4855 | 22.6420 | 0.2602 |
| | D11 | 23.2529 | 2.9954 | 11.3628 |

$N1(x) = N_0 + N_1 x + N_2 x^2 + N_3 x^3 + \ldots$

| | $\lambda$ | $N_0$ | $N_1$ | $N_2$ | $N_3$ |
|---|---|---|---|---|---|
| N1 (x) | d | 1.60311E+00 | −1.51742E−03 | 2.29202E−04 | −3.95658E−06 |
| | g | 1.61639E+00 | −1.39973E−03 | 2.59689E−04 | −6.43431E−06 |

Numerical Example 8

F = 100–572  FNO = 1:1.45  $2\omega = 56°$–$9°$

| R1 = 446.123 | D1 = 99.17 | N1 = N1 (h) | |
|---|---|---|---|
| R2 = 2649.779 | D2 = Variable | | |
| R3 = 1043.807 | D3 = 10.63 | N2 = 1.77250 | $\nu 2 = 49.6$ |
| R4 = 159.259 | D4 = 43.64 | | |
| R5 = −160.191 | D5 = 40.94 | N3 = N3 (h) | |
| R6 = −1045.559 | D6 = Variable | | |
| R7 = Stop | D7 = Variable | | |
| R8 = 679.794 | D8 = 55.75 | N4 = N4 (h) | |
| R9 = −303.562 | D9 = 1.77 | | |
| R10 = 225.927 | D10 = 44.79 | N5 = 1.77250 | $\nu 5 = 49.6$ |
| R11 = 284.834 | D11 = Variable | | |
| R12 = 137.785 | D12 = 73.07 | N6 = N6 (h) | |
| R13 = 99.455 | D13 = 26.53 | | |
| R14 = 693.588 | D14 = 89.26 | N7 = N7 (h) | |
| R15 = −190.268 | D15 = 35.42 | | |
| R16 = $\infty$ | D16 = 53.13 | N8 = 1.51633 | $\nu 8 = 64.1$ |
| R17 = $\infty$ | | | |

| | f | 100 | 369 | 572 |
|---|---|---|---|---|
| | D2 | 14.87 | 239.78 | 278.71 |
| | D6 | 118.50 | 40.80 | 7.50 |
| | D7 | 138.73 | 54.35 | 18.19 |
| | D11 | 22.14 | 106.51 | 142.68 |

$Ni(h) = N_0 + N_1 h^2 + N_2 h^4 + N_3 h^6 + \ldots$

| | | $N_0$ | $N_1$ | $N_2$ | $N_3$ |
|---|---|---|---|---|---|
| N1 (h) | d | 1.81182D+00 | −6.00021D−07 | −3.51092D−12 | −5.53931D−17 |
| | g | 1.83800D+00 | −3.18111D−07 | −1.13312D−12 | 2.17154D−17 |
| N3 (h) | d | 1.53465D+00 | 7.06614D−07 | −2.24893D−10 | 1.65903D−14 |
| | g | 1.55100D+00 | −1.14024D−06 | −1.06037D−10 | 9.15347D−15 |
| N4 (h) | d | 1.69768D+00 | 2.30497D−07 | 1.36939D−10 | 8.87318D−15 |
| | g | 1.71200D+00 | 4.90518D−07 | 1.39483D−10 | 1.03419D−14 |
| N6 (h) | d | 1.53812D+00 | 9.47272D−08 | 5.86644D−11 | 2.14576D−14 |
| | g | 1.55100D+00 | 1.18453D−06 | 1.40160D−10 | 1.77582D−14 |
| N7 (h) | d | 1.73480D+00 | 2.70463D−07 | 8.32279D−10 | −2.85730D−14 |
| | g | 1.75200D+00 | 6.79849D−07 | 7.44550D−10 | −1.78935D−14 |

Figure 17:
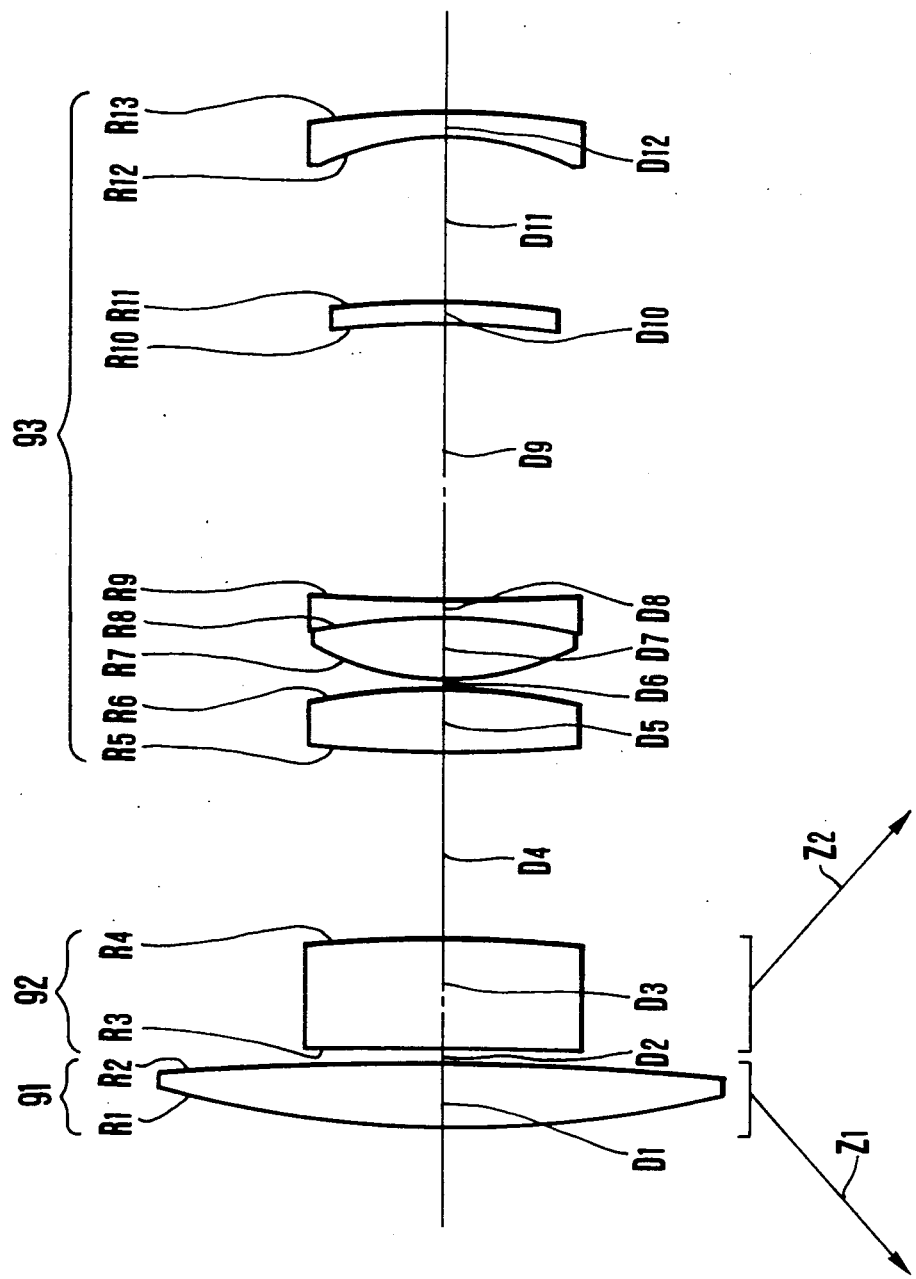
Figure 18A:
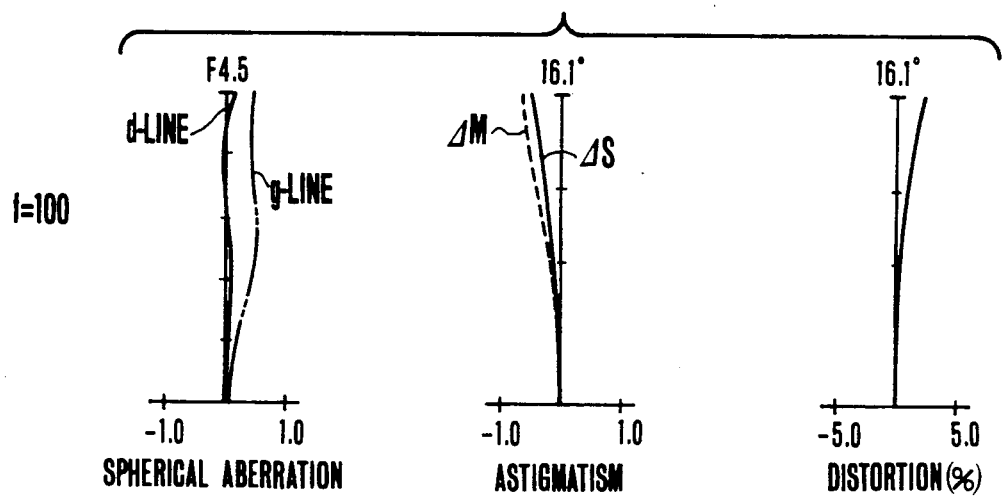
Figure 18B:
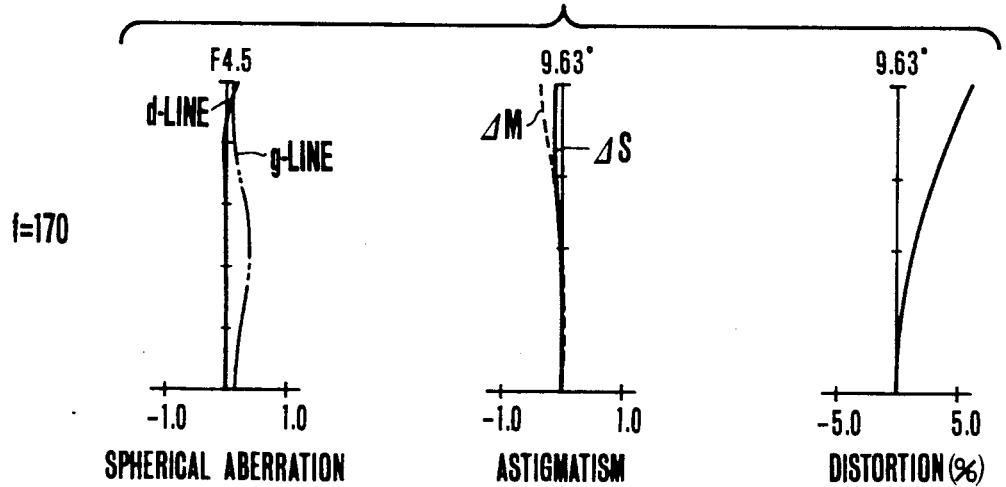
Figure 18C:
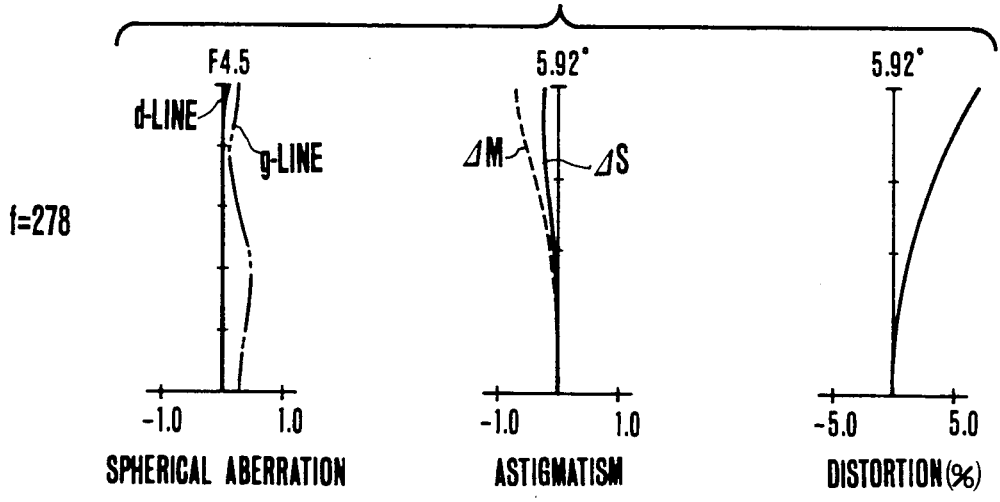

An example 9 of a specific zoom lens (FIG. 17) comprises, from front to rear, positive first, negative second and positive third lens units 91 to 93, the first and second units moving axially forward and rearward, respectively, as zooming goes from the wide angle to the telephoto end. In this example, the first unit 91 is constructed with a positive power-transit radial type refractive index distributive lens alone, and the second unit 92 with a negative power-transit radial type lens alone. Further, the third unit 93 has a first lens of negative, gentle powertransit refractive index distribution type, a second lens of the axial type in which the refractive index lowers as the distance from the front vertex increases, and a fourth lens of negative power-transit radial type, while its negative third and negative fifth lenses are made of homogeneous materials or conventional optical glasses.

If the negative second unit is otherwise made of a homogeneous material under the condition that the same power arrangement is in use, it would produce a Petzval sum of about −1.45 to −1.6 in terms of the focal length of the entire system normalized to unity. In this example of the invention, because of its using the radial type refractive index distributive lens, the Petzval sum takes as small a value of −9.6. Thanks to such a small value of the Petzval sum, the relay lens unit 93 is designed with a reduced telephoto ratio to achieve the much-desired reduction of the size of the entire system.

In more detail, the relay lens unit 93 is formed to the telephoto type by concentrating a strong positive power on the front part thereof, and a strong negative power on two negative lenses in the rear part so that the physical length of the relay unit and the back focal distance are very decreased. Thus, the optical total length of the entire system is reduced.

The refractive index distribution type lenses in the relay lens unit 93 have the following effects:

The first lens (radial type): The rear refracting surface is used for coma correction, and controlling the refractive index distribution in the interior has an effect of correcting spherical aberration as rays of light pass through the lens.

The second lens (axial type): The front surface affects spherical aberration and the rear surface, which is cemented with the front surface of the third lens, affects astigmatism.

The fourth lens (radial type): Aberrations are little affected, but it contributes to an increase in the negative power of the rear part of the relay lens unit, thus playing an important role in strengthening the tendency of the relay lens toward the telephoto form.

It should be noted that even if the second unit 92 is not of the refractive index distribution type, the idea of this example suffices for making shorter the total length of the zoom lens than was heretofore possible.

While the conventional zoom lens of the same dimensions as those of this, or ninth, example has a portableness evaluated in terms of the ratio of the total length when in the casing (wide angle setting) to the longest focal length as being 0.85 to 1, it is in this example that it is remarkably improved to as high as 0.57.

end, whereby the third unit 113 is provided with a radial type refractive index distributive lens.

The third unit 113 shares a large focal length varying action together with the second unit 112. To achieve an advance in the compactness, it is particularly necessary to impart a strong refractive power to the third unit. Therefore, aberrations are liable to be produce, and in the conventional case of homogeneous lenses alone, the number of constituent lenses had to be increased to 5 or more. Otherwise, the aberrations could not have been

Numerical Example 9

$F = 100\text{–}278 \quad FNO = 1:4.5 \quad 2\omega = 32.2°\text{–}11.85°$

| | | |
|---|---|---|
| R1 = 159.143 | D1 = 6.75 | N1 = N1 (h) |
| R2 = −381.190 | D2 = Variable | |
| R3 = 1873.490 | D3 = 12.43 | N2 = N2 (h) |
| R4 = −243.701 | D4 = Variable | |
| R5 = 209.766 | D5 = 7.30 | N3 = N3 (h) |
| R6 = −70.641 | D6 = 0.13 | |
| R7 = 31.505 | D7 = 7.06 | N4 = N4 (x) |
| R8 = −68.007 | D8 = 2.00 | N5 = 1.72151 $\quad \nu 5 = 29.2$ |
| R9 = 380.464 | D9 = 30.42 | |
| R10 = −123.304 | D10 = 2.47 | N6 = N6 (h) |
| R11 = −131.447 | D11 = 18.28 | |
| R12 = −31.934 | D12 = 2.67 | N7 = 1.51633 $\quad \nu 7 = 64.1$ |
| R13 = −103.180 | | |

| f | 100 | 170 | 278 |
|---|---|---|---|
| D2 | 0.3965 | 56.4888 | 87.6192 |
| D4 | 20.9019 | 12.9260 | 0.6204 |

$Ni(h) = N_0 + N_1 h^2 + N_2 h^4 + N_3 h^6 +$
$Ni(x) = N_0 + N_1 x + N_2 x^2 + N_3 x^3 +$

| | λ | $N_0$ | $N_1$ | $N_2$ | $N_3$ | $N_4$ |
|---|---|---|---|---|---|---|
| N1 (h) | d | 1.60311 | $-9.45773 \times 10^{-6}$ | $-1.20090 \times 10^{-9}$ | $-2.87995 \times 10^{-13}$ | $-2.28699 \times 10^{-15}$ |
| | g | 1.61539 | $-1.33548 \times 10^{-6}$ | $6.22841 \times 10^{-9}$ | $-5.76193 \times 10^{-12}$ | $-1.32980 \times 10^{-14}$ |
| N2 (h) | d | 1.51633 | $1.08705 \times 10^{-3}$ | $1.83549 \times 10^{-7}$ | $1.26698 \times 10^{-10}$ | $-1.79115 \times 10^{-13}$ |
| | g | 1.52621 | $1.08993 \times 10^{-3}$ | $1.74810 \times 10^{-7}$ | $1.11349 \times 10^{-10}$ | $-1.79676 \times 10^{-13}$ |
| N3 (h) | d | 1.60311 | $1.18829 \times 10^{-4}$ | $1.53801 \times 10^{-7}$ | $1.57096 \times 10^{-10}$ | $2.86113 \times 10^{-13}$ |
| | g | 1.61539 | $1.41201 \times 10^{-4}$ | $2.02562 \times 10^{-7}$ | $1.53610 \times 10^{-10}$ | $4.65397 \times 10^{-13}$ |
| N4 (x) | d | 1.60311 | $-7.67307 \times 10^{-3}$ | $3.03885 \times 10^{-4}$ | $-4.85189 \times 10^{-5}$ | 0 |
| | g | 1.61539 | $-7.51317 \times 10^{-3}$ | $3.08785 \times 10^{-4}$ | $-4.83811 \times 10^{-5}$ | |
| N6 (h) | d | 1.51633 | $5.60086 \times 10^{-4}$ | $2.14806 \times 10^{-4}$ | $1.59387 \times 10^{-9}$ | $-1.00448 \times 10^{-11}$ |
| | g | 1.52621 | $5.21233 \times 10^{-4}$ | $2.10216 \times 10^{-6}$ | $1.50194 \times 10^{-9}$ | $-1.04996 \times 10^{-11}$ |

Figure 19:
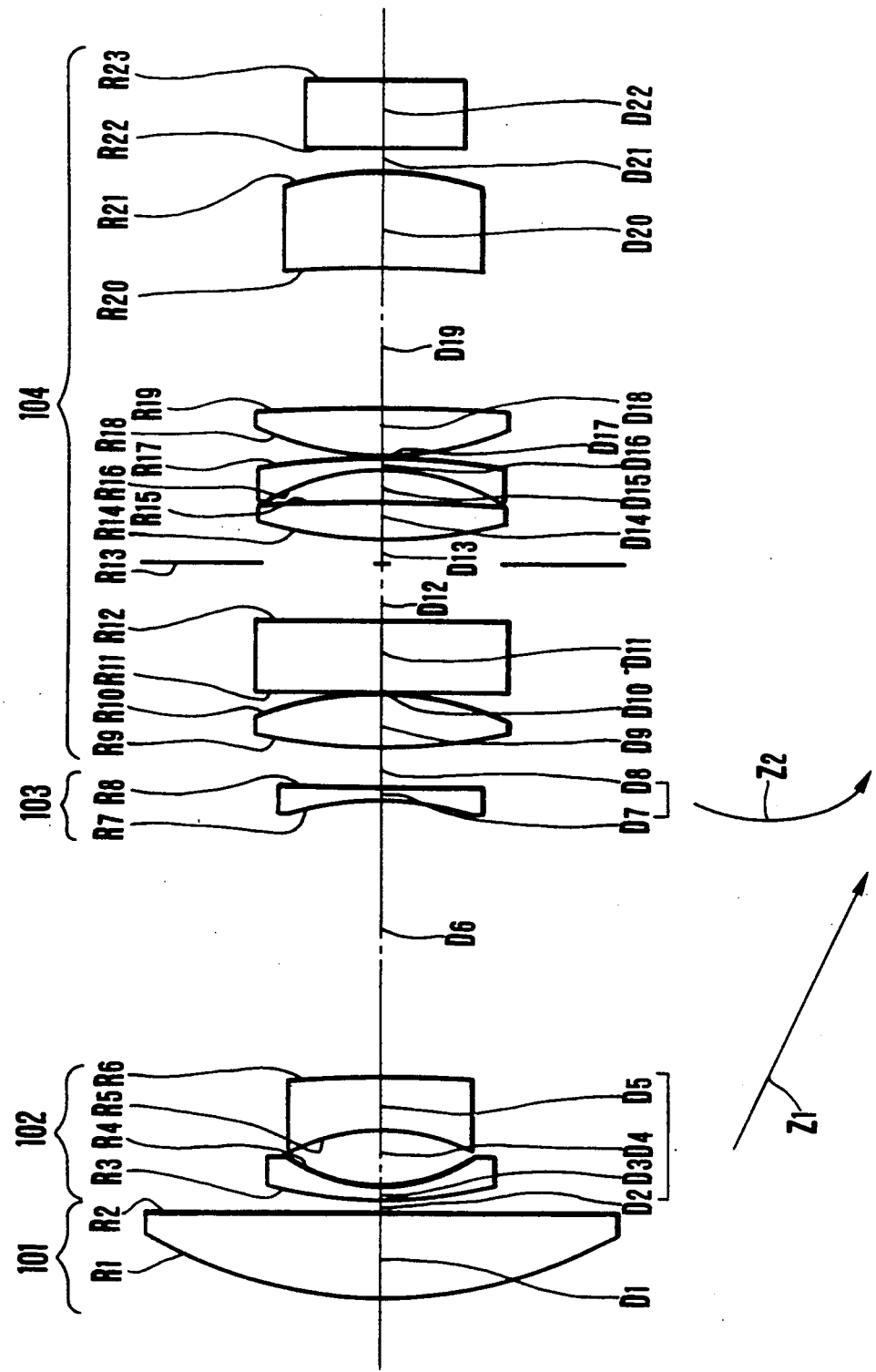
Figure 20A:
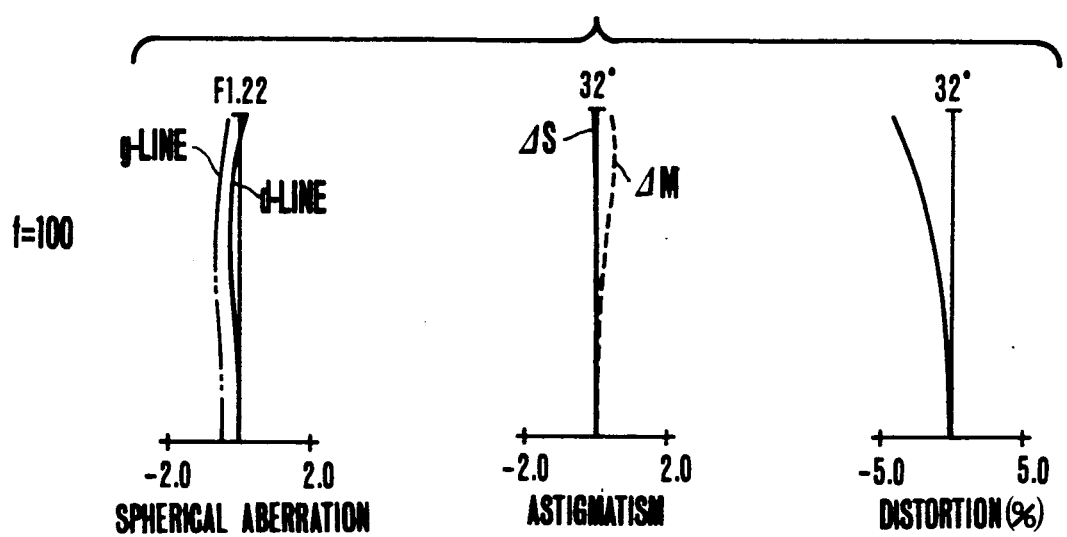
Figure 20B:
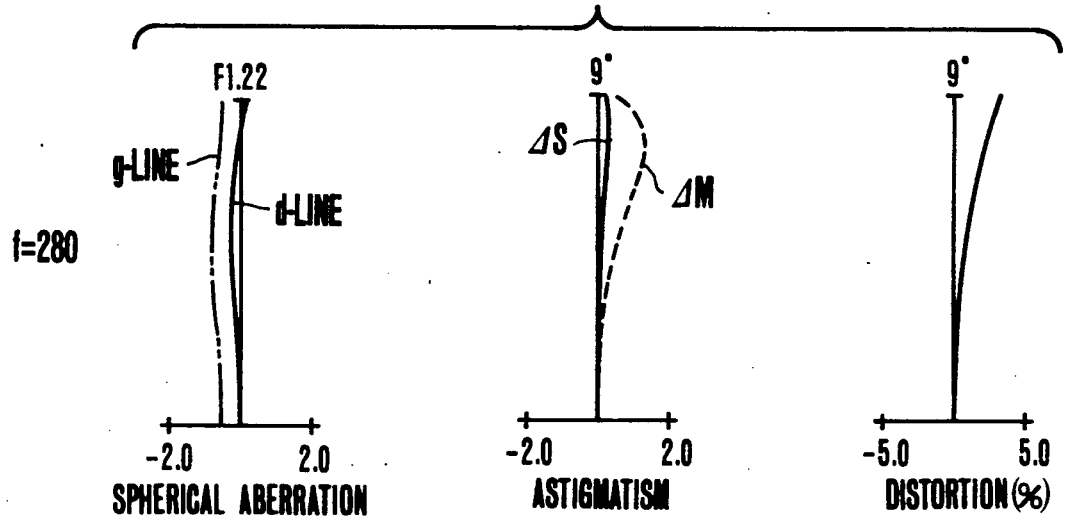
Figure 20C:
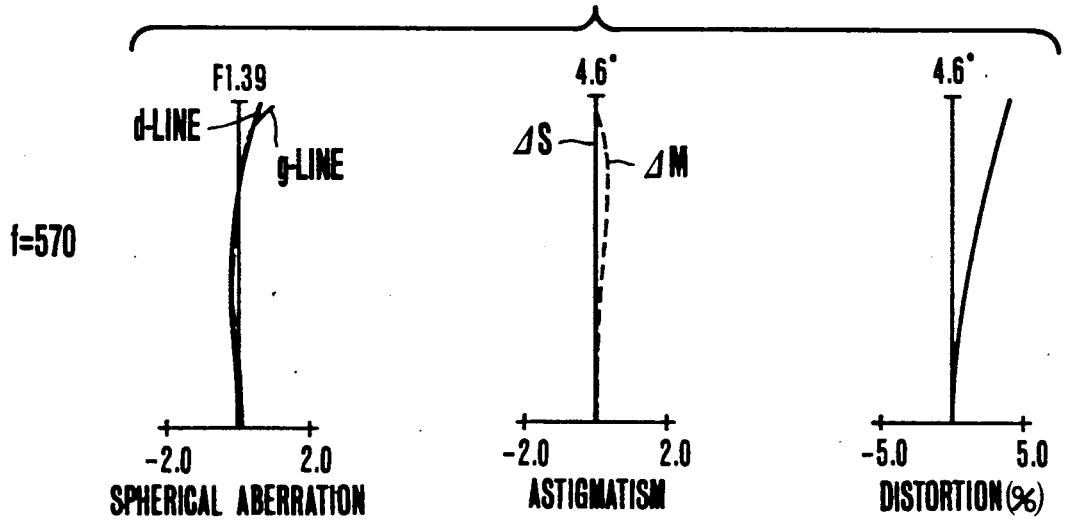

A tenth example of a specific zoom lens (FIG. 19) comprises, from front to rear, positive first, negative second (variator), negative third (compensator) and positive fourth (relay) lens units 101 to 104. The relay unit 104 includes an afocal lens in front of a diaphragm R13, and two beam splitters between R11 and R12, and between R22 and R23.

In this example, the first, second and fourth lens units are constructed each by using a radial type refractive index distributive lens, in the case of the fourth unit at the rear part thereof.

Figure 21:
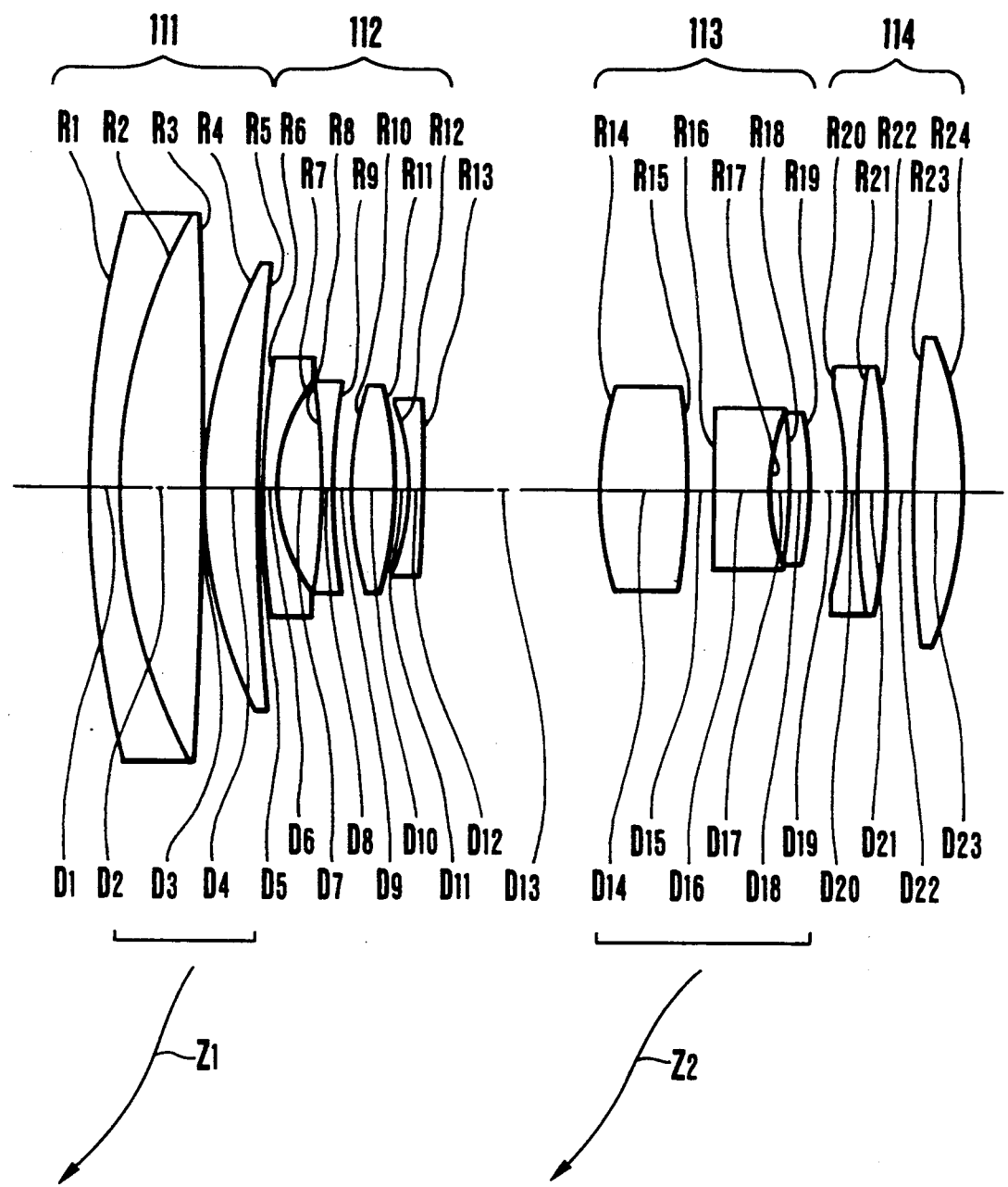
Figure 22A:
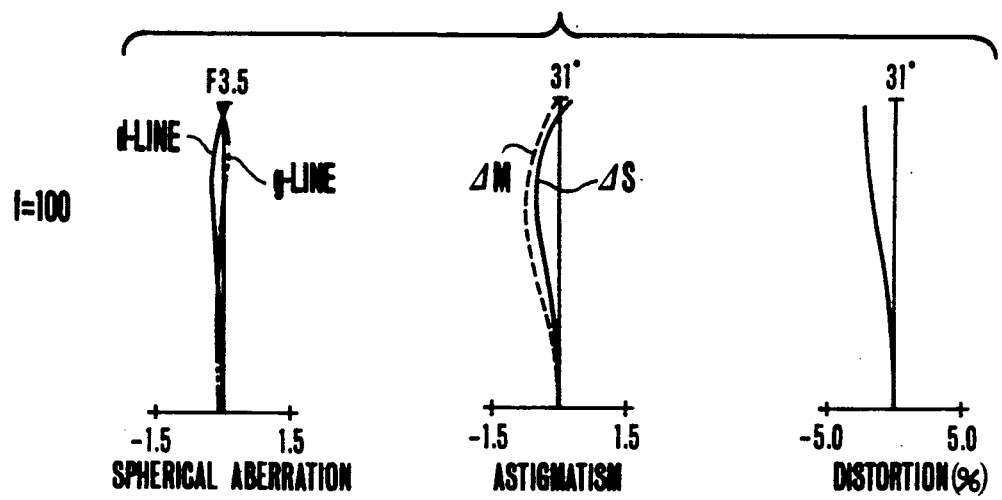
Figure 22B:
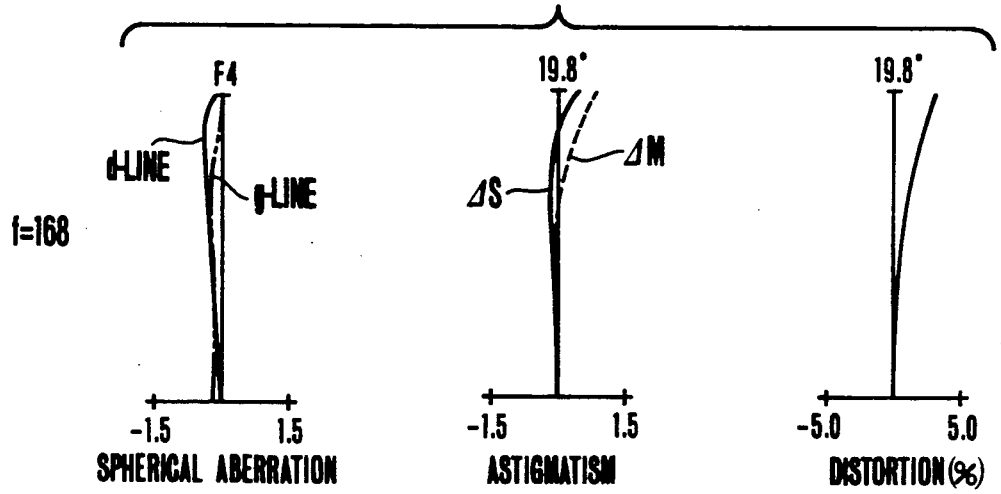
Figure 22C:
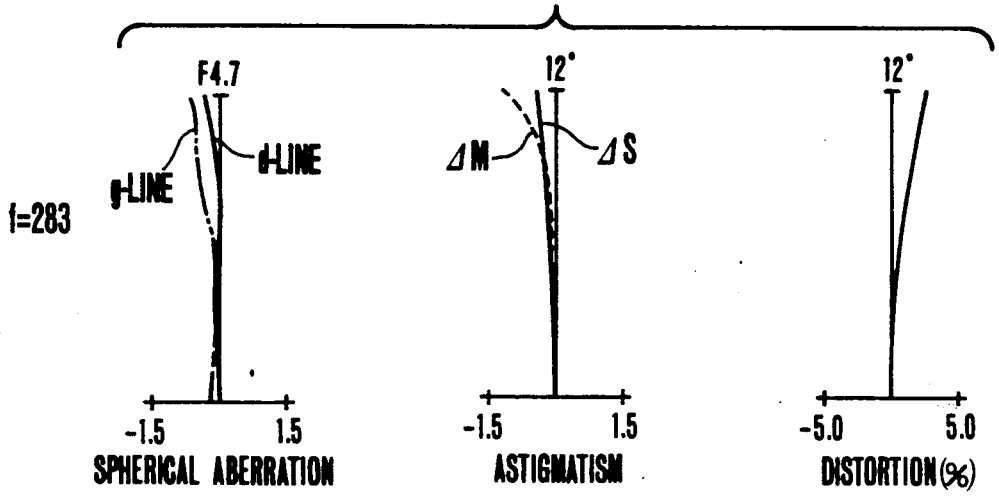

An eleventh example of a specific zoom lens (FIG. 21) comprises, from front to rear, positive first, negative second, positive third and positive fourth lens units 111 to 114, the first and third units moving axially forward when zooming from the wide angle to the telephoto maintained stable over the zooming range.

In the eleventh example, therefore, as the first lens of the third unit 113, use is made of a lens of strong positive power but of the radial type or positive power-transit refractive index distribution, thus accounting for a large proportion of the positive power of the third unit, and playing a main part in correcting spherical aberration. Another refractive index distributive lens of negative power-transit having a strong negative power is used as a positive third lens of the third unit 113, playing a main part in correcting astigmatism.

As a result, the third unit can be constructed with as few lens elements as only three. This has made it possible to realize a compact high-range zoom lens while still permitting good correction of aberrations.

Numerical Example 10

$F = 100\text{–}570 \quad FNO = 1:1.22\text{–}1.39 \quad 2\omega = 64°\text{–}9.1°$

| | | |
|---|---|---|
| R1 = 434.761 | D1 = 83.86 | N1 = N1 (h) |
| R2 = −9088.500 | D2 = Variable | |
| R3 = 396.796 | D3 = 11.36 | N2 = 1.77250 $\quad \nu 2 = 49.6$ |
| R4 = 152.011 | D4 = 52.05 | |
| R5 = −227.683 | D5 = 51.36 | N3 = N3 (h) |
| R6 = −1408.086 | D6 = Variable | |
| R7 = −280.345 | D7 = 11.36 | N4 = 1.69680 $\quad \nu 4 = 55.5$ |
| R8 = 9149.898 | D8 = Variable | |
| R9 = 602.178 | D9 = 47.73 | N5 = 1.71300 $\quad \nu 5 = 53.8$ |

-continued

| | | | | |
|---|---|---|---|---|
| R10 = −315.800 | D10 = 2.27 | | | |
| R11 = ∞ | D11 = 68.18 | N6 = 1.51633 | | $\nu 6$ = 64.1 |
| R12 = ∞ | D12 = 54.54 | | | |
| R13 = Stop | D13 = 23.30 | | | |
| R14 = 469.130 | D14 = 34.09 | N7 = 1.74400 | | $\nu 7$ = 44.7 |
| R15 = −2929.914 | D15 = 32.50 | | | |
| R16 = −220.295 | D16 = 11.36 | N8 = 1.84666 | | $\nu 8$ = 23.9 |
| R17 = −638.878 | D17 = 1.70 | | | |
| R18 = 300.275 | D18 = 44.32 | N9 = 1.69680 | | $\nu 9$ = 55.5 |
| R19 = −4212.391 | D19 = 129.66 | | | |
| R20 = −1431.682 | D20 = 91.70 | N10 = N10 (h) | | |
| R21 = −333.645 | D21 = 22.73 | | | |
| R22 = ∞ | D22 = 62.50 | N11 = 1.51633 | | $\nu 11$ = 64.1 |
| R23 = ∞ | | | | |

| | f | 100 | 280 | 570 |
|---|---|---|---|---|
| | D2 | 8.20 | 183.15 | 255.84 |
| | D6 | 259.87 | 63.09 | 31.67 |
| | D8 | 38.29 | 60.13 | 18.85 |

$N_i(h) = N_0 + N_1 h^2 + N_2 h^4 + N_3 h^6 + N_4 h^8 + N_5 h^{10} +$

| | $\lambda$ | $N_0$ | $N_1$ | $N_2$ | $N_3$ | $N_4$ | $N_5$ |
|---|---|---|---|---|---|---|---|
| N1 (h) | d | 1.75750 | $-7.20092 \times 10^{-7}$ | $-6.47996 \times 10^{-13}$ | $3.98843 \times 10^{-17}$ | $-7.75135 \times 10^{-22}$ | $7.75472 \times 10^{-27}$ |
| | g | 1.77427 | $-5.29489 \times 10^{-7}$ | $-5.84287 \times 10^{-13}$ | $4.24143 \times 10^{-16}$ | $-1.43444 \times 10^{-20}$ | $2.33425 \times 10^{-25}$ |
| N3 (h) | d | 1.73381 | $9.90755 \times 10^{-6}$ | $-3.83661 \times 10^{-10}$ | $1.26739 \times 10^{-14}$ | $-1.80757 \times 10^{-19}$ | $3.76775 \times 10^{-24}$ |
| | g | 1.76756 | $8.66688 \times 10^{-6}$ | $-3.33356 \times 10^{-10}$ | $2.09077 \times 10^{-14}$ | $-3.52200 \times 10^{-18}$ | $2.82225 \times 10^{-22}$ |
| N10 (h) | d | 1.85000 | $-6.97515 \times 10^{-6}$ | $2.84305 \times 10^{-10}$ | $3.33926 \times 10^{-16}$ | $1.18218 \times 10^{-16}$ | |
| | g | 1.87435 | $-6.71061 \times 10^{-6}$ | $2.94303 \times 10^{-10}$ | $1.18218 \times 10^{-16}$ | | |

Numerical Example 11

F = 100−283  FNO = 1:3.5−4.7  $2\omega = 62°-24°$

| | | | | |
|---|---|---|---|---|
| R1 = 329.775 | D1 = 6.94 | N1 = 1.80518 | | $\nu 1$ = 25.4 |
| R2 = 137.307 | D2 = 25.00 | N2 = 1.60311 | | $\nu 2$ = 60.7 |
| R3 = −2316.906 | D3 = 0.33 | | | |
| R4 = 127.715 | D4 = 16.11 | N3 = 1.69680 | | $\nu 3$ = 55.5 |
| R5 = 589.863 | D5 = Variable | | | |
| R6 = 349.552 | D6 = 3.33 | N4 = 1.88300 | | $\nu 4$ = 40.8 |
| R7 = 49.444 | D7 = 13.33 | | | |
| R8 = −147.683 | D8 = 3.06 | N5 = 1.88300 | | $\nu 5$ = 40.8 |
| R9 = 179.196 | D9 = 5.14 | | | |
| R10 = 96.122 | D10 = 13.33 | N6 = 1.84666 | | $\nu 6$ = 23.9 |
| R11 = −88.957 | D11 = 3.71 | | | |
| R12 = −68.016 | D12 = 3.06 | N7 = 1.83400 | | $\nu 7$ = 37.2 |
| R13 = −955.505 | D13 = Variable | | | |
| R14 = 83.717 | D14 = 26.71 | N8 = N8 (h) | | |
| R15 = −156.910 | D15 = 7.80 | | | |
| R16 = 11044.891 | D16 = 16.47 | N9 = 1.84666 | | $\nu 9$ = 23.9 |
| R17 = 56.388 | D17 = 5.28 | | | |
| R18 = −455.820 | D18 = 6.94 | N10 = N10 (h) | | |
| R19 = −69.670 | D19 = Variable | | | |
| R20 = −95.749 | D20 = 3.33 | N11 = 1.77250 | | $\nu 11$ = 49.6 |
| R21 = 282.765 | D21 = 8.06 | N12 = 1.51633 | | $\nu 12$ = 64.1 |
| R22 = −169.580 | D22 = 6.53 | | | |
| R23 = 227.054 | D23 = 15.00 | N13 = 1.51742 | | $\nu 13$ = 52.4 |
| R24 = −115.070 | | | | |

| | f | 100 | 168 | 283 |
|---|---|---|---|---|
| | D5 | 2.92 | 32.18 | 55.18 |
| | D13 | 52.25 | 30.63 | 6.77 |
| | D19 | 11.11 | 32.74 | 56.59 |

| | $\lambda$ | $N_0$ | $N_1$ | $N_2$ | $N_3$ | $N_4$ |
|---|---|---|---|---|---|---|
| N8 (h) | d | 1.60342 | $-1.43316 \times 10^{-4}$ | $-2.49536 \times 10^{-8}$ | $-8.04703 \times 10^{-12}$ | $-6.64964 \times 10^{-15}$ |
| | g | 1.62382 | $-1.43595 \times 10^{-4}$ | $-2.82066 \times 10^{-8}$ | $5.33417 \times 10^{-12}$ | $-1.80972 \times 10^{-14}$ |
| N10 (h) | d | 1.50137 | $2.16886 \times 10^{-5}$ | $-3.60780 \times 10^{-9}$ | $7.16738 \times 10^{-12}$ | $-2.03457 \times 10^{-14}$ |
| | g | 1.51250 | $1.85615 \times 10^{-5}$ | $6.03319 \times 10^{-8}$ | $-3.72674 \times 10^{-10}$ | $6.14045 \times 10^{-13}$ |

Figure 23:
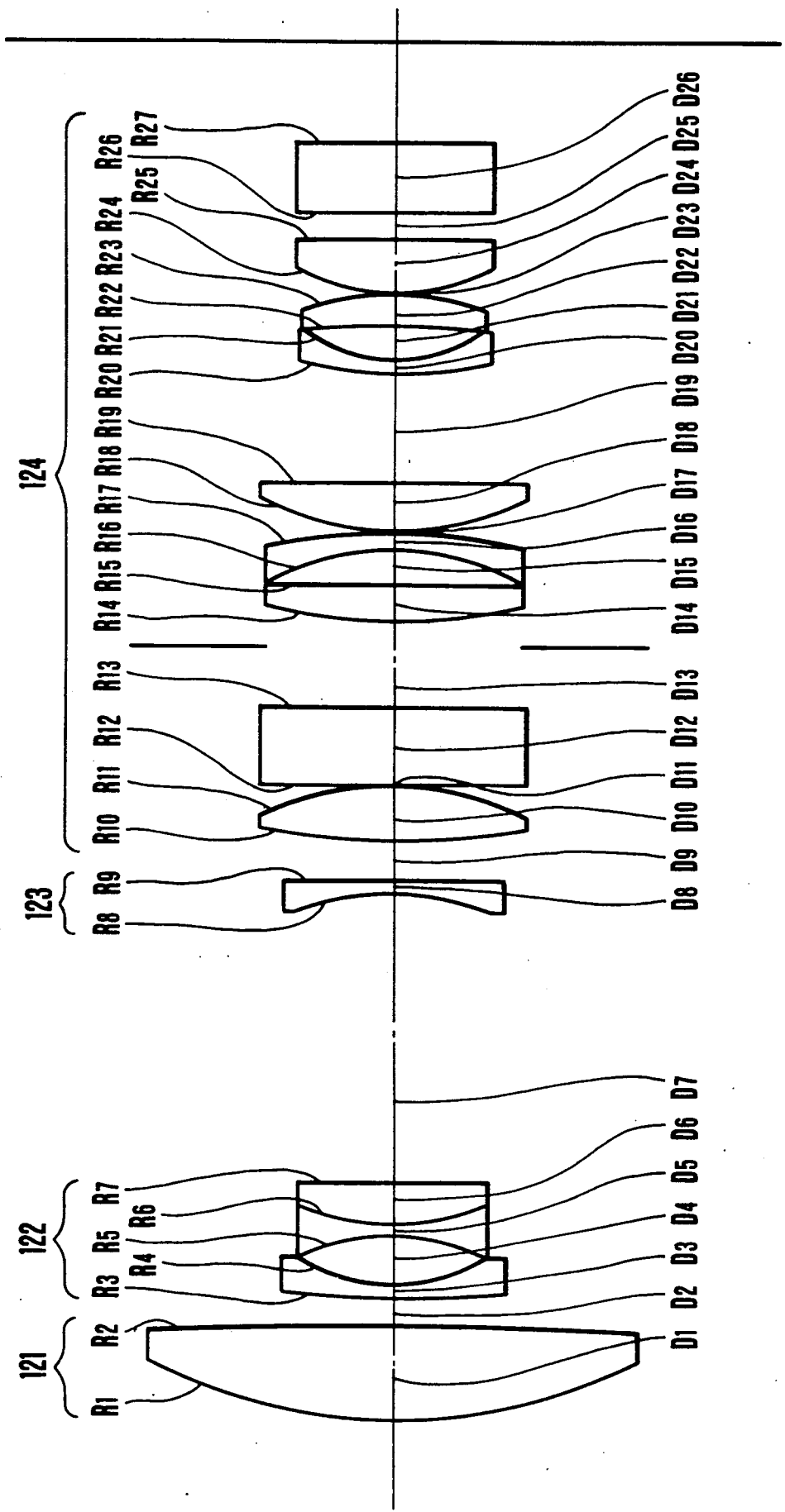
Figure 24A:
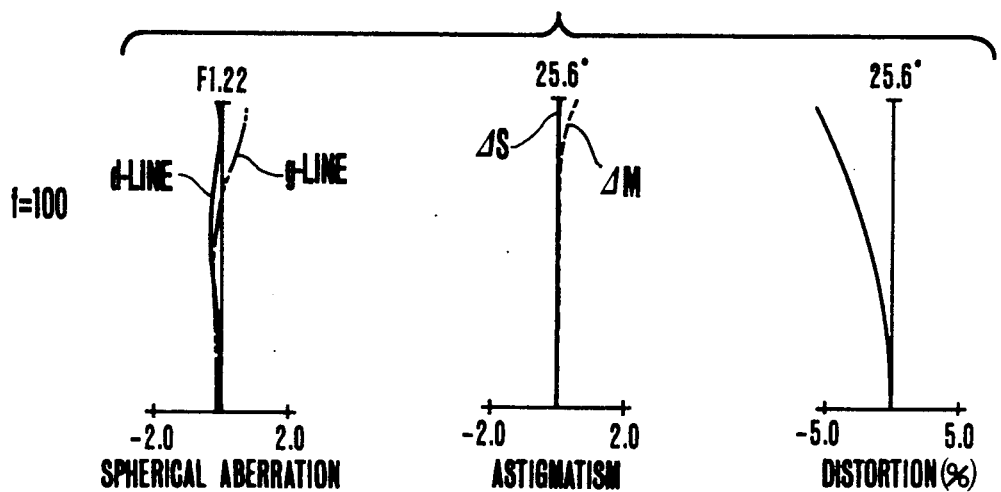
Figure 24B:
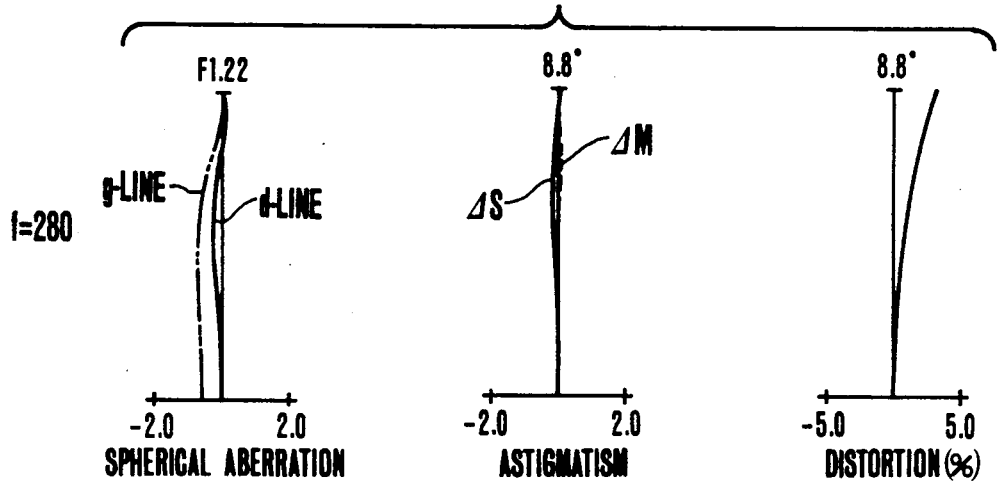
Figure 24C:
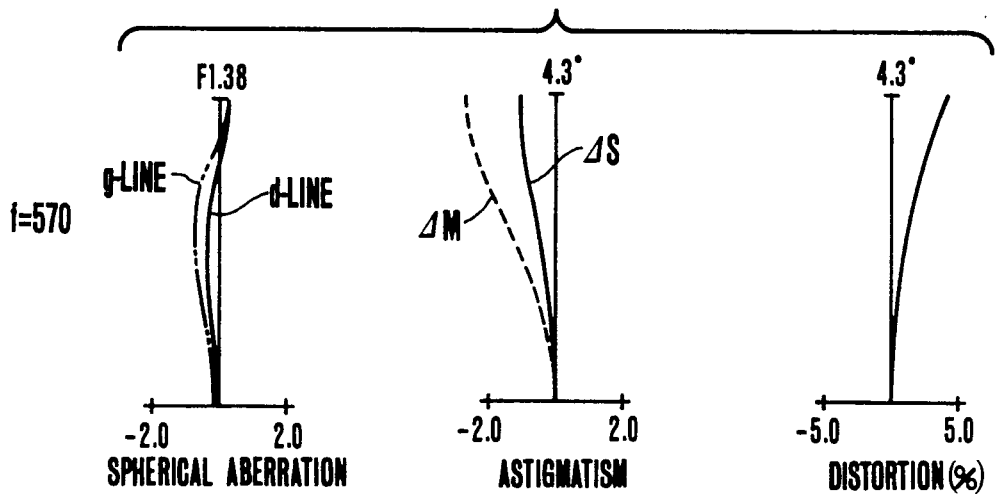

A twelfth example of a specific zoom lens of the invention is illustrated in FIG. 23, of which the aberrations are shown in FIGS. 24A to 24C, comprising, from front to rear, a positive first lens unit 121 consisting of only one refractive index distributive lens defined by surfaces R1 and R2, a negative second lens unit 122 consisting of two members with three elements, a negative third lens unit 123 consisting of a single lens element, and a positive fourth lens unit consisting of nine lens elements.

Figure 41:
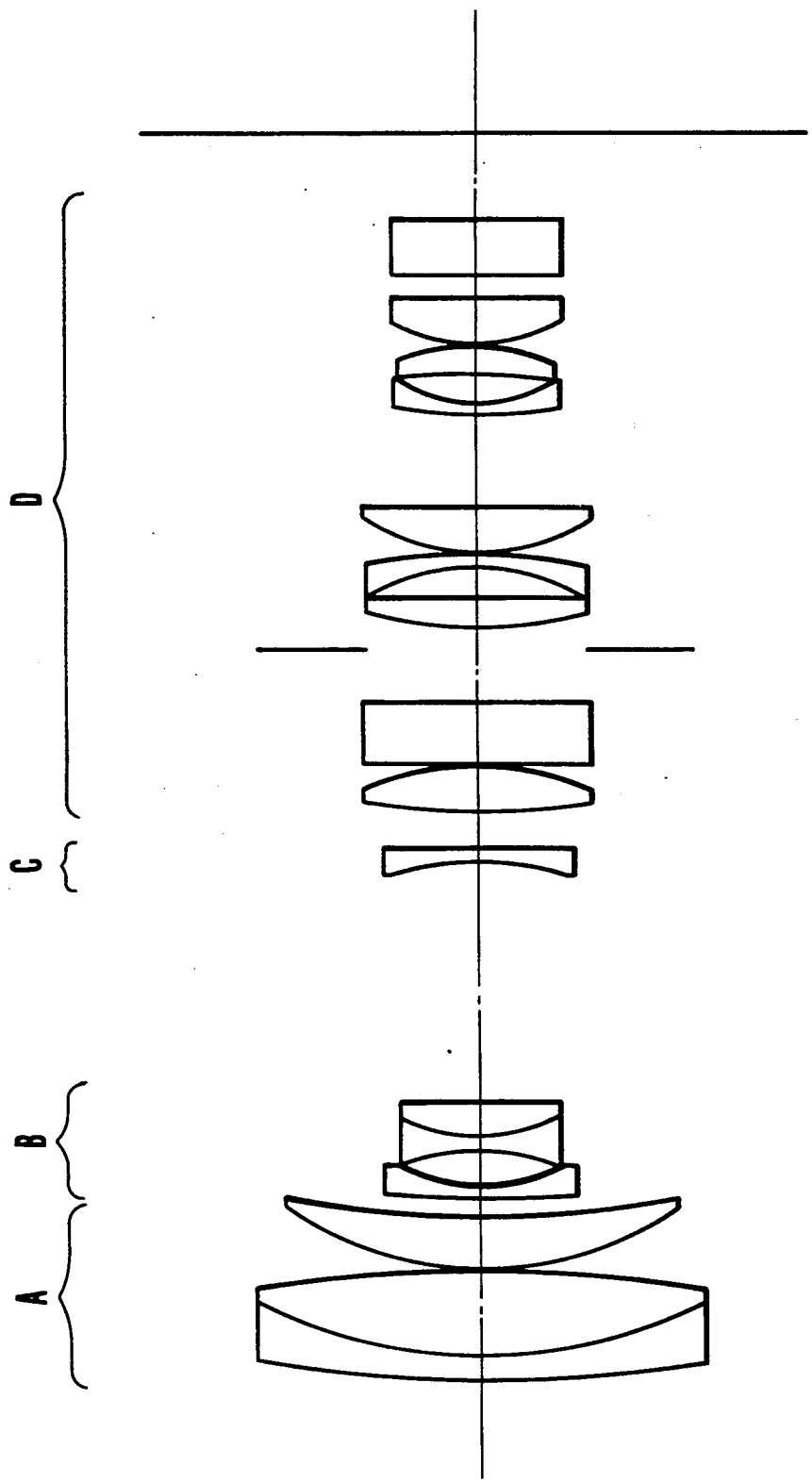
FIG. 41 is a longitudinal section view of the conventional objective whose lens elements are all made of homogeneous glasses.

This zoom lens is similar to the conventional one of FIG. 41 except that the first unit 121 is in the form of a singlet alone.

The aforesaid singlet has a medium whose refractive index becomes progressively lower as the weight from the optical axis increases, and, therefore, acquires a surplus collecting action by the medium itself. Analogous to the increase in the refractive index of the ordinary or homogeneous lens, the surface curvatures of the singlet can therefore be weakened with an advantage of reducing the minimum acceptable center thickness for the given diameter. Also, the ordinary or homogeneous positive lens, if not in aspherical form, has a relatively stronger refractive power at the marginal zone, producing very large residual spherical aberration which could not be maintained stable over the zooming range. However, the use of the aforesaid singlet of the refractive index distribution type with a reduced refractive power at the marginal zone, provides the possibility of cancelling the aforesaid aberration by the suitable design of other lens units. Further, as to chromatic aberration correction, the aforesaid singlet provides means for that purpose by controlling the gradient of refractive index for every wavelength. In more detail, the conventional optical material exhibits increasing refractive indices for shortening wavelengths. Therefore, one positive singlet produces under-corrected on-axis aberrations for shorter wavelengths. In the present invention, however, by providing for the singlet with such a refractive index distribution that the gradient of refractive index for shorter wavelengths in the paraxial region is larger than that for longer wavelengths, because the collecting action of the singlet is in linear proportion to the gradient of refractive index in the paraxial region, it is made possible to correct chromatic aberrations.

Numerical Example 12

$F = 100-570 \quad FNO = 1:1.22-1.38 \quad 2\omega = 51.2°-8.7°$

| | | |
|---|---|---|
| R1 = 467.165 | D1 = 83.86 | N1 = N1 (h) |
| R2 = −3592.723 | D2 = Variable | |
| R3 = 1029.617 | D3 = 11.36 | N2 = 1.77250 $\quad \nu2 = 49.6$ |
| R4 = 160.158 | D4 = 43.84 | |
| R5 = −201.139 | D5 = 11.36 | N3 = 1.73500 $\quad \nu3 = 49.8$ |
| R6 = 201.214 | D6 = 36.36 | N4 = 1.84666 $\quad \nu4 = 23.9$ |
| R7 = −3637.674 | D7 = Variable | |
| R8 = −250.112 | D8 = 11.36 | N5 = 1.69680 $\quad \nu5 = 55.5$ |
| R9 = −3182.667 | D9 = Variable | |
| R10 = 723.855 | D10 = 47.73 | N6 = 1.71300 $\quad \nu6 = 53.8$ |
| R11 = −291.076 | D11 = 2.27 | |
| R12 = 0.0 | D12 = 68.18 | N7 = 1.51633 $\quad \nu7 = 64.1$ |
| R13 = 0.0 | D13 = 54.55 | |
| R14 = 515.300 | D14 = 34.00 | N8 = 1.71700 $\quad \nu8 = 47.9$ |
| R15 = −1643.200 | D15 = 32.00 | |
| R16 = −201.200 | D16 = 11.00 | N9 = 1.84666 $\quad \nu9 = 23.9$ |
| R17 = −405.700 | D17 = 2.00 | |
| R18 = 205.200 | D18 = 44.00 | N10 = 1.69680 $\quad \nu10 = 55.5$ |
| R19 = 961.000 | D19 = 93.00 | |
| R20 = 431.400 | D20 = 13.00 | N11 = 1.80518 $\quad \nu11 = 25.4$ |
| R21 = 130.100 | D21 = 30.00 | |
| R22 = −1830.600 | D22 = 28.00 | N12 = 1.51633 $\quad \nu12 = 64.1$ |
| R23 = −283.800 | D23 = 2.00 | |
| R24 = 174.900 | D24 = 48.00 | N13 = 1.64850 $\quad \nu13 = 53.0$ |
| R25 = −621.303 | D25 = 23.00 | |
| R26 = 0.0 | D26 = 63.00 | N14 = 1.51633 $\quad \nu14 = 64.1$ |
| R27 = 0.0 | | |

| f | 100 | 280 | 570 |
|---|---|---|---|
| D2 | 23.22 | 198.16 | 270.86 |
| D7 | 259.04 | 64.26 | 30.84 |
| D9 | 35.91 | 57.76 | 16.48 |

$N1(h) = N_0 + N_1 h^2 + N_2 h^4 + N_3 h^6 + N_4 h^8 + N_5 h^{10} +$

| | λ | $N_0$ | $N_1$ | $N_2$ | $N_3$ | $N_4$ | $N_5$ |
|---|---|---|---|---|---|---|---|
| N1 (h) | d | 1.75750 | $-7.37231 \times 10^{-7}$ | $-1.29933 \times 10^{-12}$ | $5.09973 \times 10^{-17}$ | $-7.89179 \times 10^{-22}$ | $8.00488 \times 10^{-27}$ |
| | g | 1.77418 | $-5.33610 \times 10^{-7}$ | $-7.61728 \times 10^{-13}$ | $4.25631 \times 10^{-16}$ | $-1.38523 \times 10^{-20}$ | $2.27105 \times 10^{-25}$ |

Figure 25:
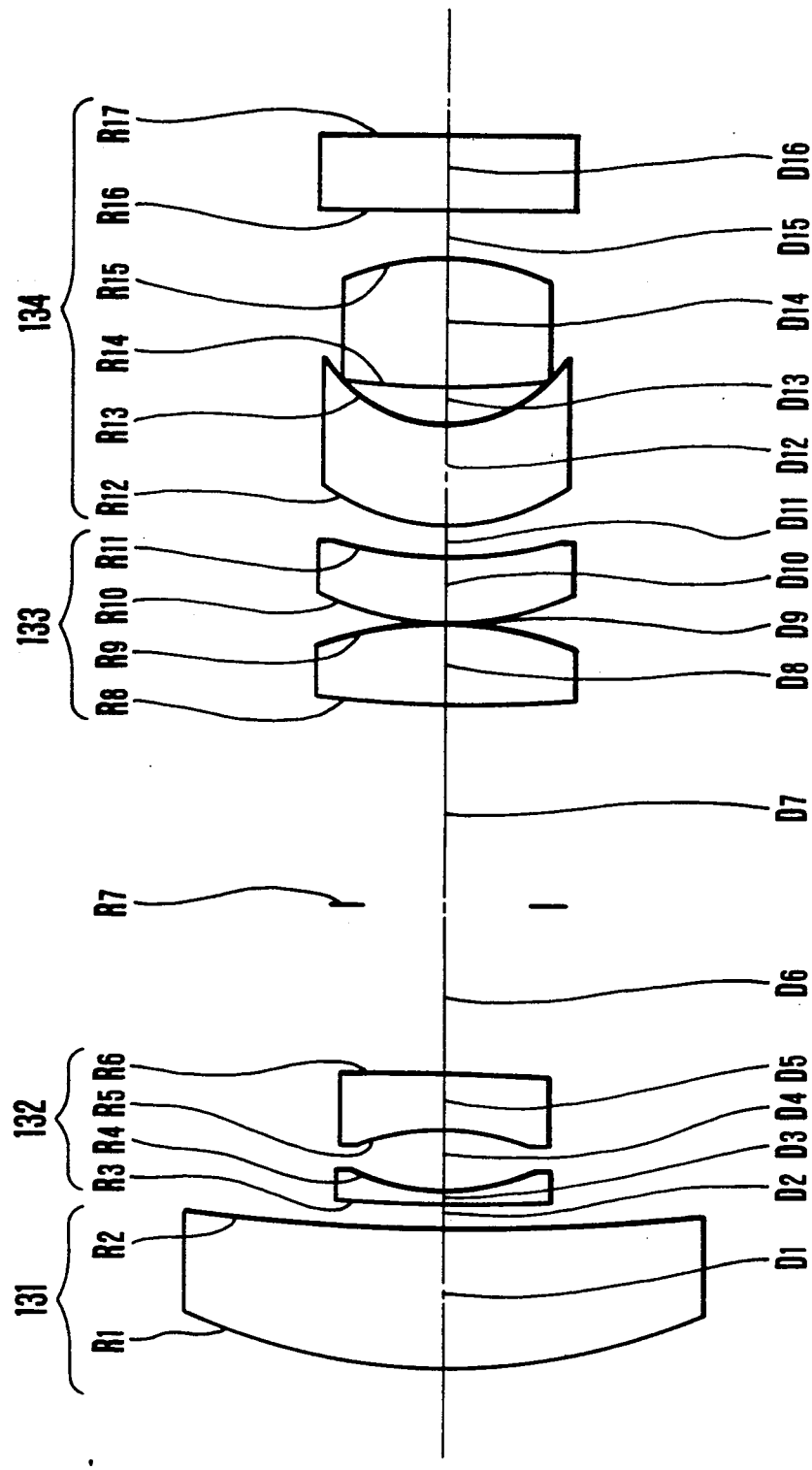
Figure 26A:
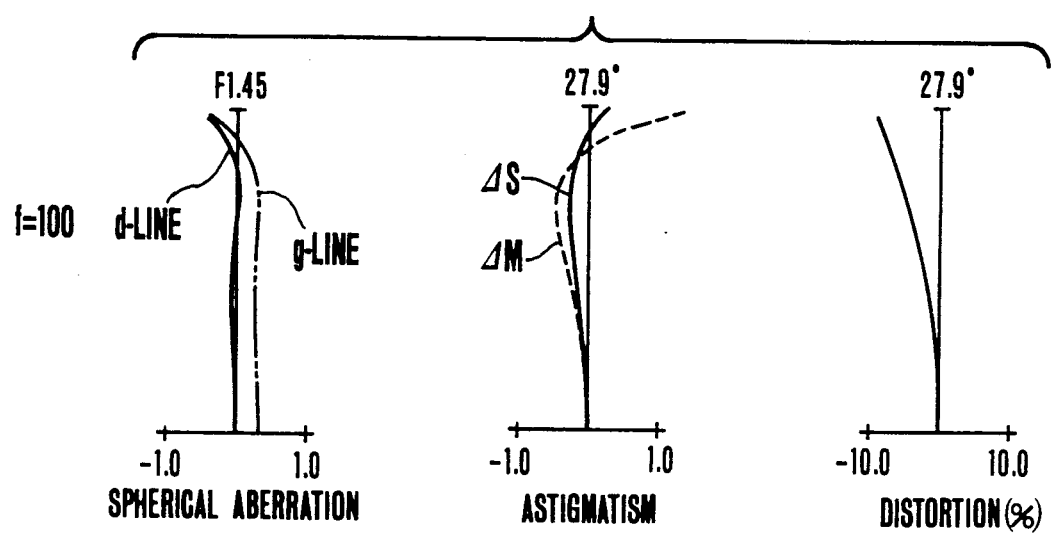
Figure 26B:
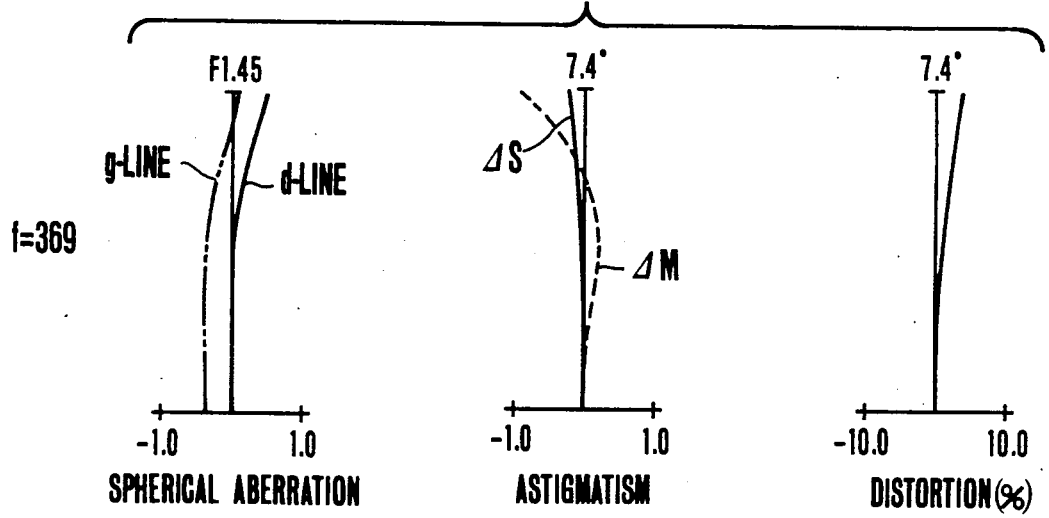
Figure 26C:
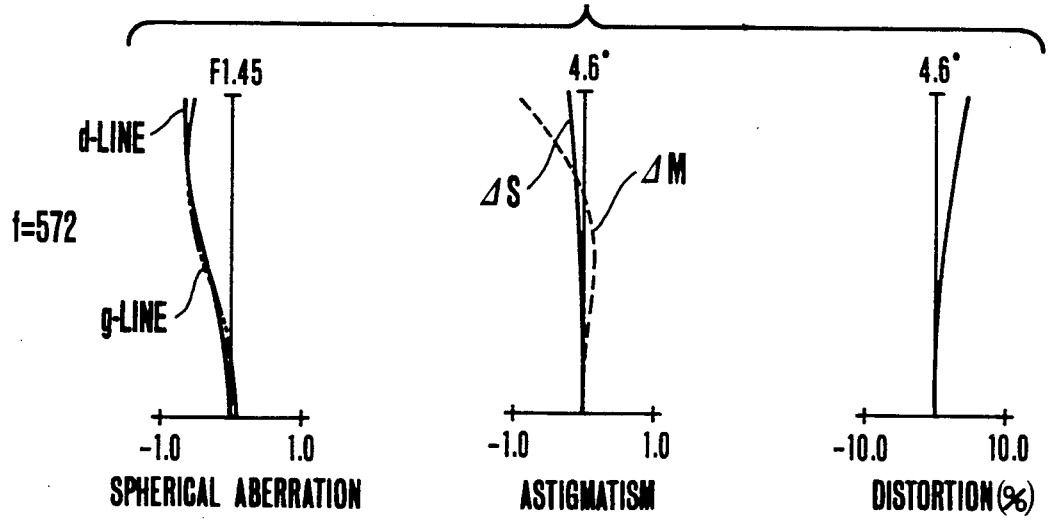

A thirteenth example of a specific zoom lens of the invention is illustrated in FIG. 25, of which the aberrations are shown in FIGS. 26A to 26C, comprising, from front to rear, a positive first lens unit 131 consisting of one element, a negative second lens unit 132 consisting of two elements, a positive third lens unit consisting of two elements, and a positive fourth lens unit 134 consisting of three elements, the first three units being axially movable for zooming. This zoom includes five radial type refractive index distributive lenses defined by the surfaces R1 and R2, R5 and R6, R8 and R9, R12 and R13, and R14 and R15.

Since these refractive index distributive lenses have surplus effects of correcting aberrations, and are assigned to not only the first, but also to each of the other units 132 to 134, the necessary number of lens elements in each unit is reduced, and, in total, the much-desired reduction of the size of the entire system is achieved.

Numerical Example 13

$F = 100-572 \quad FNO = 1:1.45 \quad 2\omega = 56°-9°$

| | | |
|---|---|---|
| R1 = 446.123 | D1 = 99.17 | N1 = N1 (h) |
| R2 = 2649.779 | D2 = Variable | |
| R3 = 1043.807 | D3 = 10.63 | N2 = 1.77250 $\quad \nu2 = 49.6$ |
| R4 = 159.259 | D4 = 43.64 | |
| R5 = −160.191 | D5 = 40.94 | N3 = N3 (h) |
| R6 = −1045.559 | D6 = Variable | |
| R7 = 0.0 | D7 = Variable | |
| R8 = 679.794 | D8 = 55.75 | N4 = N4 (h) |
| R9 = −303.562 | D9 = 1.77 | |

-continued

Numerical Example 13

| R10 = 225.927 | D10 = 44.79 | N5 = 1.77250 | ν5 = 49.6 |
|---|---|---|---|
| R11 = 284.834 | D11 = Variable | | |
| R12 = 137.785 | D12 = 73.07 | N6 = N6 (h) | |
| R13 = 99.455 | D13 = 26.53 | | |
| R14 = 693.588 | D14 = 89.26 | N7 = N7 (h) | |
| R15 = −190.268 | D15 = 35.42 | | |
| R16 = 0.0 | D16 = 53.13 | N8 = 1.51633 | ν8 = 64.1 |
| R17 = 0.0 | | | |

| f | 100 | 369 | 572 |
|---|---|---|---|
| D2 | 14.87 | 239.78 | 278.71 |
| D6 | 118.50 | 40.80 | 7.50 |
| D7 | 138.73 | 54.35 | 18.19 |
| D11 | 22.14 | 106.51 | 142.68 |

$$N_i(h) = N_0 + N_1 h^2 + N_2 h^4 + N_3 h^6 + \ldots$$

| | λ | $N_0$ | $N_1$ | $N_2$ | $N_3$ |
|---|---|---|---|---|---|
| N1 (h) | d | 1.81182 | $-6.00021 \times 10^{-7}$ | $-3.51092 \times 10^{-12}$ | $-5.53931 \times 10^{-17}$ |
| | g | 1.83800 | $-3.18111 \times 10^{-7}$ | $-1.13312 \times 10^{-12}$ | $2.17154 \times 10^{-17}$ |
| N3 (h) | d | 1.53465 | $7.06614 \times 10^{-7}$ | $-2.24893 \times 10^{-10}$ | $1.65903 \times 10^{-14}$ |
| | g | 1.55100 | $-1.14024 \times 10^{-7}$ | $-1.06037 \times 10^{-10}$ | $9.15347 \times 10^{-15}$ |
| N4 (h) | d | 1.69768 | $2.30497 \times 10^{-7}$ | $1.36939 \times 10^{-10}$ | $8.87318 \times 10^{-15}$ |
| | g | 1.71200 | $4.90518 \times 10^{-7}$ | $1.39483 \times 10^{-10}$ | $1.03419 \times 10^{-14}$ |
| N6 (h) | d | 1.53812 | $9.47272 \times 10^{-8}$ | $5.86644 \times 10^{-11}$ | $2.14576 \times 10^{-14}$ |
| | g | 1.55100 | $1.18453 \times 10^{-6}$ | $1.40160 \times 10^{-10}$ | $1.77582 \times 10^{-14}$ |
| N7 (h) | d | 1.73480 | $2.70463 \times 10^{-7}$ | $8.32279 \times 10^{-10}$ | $-2.85730 \times 10^{-14}$ |
| | g | 1.75200 | $6.79849 \times 10^{-7}$ | $7.44550 \times 10^{-10}$ | $-1.78935 \times 10^{-14}$ |

Figure 27:
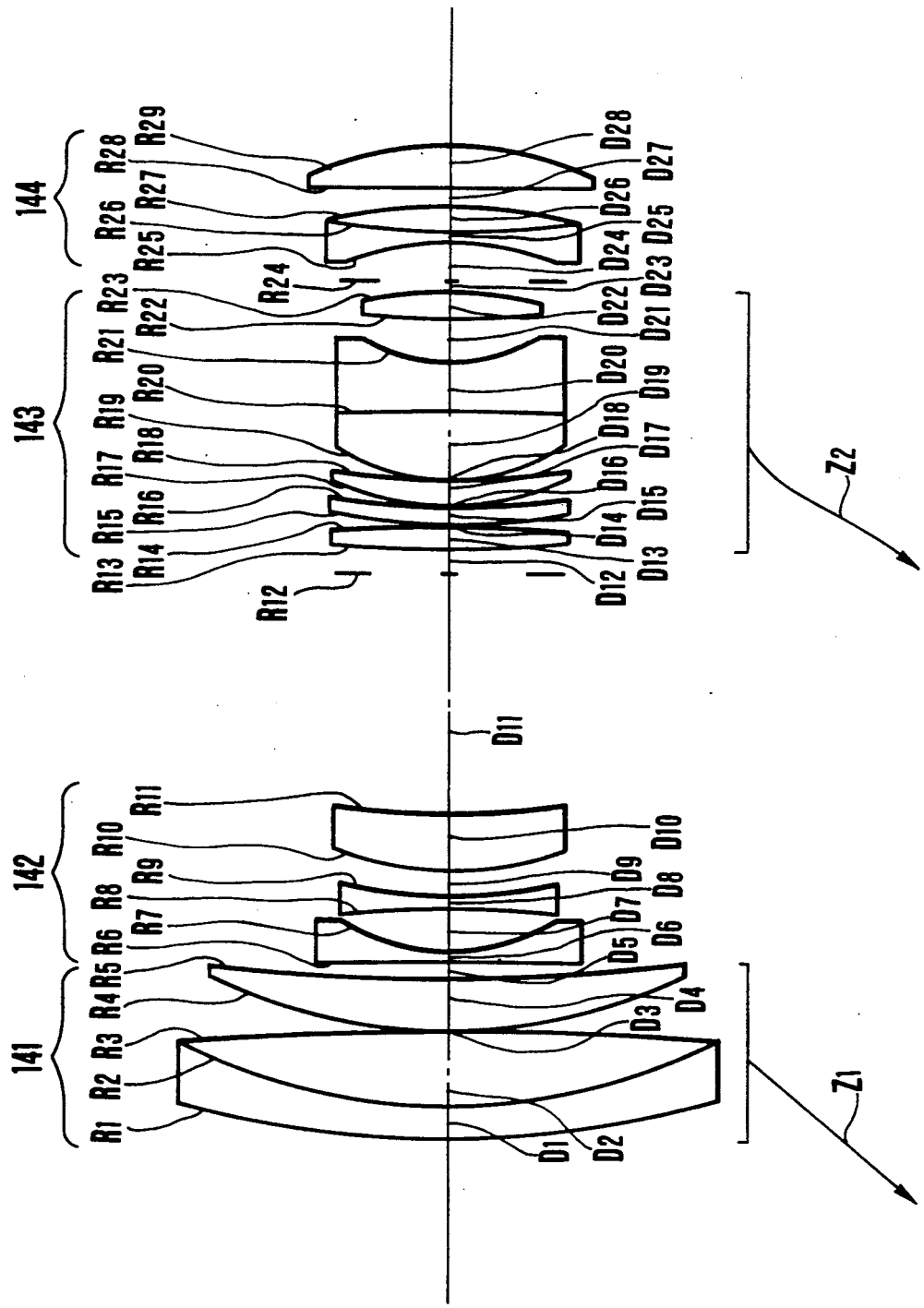
Figure 28A:
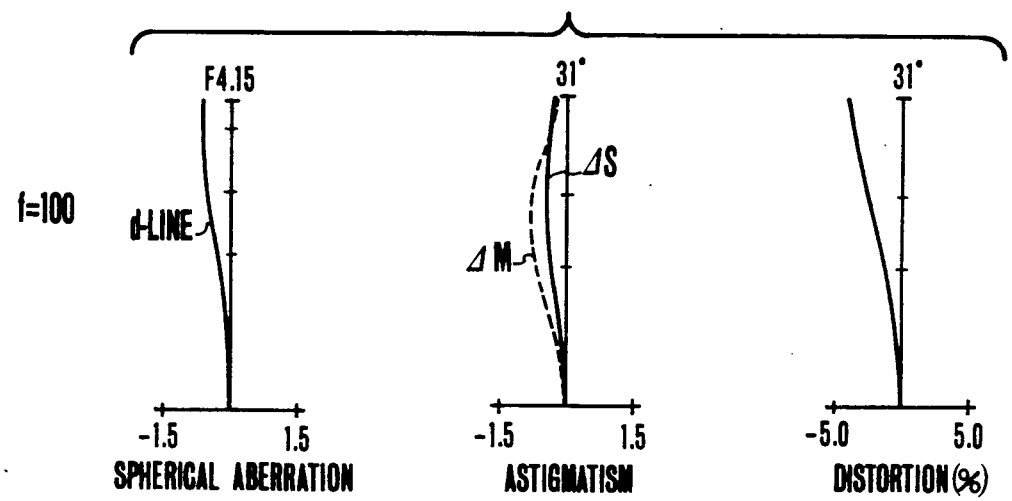
Figure 28B:
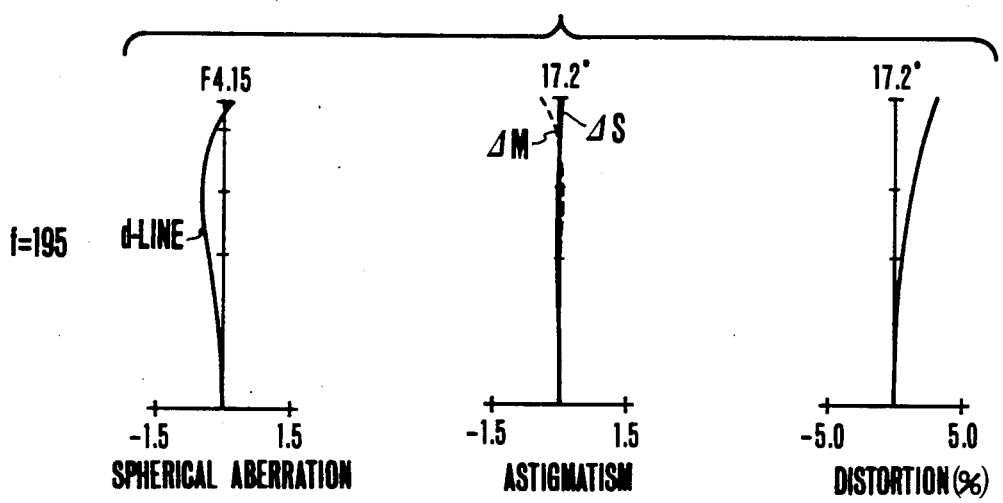
Figure 28C:
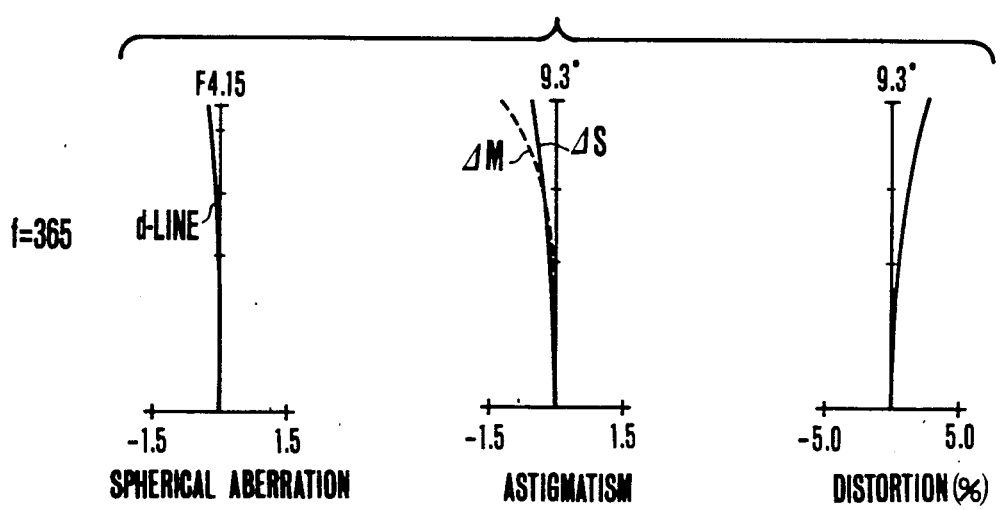

A fourteenth example of a specific zoom lens is illustrated in FIG. 27, comprising, from front to rear, positive first, negative second, positive third and positive fourth lens units 141 to 144, and having an increased zoom ratio.

In this example, the second unit 142 is constructed with two negative lenses of homogeneous material followed by a positive meniscus-shaped lens of the positive power-transit refractive index distribution type.

In the zoom lens of the configuration described above, it is recommendable that the interval between the principal points of the first and second units 141 and 142 is as far decreased as possible in view of minimizing the total length and the diameter of the front members. Here, one positive lens is introduced into the negative second unit 142 and positioned in the rear of the two negative lenses so that when the refractive index distribution is so chosen as to create a surplus positive power, as the surface curvatures are weakened, the front principal point of the negative second unit 142 is shifted ahead with a reduction of the interval between the principal points of the first and second units. Thus, it is made possible to reduce the total length and the diameter of the members.

Also by making negative the values of the coefficients N2 and N3 of the refractive index distribution formula, the spherical aberration produced from the two negative lenses of second unit 142 is well corrected even at higher order ones.

In contradiction from the conventional second unit, which has generally 5 or more lens elements and a long overall thickness, the invention makes only three elements suffice for constructing the second unit with an advantage of reducing its size. Another advantage is that as the second unit is very sensitive to decentering, the adjusting operation on the assembly line becomes very easy to perform.

Numerical Example 14

F = 100-365  FNO = 1:4.15  2ω = 62°-19°

| R1 = 358.669 | D1 = 6.94 | N1 = 1.80518 | ν1 = 25.4 |
|---|---|---|---|
| R2 = 161.867 | D2 = 25.28 | N2 = 1.60311 | ν2 = 60.7 |
| R3 = −1576.564 | D3 = 0.33 | | |
| R4 = 158.744 | D4 = 15.92 | N3 = 1.69680 | ν3 = 55.5 |
| R5 = 689.688 | D5 = Variable | | |
| R6 = 1039.392 | D6 = 4.17 | N4 = 1.88300 | ν4 = 40.8 |
| R7 = 59.861 | D7 = 14.47 | | |
| R8 = −198.937 | D8 = 3.33 | N5 = 1.88300 | ν5 = 40.8 |
| R9 = 166.901 | D9 = 7.11 | | |
| R10 = 102.107 | D10 = 17.62 | N6 = N6 (h) | |
| R11 = 228.837 | D11 = Variable | | |
| R12 = Stop | D12 = Variable | | |
| R13 = 386.469 | D13 = 6.81 | N7 = 1.65844 | ν7 = 50.9 |
| R14 = −568.991 | D14 = 0.33 | | |
| R15 = 156.913 | D15 = 6.81 | N8 = 1.65844 | ν8 = 50.9 |
| R16 = 375.125 | D16 = 0.33 | | |
| R17 = 93.835 | D17 = 7.64 | N9 = 1.62004 | ν9 = 36.3 |
| R18 = 204.295 | D18 = 0.33 | | |
| R19 = 68.306 | D19 = 20.67 | N10 = 1.51742 | ν10 = 52.4 |
| R20 = −660.778 | D20 = 15.58 | N11 = 1.84666 | ν11 = 23.9 |
| R21 = 51.547 | D21 = 13.86 | | |
| R22 = 304.577 | D22 = 8.00 | N12 = 1.67003 | ν12 = 47.3 |
| R23 = −140.702 | D23 = Variable | | |
| R24 = Movable stopper | D24 = Variable | | |

-continued

Numerical Example 14

| | | | |
|---|---|---|---|
| R25 = −104.726 | D26 = 3.89 | N13 = 1.51742 | ν13 = 52.4 |
| R26 = 444.278 | D26 = 6.94 | | |
| R27 = −188.391 | D27 = 5.83 | N14 = 1.62299 | ν14 = 58.2 |
| R28 = 5751.934 | D28 = 13.78 | | |
| R29 = −106.902 | | | |

| f | 100 | 195 | 365 |
|---|---|---|---|
| D5 | 4.44 | 44.5 | 74.16 |
| D11 | 73.85 | 33.7 | 4.13 |
| D12 | 8.87 | 10.7 | 3.99 |
| D23 | 3.25 | 23.7 | 33.96 |
| D24 | 11.67 | 29.4 | 55.56 |

$N6(h) = N_0 + N_1 h^2 + N_2 h^4 + N_3 h^6 + \ldots$

| | $N_0$ | $N_1$ | $N_2$ | $N_3$ |
|---|---|---|---|---|
| N6 (h) | 1.60342 | $-9.76292 \times 10^{-5}$ | $-1.04448 \times 10^{-8}$ | $-1.56371 \times 10^{-12}$ |

Figure 29:
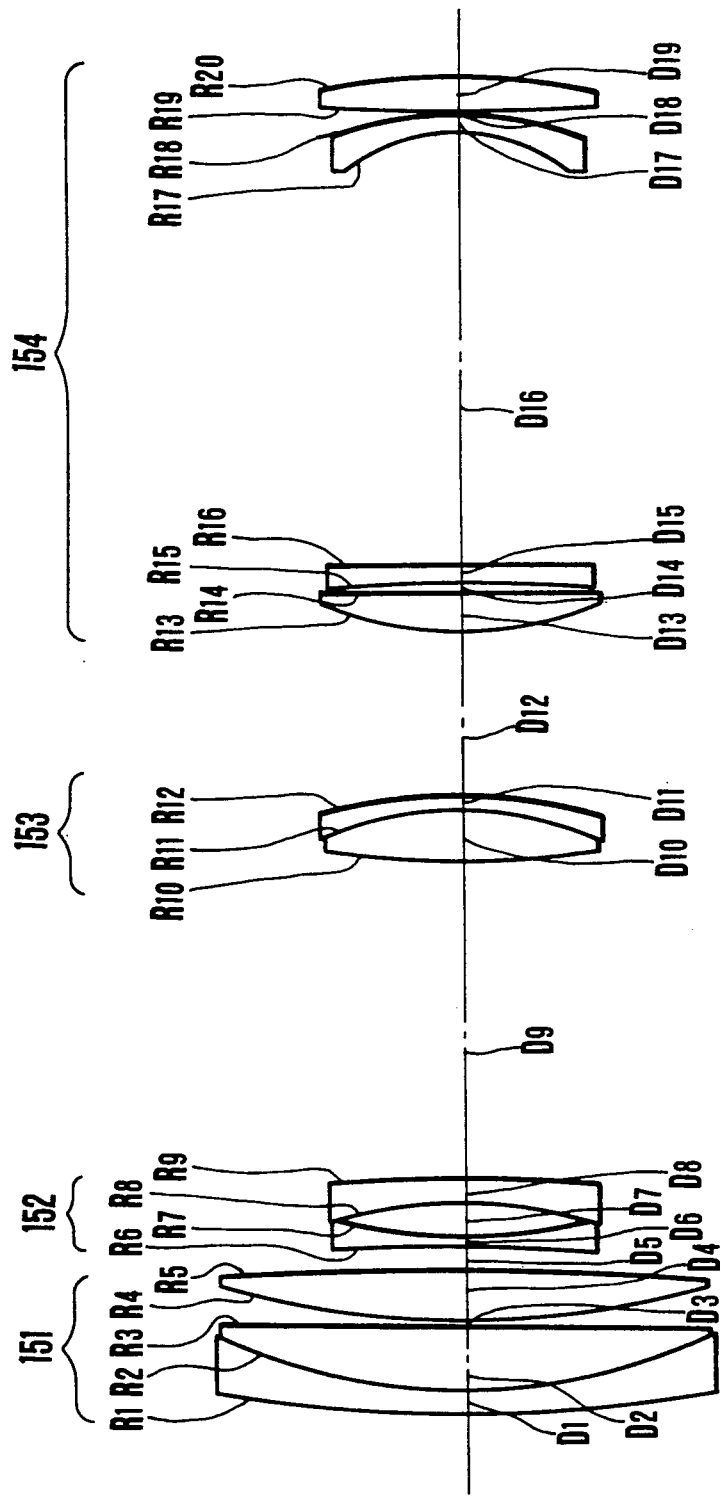

A fifteenth example of a specific zoom lens is illustrated in FIG. 29, comprising, from front to rear, a positive first lens unit 151 stationary during zooming, a negative second lens unit 152 axially movable for varying the image magnification, a positive third lens unit 153 axially movable for compensating for the image shift, and a positive fourth lens unit 154, whereby the second unit 152, or the so-called variator, is constructed with an axial type refractive index distributive lens of lowering refractive indices distributed along the optical axis from front to rear, and another refractive index distributive lens of negative power-transit radial type arranged on a common optical axis in this order from the front.

The aforesaid rear lens of negative power, because of its interior sharing a power, has far weaker surface curvatures than when an equivalent lens of homogeneous material is used.

The aforesaid front lens of negative power has a rear surface of strong curvature concave toward the rear so that with such a refractive index distribution as described above, as the refractive index lowers with increase in height, over-correction of spherical aberration is small, thus playing an important role in correcting spherical aberration. In addition, this feature and another feature that the spherical aberration, which is liable to be over-corrected, can be balanced out by under-corrected spherical aberration of the radial type lens by controlling its refractive index distribution, give an advantage of removing the cemented surface which is always used in the conventional variator. Thus, it has been made possible to reduce the number of elements in the variator and its axial thickness.

Numerical Example 15

F = 100−287   FNO = 1:4   2ω = 33.67°−12.04°

| | | | |
|---|---|---|---|
| R1 = 228.502 | D1 = 3.90 | N1 = 1.80518 | ν1 = 25.4 |
| R2 = 90.007 | D2 = 9.40 | N2 = 1.60729 | ν2 = 49.2 |
| R3 = −10306.648 | D3 = 0.14 | | |
| R4 = 23.678 | D4 = 6.68 | N3 = 1.61272 | ν3 = 58.7 |
| R5 = −1662.220 | D5 = Variable | | |
| R6 = −230.071 | D6 = 0.59 | N4 = N4 (x) | |
| R7 = 62.136 | D7 = 5.93 | | |
| R8 = −74.113 | D8 = 3.75 | N5 = N5 (h) | |
| R9 = −546.761 | D9 = Variable | | |
| R10 = 154.250 | D10 = 8.08 | N6 = 1.51602 | ν6 = 56.8 |
| R11 = −43.449 | D11 = 2.09 | N7 = 1.80518 | ν7 = 25.4 |
| R12 = −73.430 | D12 = Variable | | |
| R13 = 48.290 | D13 = 6.27 | N8 = 1.56873 | ν8 = 63.1 |
| R14 = 2417.594 | D14 = 1.49 | | |
| R15 = −278.859 | D15 = 2.78 | N9 = 1.80518 | ν9 = 25.4 |
| R16 = 2007.458 | D16 = 65.36 | | |
| R17 = −27.619 | D17 = 2.78 | N10 = 1.78590 | ν10 = 44.2 |
| R18 = −53.574 | D18 = 0.28 | | |
| R19 = 374.786 | D19 = 5.01 | N11 = 1.59551 | ν11 = 39.2 |
| R20 = −104.778 | | | |

| f | 100 | 200 | 287 |
|---|---|---|---|
| D5 | 4.387 | 49.4858 | 63.1746 |
| D9 | 48.0130 | 23.1695 | 1.5341 |
| D12 | 24.5757 | 4.3181 | 12.2647 |

$N4(x) = N_0 + N_1 x + N_2 x^2 + N_3 x^3 + \ldots$
$N5(h) = N_0 + N_1 h^2 + N_2 h^4 + N_3 h^6 + \ldots$

| | λ | $N_0$ | $N_1$ | $N_2$ | $N_3$ | $N_4$ |
|---|---|---|---|---|---|---|
| N4 (x) | d | 1.60311 | $-3.37010 \times 10^{-3}$ | $5.76898 \times 10^{-4}$ | $-2.32204 \times 10^{-4}$ | |
| | g | 1.61539 | $-2.36139 \times 10^{-3}$ | $1.07564 \times 10^{-3}$ | $-1.08051 \times 10^{-4}$ | |
| N5 (h) | d | 1.62299 | $1.28144 \times 10^{-4}$ | $-2.35730 \times 10^{-7}$ | $2.63243 \times 10^{-10}$ | $-1.35098 \times 10^{-13}$ |
| | g | 1.63630 | $7.53926 \times 10^{-5}$ | $-1.88135 \times 10^{-7}$ | $2.03422 \times 10^{-10}$ | $-1.78045 \times 10^{-13}$ |

Figure 31:
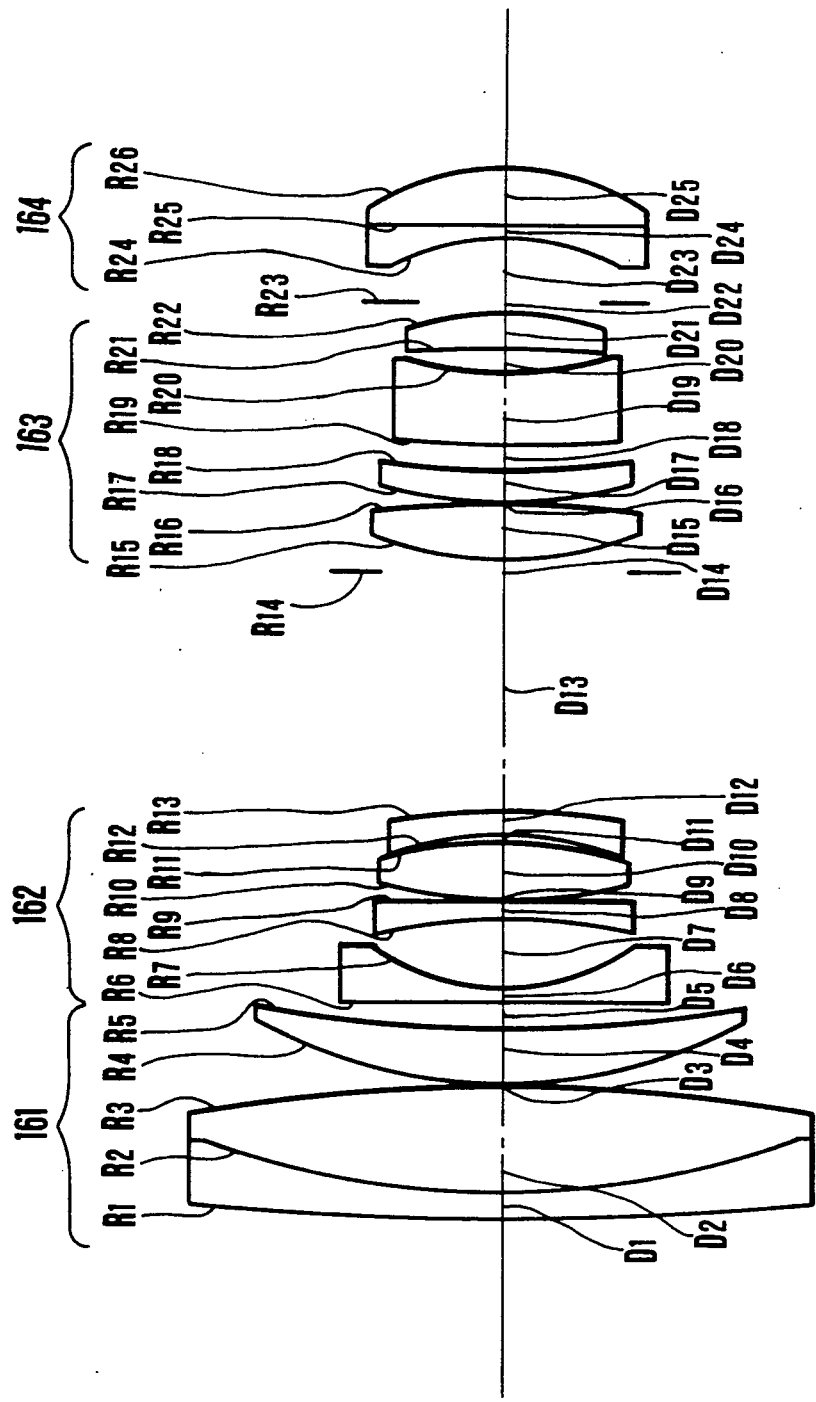
Figure 32A:
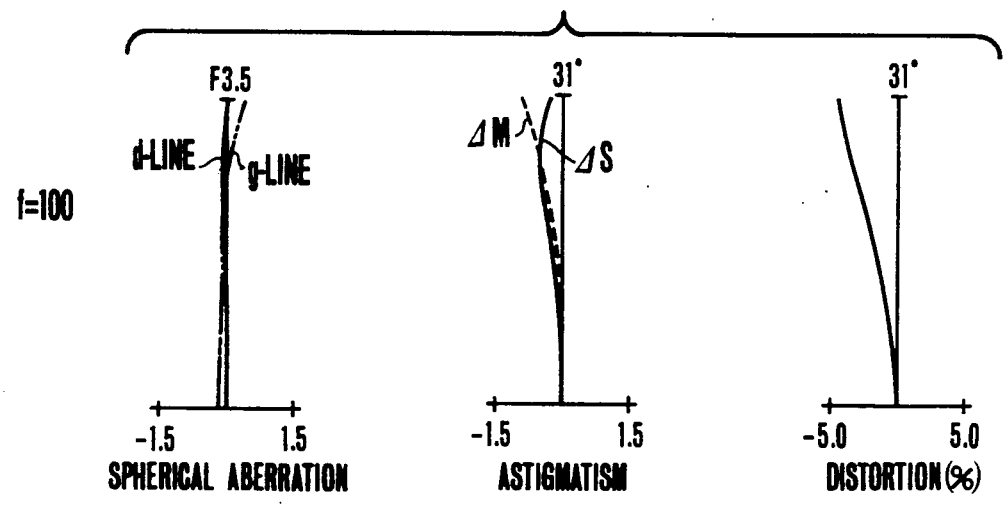
Figure 32B:
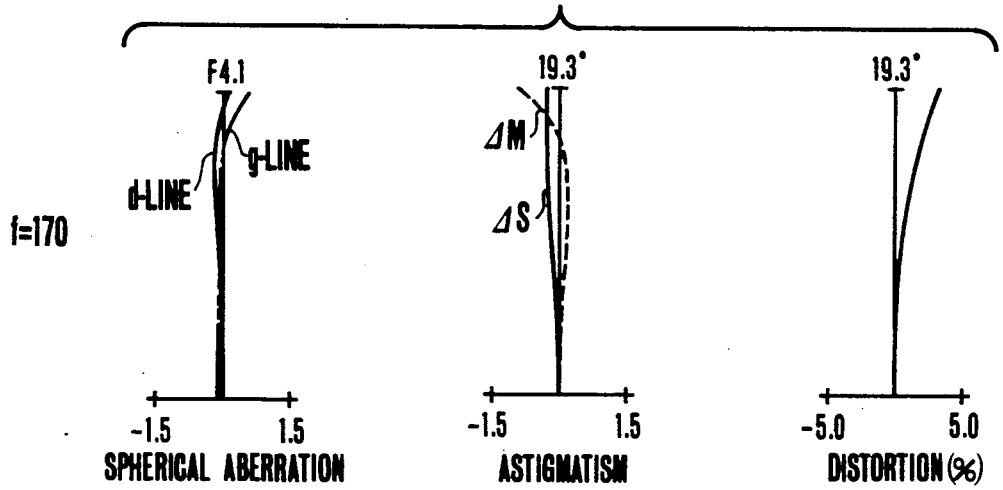
Figure 32C:
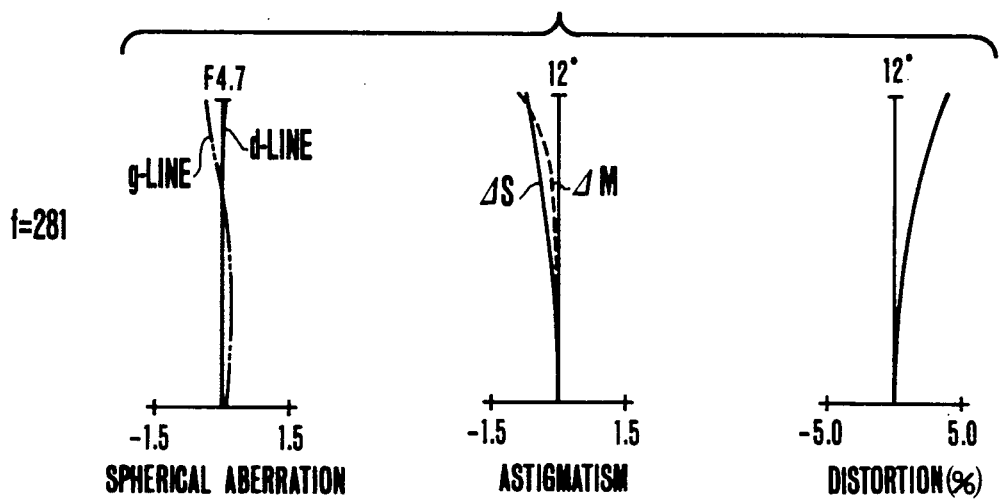

A sixteenth example of a specific zoom lens is illustrated in FIG. 31, comprising, from front to rear, a positive first lens unit 161 of three elements, a negative second lens unit 162 of four elements, a positive third lens unit 163 of four elements, and a negative fourth lens unit 164 of two elements, the first and third lens units moving axially forward when zooming from the wide angle to the telephoto end, while the second unit simultaneously moves axially rearward, whereby the third unit 163 includes a negative power-transit radial type refractive index distributive lens of surfaces R19 and R20 having a divergent action in the interior thereof.

In the conventional zoom lens of the kind described above where the negative second and positive third lens units bear respective image magnification varying effects, when the power of the third unit is increased in view of reducing the size and increasing the zoom ratio, it produces large aberrations, particularly under-corrected spherical aberration and astigmatism, so that the image aberrations become very difficult to correct. For this reason, the method for correcting the aforesaid aberrations was to provide a divergent lens surface in the third unit. But the divergent surface curvature became so strong that higher order aberrations were produced which were difficult to correct. So it has been impossible to achieve the desired reduction of the size and the valuable increase of the zoom ratio. At the zoom lens of the invention, however, the use of the negative power-transit refractive index distributive lens in the third unit allows the various aberrations to be well corrected without causing an increase in the size of the third unit. In more detail, mainly the spherical aberration and astigmatism are over-corrected, and as a large proportion of the negative power is shared by the medium, the divergent surface curvature is allowed to weaken. Thus, higher order aberrations are prevented from producing at the divergent surface.

Another conventional problem arising from the increase in the power of each lens unit with the aim of a much-desired reduction of the total length as in this example, is that, in the general case, the Petzval sum is largely increased in the negative sense, so that curvature of field becomes difficult to correct. In the invention, however, by introducing the radial type lens into the third unit 163, that problem is eliminated. That is, the contribution to the Petzval sum of the radial type refractive index distributive lens as is ascribable to the transiting power, $\phi$, amounts up to approximately $\phi/N_0^2$, and its absolute value is smaller than that which is ascribable to the refracting surfaces, or $\phi/N$. Therefore, by using the negative power-transit refractive index distributive lens, the Petzval sum is made smaller than when a homogeneous lens of the same power is in use, thereby it being made possible to correct the Petzval sum of the entire system. Further, because room is created for correcting the Petzval sum, a glass of relatively high refractive index can be used in making up the positive first lens of the third unit 163 with an advantage that the number of elements is reduced and the overall thickness of the third unit is decreased.

The foregoing features of the invention have made it possible to realize a zoom lens of greatly reduced size with as high a range as about 3.

Numerical Example 16

$F = 100-281 \quad FNO = 1:3.5-4.7 \quad 2\omega = 62°-24°$

| | | | |
|---|---|---|---|
| R1 = 610.082 | D1 = 6.19 | N1 = 1.80518 | $\nu 1$ = 25.4 |
| R2 = 173.207 | D2 = 21.62 | N2 = 1.60311 | $\nu 2$ = 60.7 |
| R3 = −349.023 | D3 = 0.33 | | |
| R4 = 101.647 | D4 = 11.00 | N3 = 1.60311 | $\nu 3$ = 60.7 |
| R5 = 239.823 | D5 = Variable | | |
| R6 = 1163.134 | D6 = 3.30 | N4 = 1.80400 | $\nu 4$ = 46.6 |
| R7 = 46.748 | D7 = 14.33 | | |
| R8 = −111.152 | D8 = 3.16 | N5 = 1.83481 | $\nu 5$ = 42.7 |
| R9 = 309.530 | D9 = 0.63 | | |
| R10 = 93.107 | D10 = 12.38 | N6 = 1.80518 | $\nu 6$ = 25.4 |
| R11 = −97.659 | D11 = 2.17 | | |
| R12 = −67.211 | D12 = 3.16 | N7 = 1.80400 | $\nu 7$ = 46.6 |
| R13 = −287.590 | D13 = Variable | | |
| R14 = 0.0 | D14 = 2.75 | | |
| R15 = 66.587 | D15 = 11.00 | N8 = 1.77250 | $\nu 8$ = 49.6 |
| R16 = −604.172 | D16 = 0.28 | | |
| R17 = 83.030 | D17 = 6.88 | N9 = 1.62299 | $\nu 9$ = 58.2 |
| R18 = 166.746 | D18 = 5.68 | | |
| R19 = 215.782 | D19 = 15.32 | N10 = N10 (h) | |
| R20 = 78.172 | D20 = 5.64 | | |
| R21 = −205.827 | D21 = 6.88 | N11 = 1.67000 | $\nu 11$ = 51.6 |
| R22 = −66.821 | D22 = Variable | | |
| R23 = 0.0 | D23 = Variable | | |
| R24 = −54.766 | D24 = 3.03 | N12 = 1.80400 | $\nu 12$ = 46.6 |
| R25 = −561.478 | D25 = 11.55 | N13 = 1.63930 | $\nu 13$ = 44.9 |
| R26 = −53.306 | | | |

| f | 100 | 170 | 281 |
|---|---|---|---|
| D5 | 5.86 | 31.53 | 53.61 |
| D13 | 51.09 | 25.42 | 3.34 |
| D22 | 2.60 | 8.11 | 22.96 |
| D23 | 13.20 | 29.79 | 37.03 |

N10 (h) = $N_0 h + N_1 h^2 + N_2 h^4 + N_3 h^6 + N_4 h^8 +$

| $\lambda$ | $N_0$ | $N_1$ | $N_2$ | $N_3$ | $N_4$ |
|---|---|---|---|---|---|
| d | 1.75520 | 1.69830 × $10^{-4}$ | 6.66923 × $10^{-8}$ | 9.09760 × $10^{-14}$ | 6.82251 × $10^{-15}$ |
| g | 1.79132 | 1.86492 × $10^{-4}$ | 6.90556 × $10^{-8}$ | −1.68010 × $10^{-12}$ | 1.04054 × $10^{-14}$ |

Figure 34A:
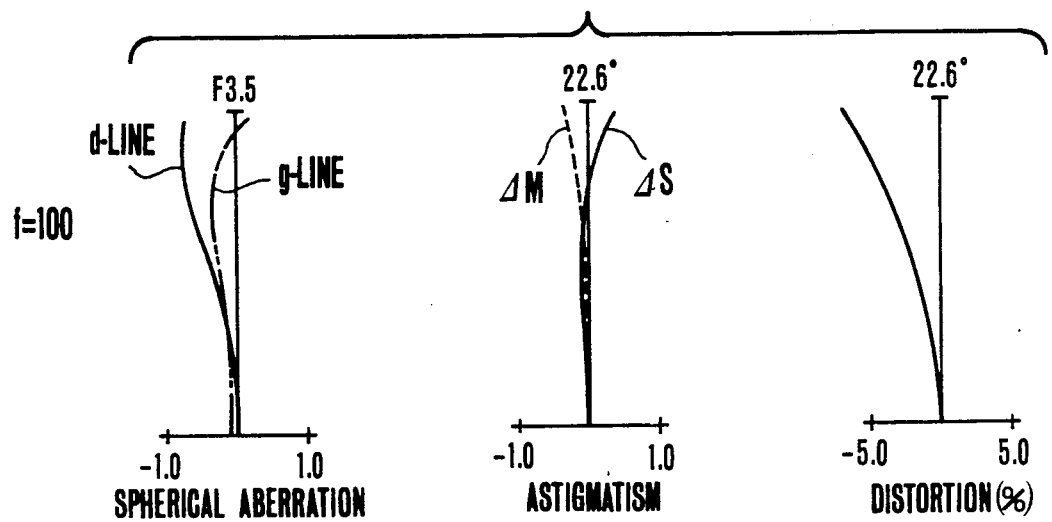
Figure 34B:
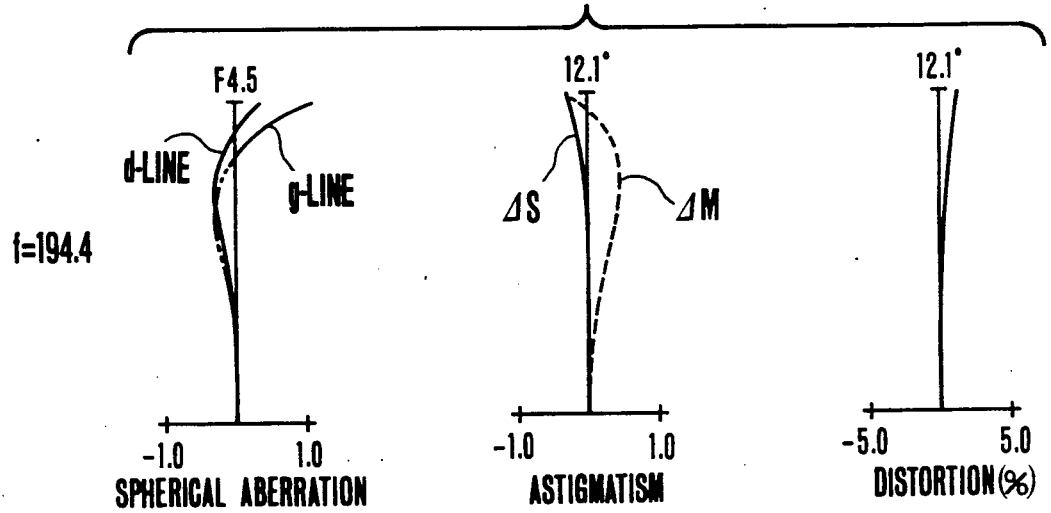
Figure 34C:
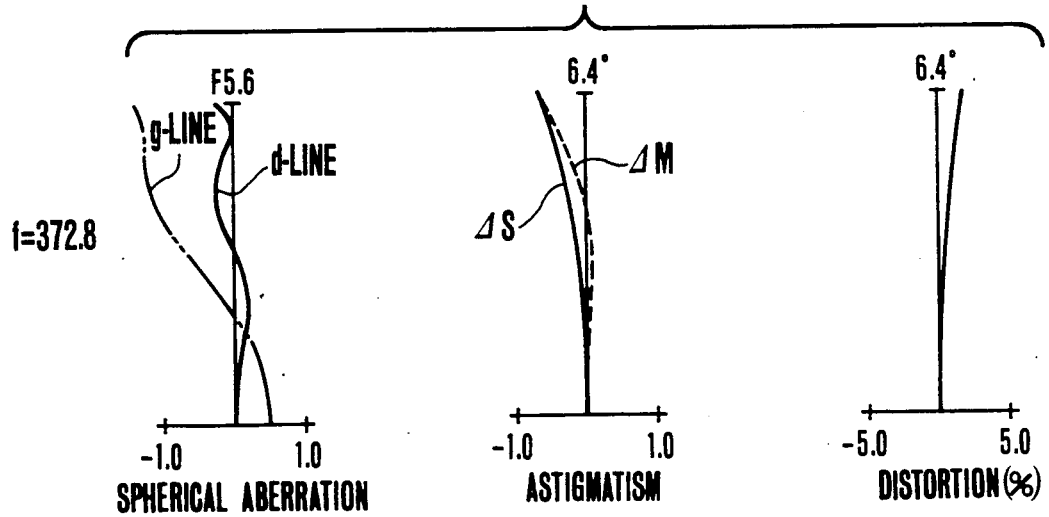

A seventeenth of a specific zoom lens of the invention is illustrated in FIG. 33, of which the aberrations are shown in FIGS. 34A to 34C, comprising, from front to rear, a positive first lens unit 171 of three elements, a negative second lens unit 172 of four elements, a positive third lens unit 173 of five elements, the first and third units moving axially forward at the same speeds when zooming from the wide angle to the telephoto end, in such a manner that the magnifying powers of the second and third units both increase, while the second unit simultaneously moves axially to compensate for the image shift during zooming, to thereby achieve a large increase in the zooming range.

In this example, the third unit is constructed by using a bi-convex positive lens having surfaces R13 and R14 at the frontmost position of the front part in the radial type refractive index distributive form, an adjacent positive lens having surfaces R15 and R16 in the axial type refractive index distributive form, and a bi-convex lens having surfaces R18 and R19 at the rear part in the radial type refractive index distributive form. The first radial type lens is of positive power-transit, playing, an important part in correcting curvature of field, spherical aberration and coma. The axial type lens has such a distribution that the refractive index decreases as the distance from the front vertex increases, playing an important role in correcting spherical aberration and coma. The second radial type lens is of negative power-transit, playing an important part in limiting the over-correction of field curvature to a minimum and correcting astigmatism.

The use of such three novel lenses provides a possibility of achieving the much-desired reduction of the size of the entire system by the method of reducing the interval between the principal points of the second and third units in such a manner that the curvature of field, which would be otherwise very over-corrected as it prevails in the telephoto type in which the front principal point of the front part of the third unit is brought ahead, is suppressed against that direction, and the spherical aberration, coma and astigmatism can be maintained stable throughout the entire zooming range. For as high a given zoom ratio as 3.73, the physical length of the entire system is remarkably reduced to 0.863 in the ratio of the shortest physical length when in carriage to the longest focal length.

Numerical Example 17

F = 100–372.8 , FNO = 1:3.5–5.6   2ω = 45.2°–12.8°

| | | |
|---|---|---|
| R1 = 1058.434 | D1 = 3.85 | N1 = 1.85026 | ν1 = 32.3 |
| R2 = 122.067 | D2 = 14.43 | | |
| R3 = 125.946 | D3 = 16.34 | N2 = 1.62280 | ν2 = 57.0 |
| R4 = −259.136 | D4 = 0.19 | | |
| R5 = 143.675 | D5 = 7.69 | N3 = 1.61800 | ν3 = 63.4 |
| R6 = 229.377 | D6 = Variable | | |
| R7 = −1224.578 | D7 = 2.69 | N4 = 1.77250 | ν4 = 49.6 |
| R8 = 93.564 | D8 = 6.73 | N5 = 1.81600 | ν5 = 46.6 |
| R9 = 326.617 | D9 = 4.31 | | |
| R10 = −88.314 | D10 = 2.69 | N6 = 1.75500 | ν6 = 52.3 |
| R11 = 66.774 | D11 = 7.31 | N7 = 1.92286 | ν7 = 20.9 |
| R12 = 199.593 | D12 = Variable | | |
| R13 = 333.749 | D13 = 12.74 | N8 = N8 (h) | |
| R14 = −111.406 | D14 = 0.29 | | |
| R15 = 61.268 | D15 = 18.70 | N9 = N9 (x) | |
| R16 = −165.159 | D16 = 2.88 | N10 = 1.72151 | ν10 = 29.2 |
| R17 = 938.810 | D17 = 33.66 | | |
| R18 = 1032.632 | D18 = 14.37 | N11 = N11 (h) | |
| R19 = −166.128 | D19 = 13.92 | | |
| R20 = −52.817 | D20 = 3.85 | N12 = 1.56138 | ν12 = 45.2 |
| R21 = −95.834 | | | |

| | f | 100 | 194.4 | 372.8 |
|---|---|---|---|---|
| | D6 | 22.0364 | 58.5429 | 85.8519 |
| | D12 | 65.1068 | 28.6001 | 1.2913 |

$N8\ (h) = N_0 + N_1 h^2 + N_2 h^4 + N_3 h^6 + N_4 h^8$
$N9\ (x) = N_0 + N_1 x + N_2 x^2 + N_3 x^3$
$N11\ (h) = N_0 + N_1 h^2 + N_2 h^4 + N_3 h^6 + N_4 h^8$

| | λ | $N_0$ | $N_1$ | $N_2$ | $N_3$ | $N_4$ |
|---|---|---|---|---|---|---|
| N8 (h) | d | 1.60311 | 7.61480 × 10⁻⁵ | 3.64339 × 10⁻⁸ | 1.13664 × 10⁻¹¹ | 2.01629 × 10⁻¹⁴ |
| | g | 1.61539 | 7.80412 × 10⁻⁵ | 4.02673 × 10⁻⁸ | 9.94466 × 10⁻¹² | 1.94464 × 10⁻¹⁴ |
| N9 (x) | d | 1.60311 | −1.42736 × 10⁻³ | 1.57548 × 10⁻⁵ | −1.91731 × 10⁻⁶ | |
| | g | 1.61539 | −1.26507 × 10⁻³ | −1.43911 × 10⁻⁴ | −6.46575 × 10⁻⁸ | |
| N11 (h) | d | 1.51633 | 1.14579 × 10⁻⁴ | 7.12662 × 10⁻⁸ | 1.95323 × 10⁻¹¹ | 4.01543 × 10⁻¹⁴ |
| | g | 1.52621 | 1.12782 × 10⁻⁴ | 6.11202 × 10⁻⁸ | 3.59398 × 10⁻¹¹ | 4.75155 × 10⁻¹⁴ |

Figure 35:
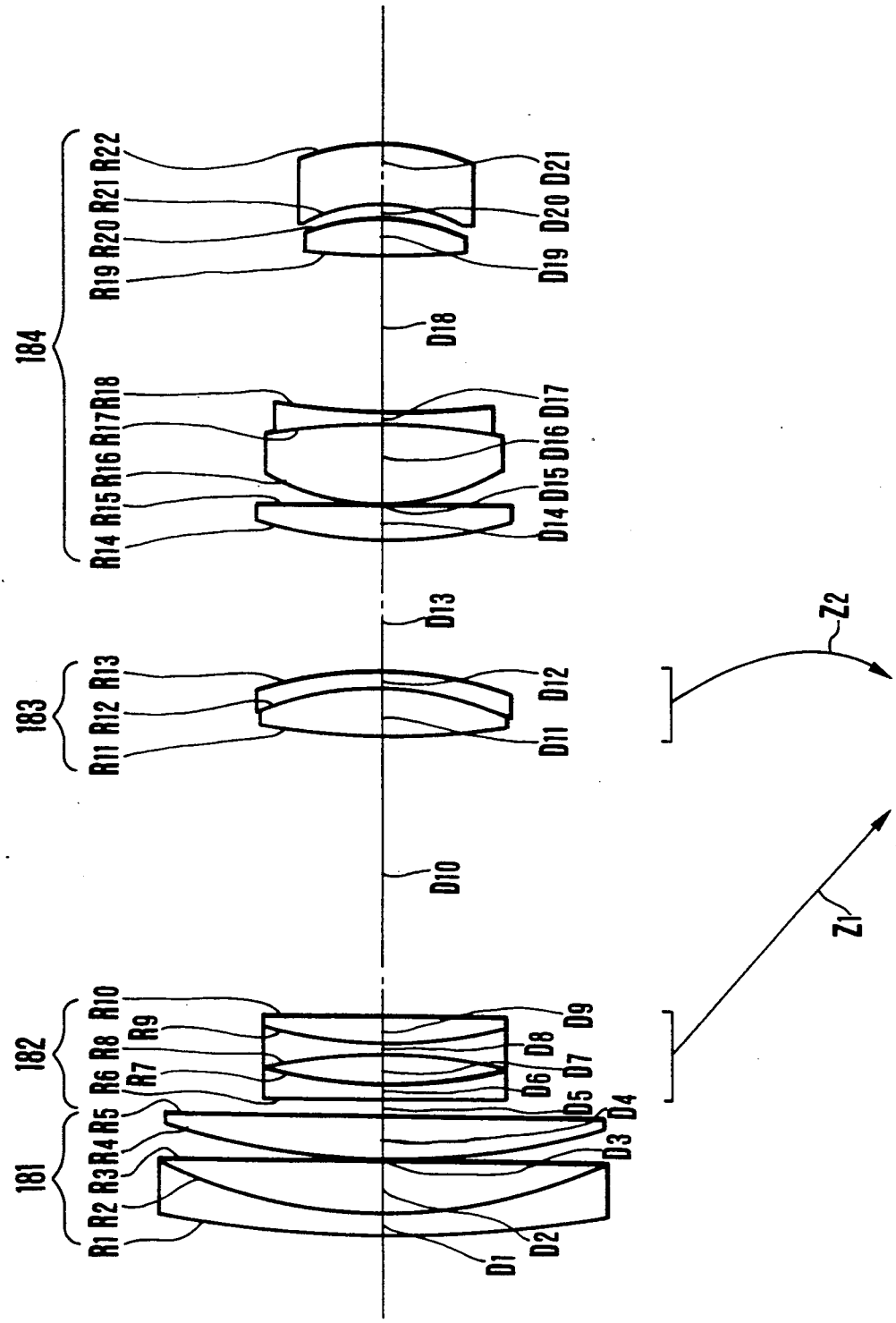
Figure 36A:
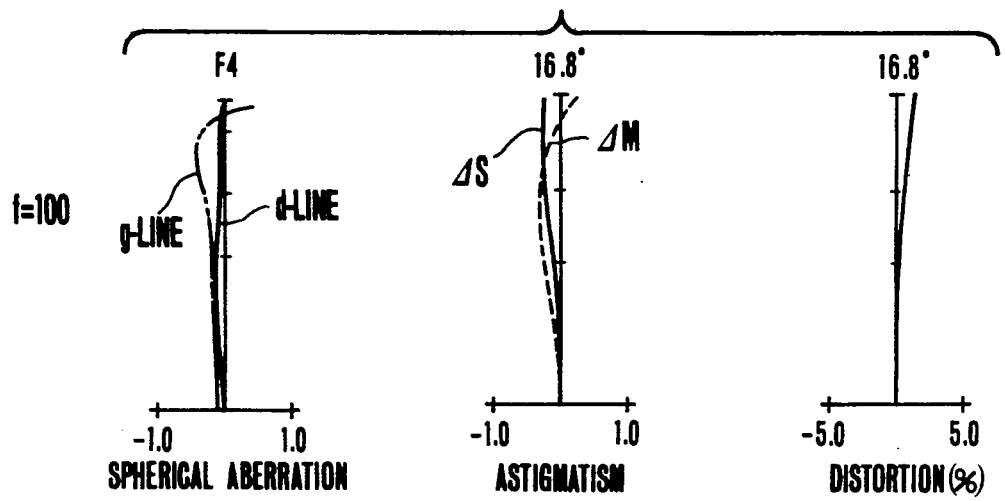
Figure 36B:
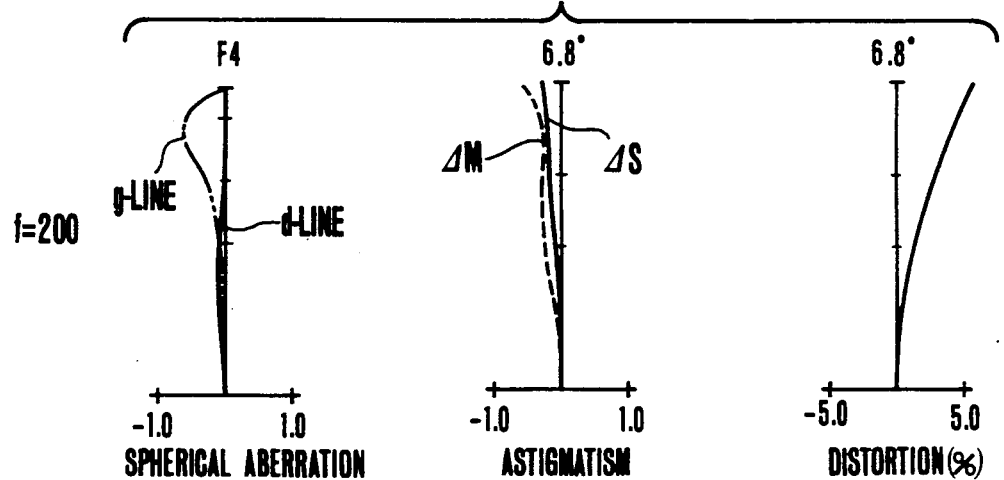
Figure 36C:
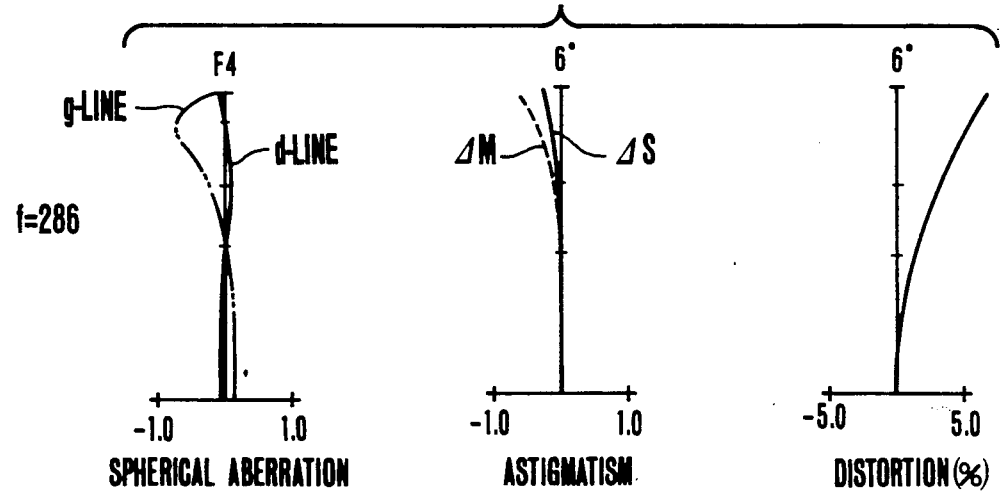

An eighteenth example of a specific zoom lens illustrated in FIG. 35 comprises, from front to rear, a positive first lens unit 181 stationary during zooming, a negative second lens unit 182 axially movable as indicated by an arrow Z1 for varying the image magnification, a positive third lens unit axially movable as indicated by another arrow Z2 for maintaining the constant position of an image plane, and a positive fourth lens unit 184 stationary during zooming. The fourth, or so-called relay lens unit 184 is constructed as including a convex lens having surfaces R14 and R15 in the positive power-transit radial type refractive index distributive form at the frontmost position of the front part, an adjacent convex lens having surfaces R16 and R17 in the negative power-transit radial type refractive index distributive form, and a meniscus lens having surfaces R21 and R22 at the rearmost position of the rear part in the negative power-transit radial type refractive index distributive form.

As has been mentioned before, the use of the method of decreasing the telephoto ratio of the relay lens in achieving the much-desired reduction of the size of the zoom lens leads to intensify the over-correction of field curvature to such an extent that it cannot be cancelled by any conventional design of the other units. However, in the zoom lens of the invention, use is made of the negative power-transit meniscus lens in the rear part of the relay or fourth lens unit 184 so that the interior of that lens, because of its having a divergent effect, contribute to an increase of the negative power of the rear part in the negative sense by which the telephoto ratio of the fourth unit 184 is decreased. The point to notice here is that while the negative lens of homogeneous material has its Petzval sum to take a value: $\phi/N_0$ where $\phi$ is the power of the lens and $N_0$ is the refractive index, it is at the radial type refractive index distributive lens that as the Petzval sum is expressed by $\phi/N_0^2$, its value changes in inverse proportion to the square of the refractive index, and, therefore, a smaller amount of the Petzval sum is produced, so that even when the telephoto ratio of the fourth unit 184 is decreased, the curvature of field can be limited to a minimum.

Another two radial type refractive index distributive lenses, which are used in the front part of the fourth unit 184, have, despite the decrease in the necessary number of elements with the reduction of the total length, to well correct curvature of field, spherical aberration and astigmatism.

transit radial type refractive index distributive medium, a rearwardly adjacent doublet of which the front or convex element defined by surfaces R8 and R9 is made of front-to-rear down slope axial type refractive index distributive medium, and a front one of two concave lenses constituting the rear part of the third unit, which is defined by surfaces R11 and R12, is made of negative power-transit radial type refractive index distributive medium.

In this zoom lens, the second unit 192 is also made, as a whole, of negative power-transit refractive index distributive medium with an advantage of improving the correction of spherical aberration in the telephoto positions and further minimizing the amount of the Petzval sum produced. Taking a numerical example of the conventional zoom lens of the same power arrangement, the negative second unit made of homogeneous material alone produces a Petzval sum of $-1.45$ to $-1.6$ based on unity of focal length of the entire system in contradiction to $-0.96$ in the present invention.

Such a large reduction in the Petzval sum of the second unit 192 allows for employment of the method of forming the third unit to the telephoto type in reducing the size of the entire system. It is in the invention

Numerical Example 18

F = 100–286    FNO = 1:4.0    2ω = 33.5°–12°

| | | | |
|---|---|---|---|
| R1 = 195.068 | D1 = 3.76 | N1 = 1.80518 | $\nu 1$ = 25.4 |
| R2 = 93.266 | D2 = 9.40 | N2 = 1.61272 | $\nu 2$ = 58.7 |
| R3 = 58340.891 | D3 = 0.14 | | |
| R4 = 131.571 | D4 = 6.69 | N3 = 1.61272 | $\nu 3$ = 58.7 |
| R5 = 221519.437 | D5 = Variable | | |
| R6 = 714.405 | D6 = 2.09 | N4 = 1.71300 | $\nu 4$ = 53.8 |
| R7 = 55.496 | D7 = 5.88 | | |
| R8 = −62.772 | D8 = 1.95 | N5 = 1.71300 | $\nu 5$ = 53.8 |
| R9 = 62.789 | D9 = 4.74 | N6 = 1.84666 | $\nu 6$ = 23.9 |
| R10 = −1831.869 | D10 = Variable | | |
| R11 = 148.046 | D11 = 8.08 | N7 = 1.51633 | $\nu 7$ = 64.1 |
| R12 = −44.817 | D12 = 1.95 | N8 = 1.75520 | $\nu 8$ = 27.5 |
| R13 = −79.338 | D13 = Variable | | |
| R14 = 62.624 | D14 = 5.74 | N9 = N9 (h) | |
| R15 = 7841.012 | D15 = 0.14 | | |
| R16 = 38.557 | D16 = 13.28 | N10 = N10 (h) | |
| R17 = −82.341 | D17 = 2.09 | N11 = 1.92286 | $\nu 11$ = 20.9 |
| R18 = 149.496 | D18 = 27.21 | | |
| R19 = 137.780 | D19 = 5.57 | N12 = 1.53256 | $\nu 12$ = 45.9 |
| R20 = −37.470 | D20 = 3.16 | | |
| R21 = −26.092 | D21 = 10.12 | N13 = N13 (h) | |
| R22 = −38.926 | | | |

| f | 100 | 200 | 286 |
|---|---|---|---|
| D5 | 2.3926 | 47.5055 | 61.0879 |
| D10 | 47.1435 | 22.2934 | 0.9012 |
| D13 | 23.2591 | 2.9962 | 10.8061 |

| | λ | $N_0$ | $N_1$ | $N_2$ | $N_3$ |
|---|---|---|---|---|---|
| N9 (h) | g | 1.53113 | $-1.40101 \times 10^{-4}$ | $5.15986 \times 10^{-8}$ | $1.44289 \times 10^{-10}$ |
| | d | 1.54160 | $-7.60684 \times 10^{-5}$ | $5.39739 \times 10^{-8}$ | $4.32743 \times 10^{-10}$ |
| N10 (h) | g | 1.51633 | $1.35945 \times 10^{-4}$ | $-6.07396 \times 10^{-8}$ | $-1.28137 \times 10^{-10}$ |
| | d | 1.52621 | $8.57620 \times 10^{-5}$ | $-7.83396 \times 10^{-8}$ | $-4.10306 \times 10^{-10}$ |
| N13 (h) | g | 1.51633 | $1.51842 \times 10^{-3}$ | $1.06359 \times 10^{-7}$ | $2.58554 \times 10^{-10}$ |
| | d | 1.52621 | $1.66218 \times 10^{-3}$ | $1.25181 \times 10^{-7}$ | $1.43805 \times 10^{-10}$ |

Figure 37:
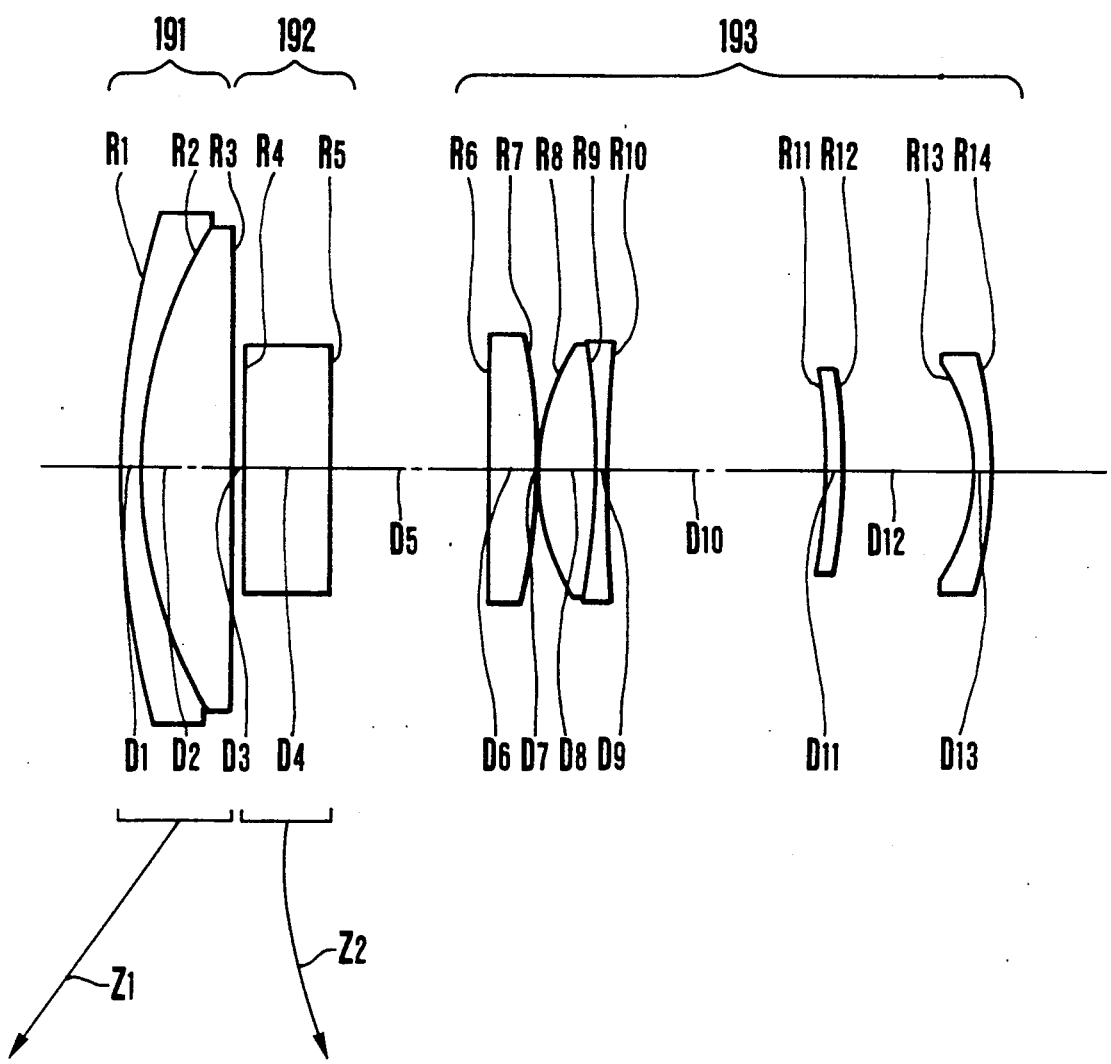
Figure 38A:
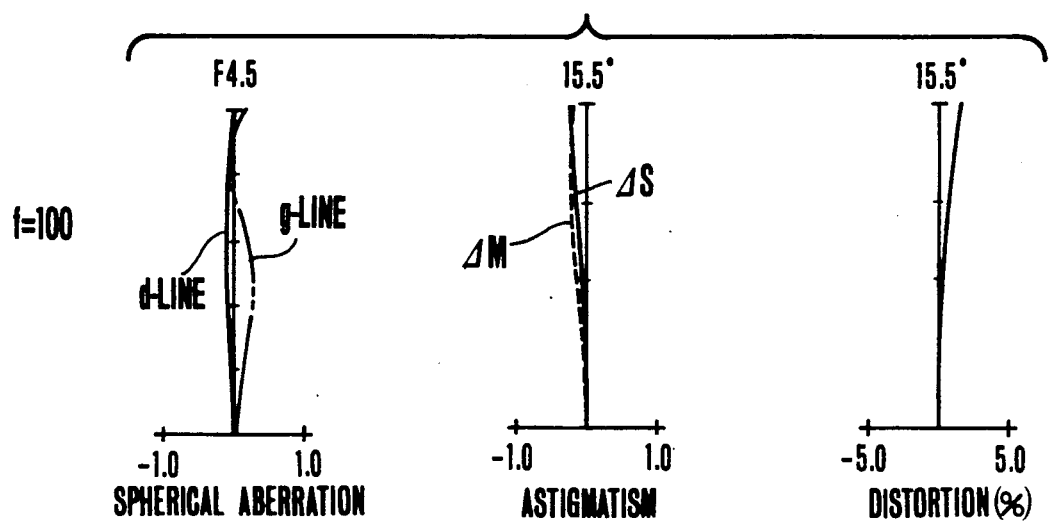
Figure 38B:
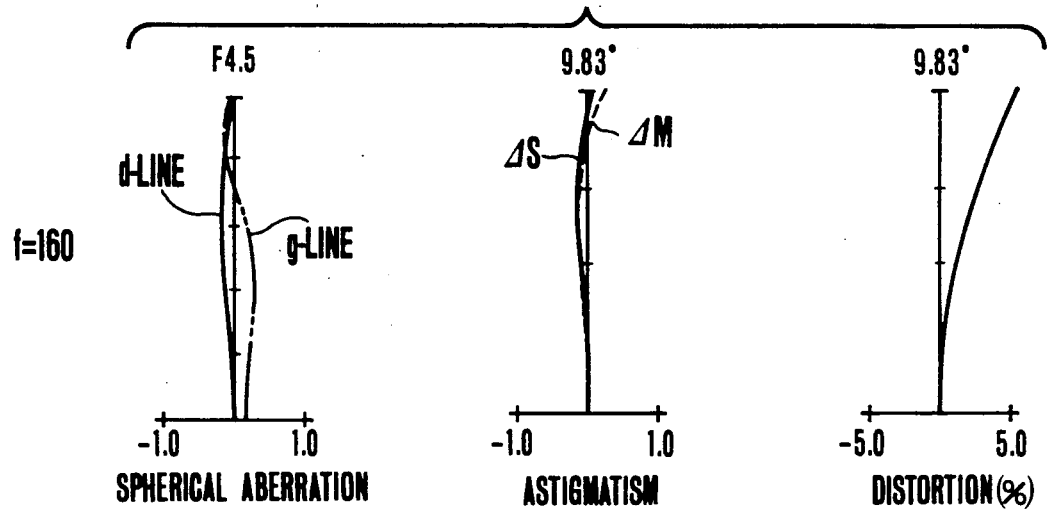
Figure 38C:
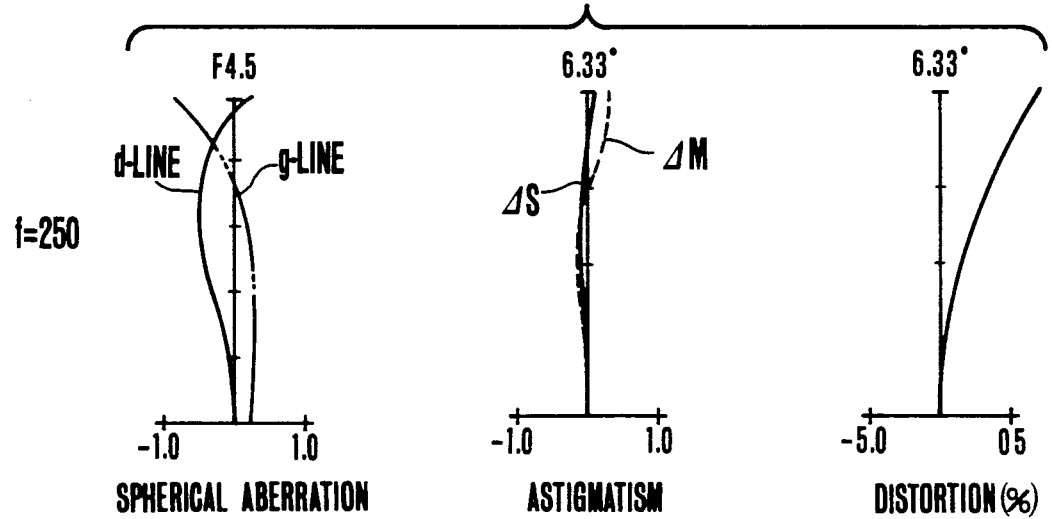

A nineteenth example of a specific zoom lens of the invention is illustrated in FIG. 37, of which the aberrations are shown in FIGS. 38A to 38C, comprising, from front to rear, a positive first lens unit 191 axially movable as indicated by an arrow Z1 during zooming, a negative second lens unit 192 axially movable as indicated by another arrow Z2 during zooming to contribute to the variation of the image magnification, and a positive third lens unit 193 stationary during zooming. A frontmost convex lens, defined by surfaces R6 and R7, in the third unit 193 is made of negative power-that the telephoto ratio of the third unit is decreased in such a way that the aforesaid three refractive index distributive lenses are used to further strengthen the tendency toward the telephoto nature. Therefore, it has been made possible to remarkably reduce the total optical length of the entire system. The signification of each of such three lenses is explained below.

The first lens R6, R7 in the front part of the third unit 193, because its power transit being negative, has an unfavorable distribution to the correction of spherical aberration by its refracting surfaces. By strengthening the curvatures of the surfaces R6 and R7 to tend curvature of field to be under-corrected, however, it is prevented from resulting in over-correction. Also, the controlling of the coefficient N2 of the refractive index distribution is used for correcting the spherical aberration and coma produced from the refracting surfaces by the rays in passing through the interior medium of that lens.

The second lens R8, R9 has progressively lower refractive indices as the distance from the front vertex increases so that on the front convex surface R8, as the height from the optical axis increases, the refractive index at the surface lowers, causing the angle of refraction of the incident ray to become smaller than when the homogeneous lens of the same front surface curvature is in use. Thereby an effect of correcting spherical aberration and coma is produced.

The third lens R11, R12, because of its having the negative power transit, or the divergent action in the interior thereof, gets an ability to increase the negative power of the rear part. Since this is done not by increasing the surface curvatures, the Petzval sum has a smaller value. Thus the tendency of field curvature toward over-correction is weakened. Further, astigmatism is corrected by controlling the shape of refractive index distribution $N_7(h)$.

Thanks to the use of such refractive index distributive lenses, not only the curvature of field which would be otherwise objectionably over-corrected as is unique to the principal point-ahead-the-lens telephoto type, but also the spherical aberration, coma and astigmatism are well corrected, under the condition that a great advance in compactness is achieved. Taking a numerical example of the conventional zoom lens of the same dimensions, the degree of portableness in terms of the ratio of the shortest physical length when in the wide angle setting to the longest focal length is from about 0.85 to about 1.0 in contradiction to 0.645 in the invention.

Numerical Example 19

F = 100-250   FNO = 1:4.5   2ω = 33.0°-12.7°

| R1 = 106.084 | D1 = 3.32 | N1 = 1.80518 | ν1 = 25.4 |
| R2 = 58.076 | D2 = 11.88 | N2 = 1.62374 | ν2 = 47.1 |
| R3 = −489.144 | D3 = Variable | | |
| R4 = 1045.216 | D4 = 11.68 | N3 = N3 (h) | |
| R5 = −273.849 | D5 = Variable | | |
| R6 = 323.215 | D6 = 6.60 | N4 = N4 (h) | |
| R7 = −74.986 | D7 = 0.13 | | |
| R8 = 30.128 | D8 = 6.72 | N5 = N5 (x) | |
| R9 = −73.105 | D9 = 1.92 | N6 = 1.72151 | ν6 = 29.2 |
| R10 = 397.026 | D10 = 28.66 | | |
| R11 = −55.865 | D11 = 2.19 | N7 = N7 (h) | |
| R12 = −62.834 | D12 = 16.63 | | |
| R13 = −26.147 | D13 = 2.55 | N8 = 1.51728 | ν8 = 69.6 |
| R14 = −66.609 | | | |

| f | 100 | 160 | 250 |
|---|---|---|---|
| D3 | 0.7249 | 47.4124 | 75.4248 |
| D5 | 19.6360 | 12.7996 | 2.5449 |

| | λ | $N_0$ | $N_1$ | $N_2$ | $N_3$ | $N_4$ |
|---|---|---|---|---|---|---|
| N3 (h) | g | 1.51633 | $1.20582 \times 10^{-3}$ | $2.17677 \times 10^{-7}$ | $8.81288 \times 10^{-11}$ | $3.44547 \times 10^{-14}$ |
| | d | 1.52621 | $1.20921 \times 10^{-3}$ | $2.15365 \times 10^{-7}$ | $1.35241 \times 10^{-10}$ | $-3.86704 \times 10^{-13}$ |
| N4 (h) | g | 1.62041 | $1.31092 \times 10^{-4}$ | $1.83723 \times 10^{-7}$ | $2.97786 \times 10^{-10}$ | $3.60954 \times 10^{-13}$ |
| | d | 1.63316 | $1.59485 \times 10^{-4}$ | $2.54635 \times 10^{-7}$ | $2.17559 \times 10^{-10}$ | $6.92295 \times 10^{-13}$ |
| N5 (x) | g | 1.63854 | $-8.10577 \times 10^{-3}$ | $3.54976 \times 10^{-4}$ | $-4.23447 \times 10^{-5}$ | |
| | d | 1.65292 | $-7.85935 \times 10^{-3}$ | $3.67316 \times 10^{-4}$ | $-6.08825 \times 10^{-5}$ | |
| N7 (h) | g | 1.61633 | $6.19898 \times 10^{-4}$ | $2.48844 \times 10^{-6}$ | $4.66251 \times 10^{-9}$ | $1.04867 \times 10^{-12}$ |
| | d | 1.52621 | $5.73366 \times 10^{-4}$ | $2.60420 \times 10^{-6}$ | $2.63683 \times 10^{-9}$ | $1.17387 \times 10^{-11}$ |

Figure 39:
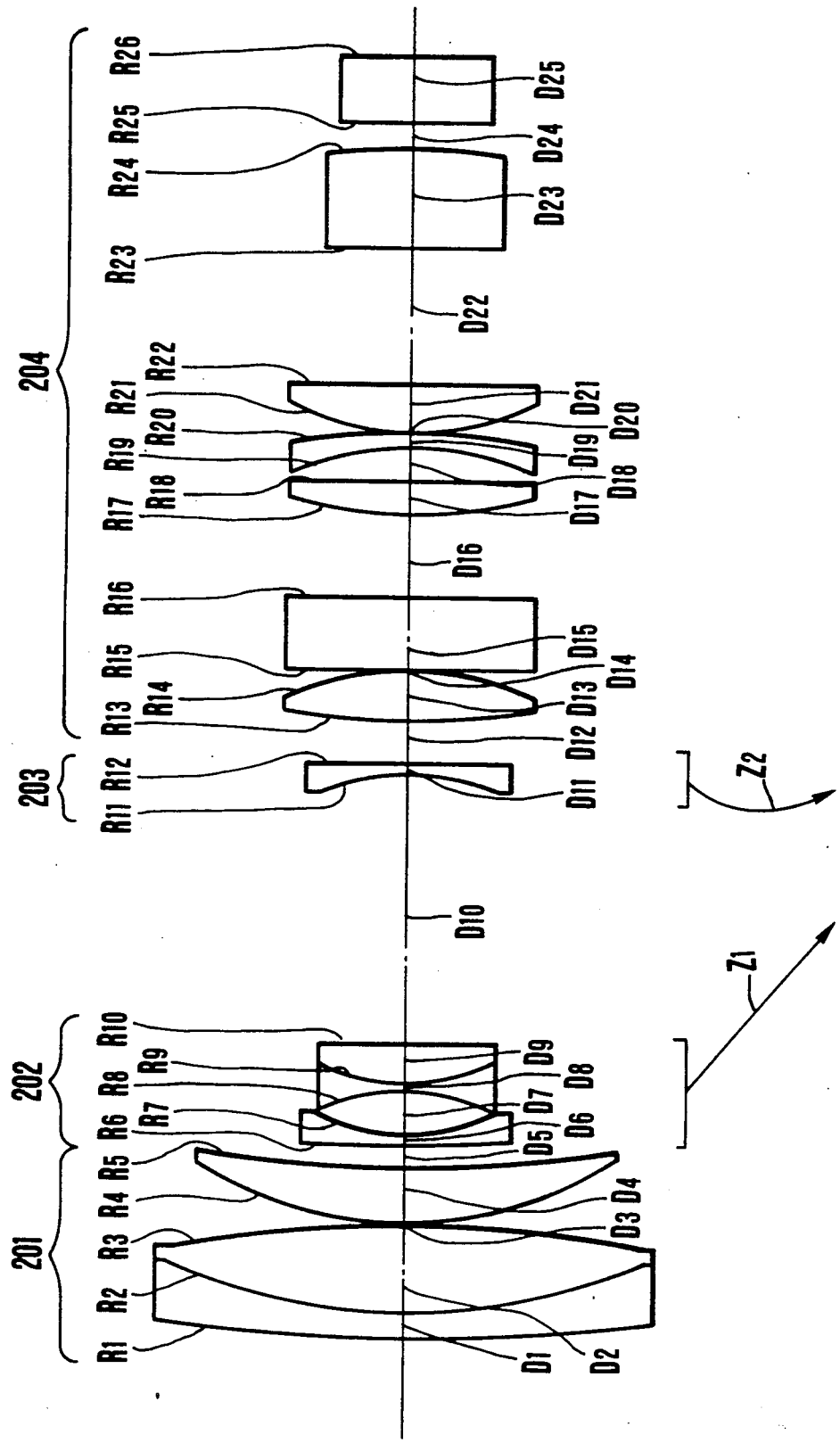
Figure 40A:
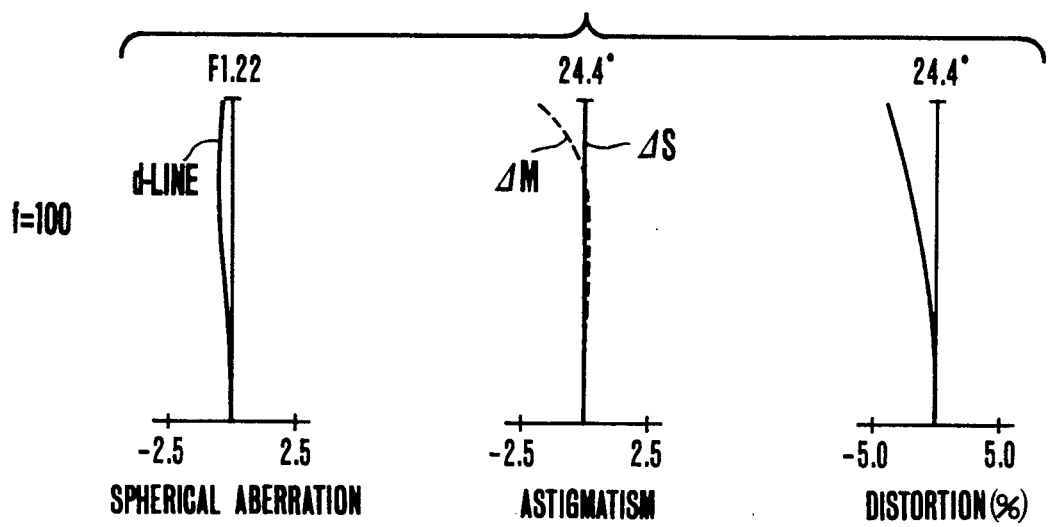
Figure 40B:
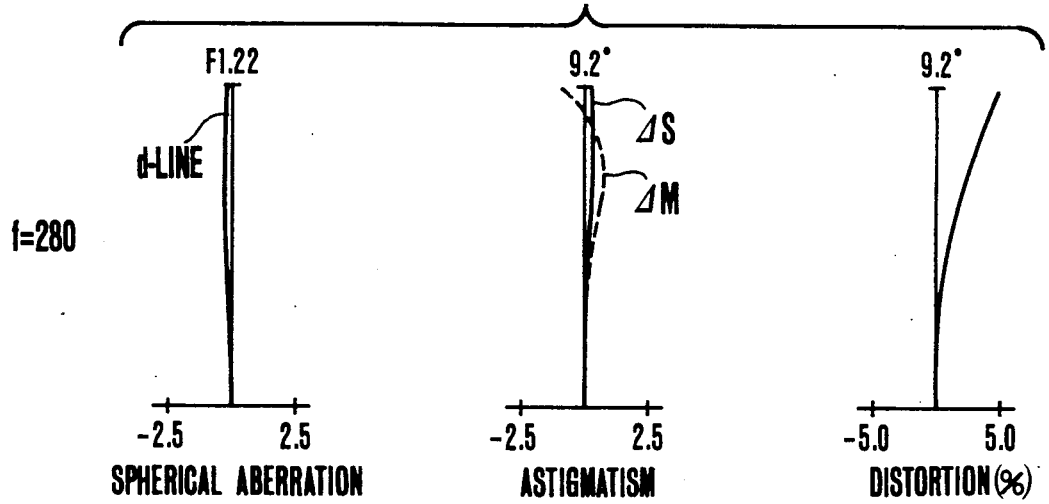
Figure 40C:
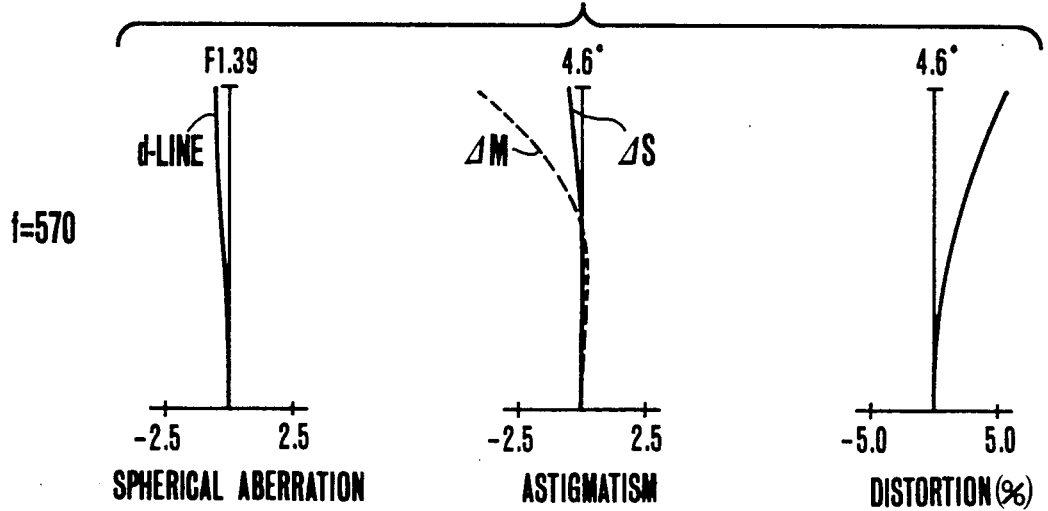

A twentieth example of a specific zoom lens of the invention is illustrated in FIG. 39, of which the aberrations are shown in FIGS. 40A to 40C, comprising, from front to rear, a positive first lens unit 201 stationary during zooming, a negative second lens unit 202 axially movable as indicated by an arrow Z1 for contributing to variation of the image magnification, a negative third lens unit 203 axially movable as indicated by another arrow Z2 for compensating for the image shift, and a positive fourth lens unit stationary during zooming. The fourth unit 204 comprises front and rear parts with the air separation therebetween being longest among those between the successive two of the lens elements in that unit, of which the rear part includes a positive lens having the function of making the principal ray of the oblique beam almost parallel to the optical axis. This lens, or the one defined by surfaces R23 and R24, is made up of positive power-transit refractive index distributive material. Because the duty of having the positive power can be borne on the interior to an extent, the curvatures of the surfaces R23 and R24 can be greatly weakened. Also, because the refractive indices at these surfaces become progressively lowered as the height from the optical axis increases, the higher the point of incidence of a ray, the smaller the refraction for that ray. Therefore, the amount of spherical aberration produced therefrom is small, and the under-corrected coma and astigmatism usually produced from the positive group of elements R17 to R22 positioned just behind a diaphragm are corrected. Further, when the coefficient N2 of refractive index distribution is taken at a positive value, spherical aberration also is corrected by the passage of the rays through the interior Moreover, no under-correction of distortion results which is often encountered with the use of a convex lens on which the principal ray arrives at a high height. Therefore, only one lens element suffices for constructing the rear part of the fourth unit in contradiction to the conventional design which requires three or four lens elements, giving an advantage of making easy the assembling and adjusting operations.

Numerical Example 20

F = 100-570  FNO = 1:1.22-1.39  2ω = 49.0°-9°

| | | | |
|---|---|---|---|
| R1 = 1656.780 | D1 = 22.73 | N1 = 1.80518 | ν1 = 25.4 |
| R2 = 460.895 | D2 = 92.04 | N2 = 1.60311 | ν2 = 60.7 |
| R3 = −1206.452 | D3 = 1.70 | | |
| R4 = 355.491 | D4 = 51.14 | N3 = 1.69680 | ν3 = 55.5 |
| R5 = 1154.930 | D5 = Variable | | |
| R6 = 971.150 | D6 = 11.36 | N4 = 1.77250 | ν4 = 49.6 |
| R7 = 155.806 | D7 = 43.84 | | |
| R8 = −202.438 | D8 = 11.36 | N5 = 1.73500 | ν5 = 49.8 |
| R9 = 213.710 | D9 = 36.36 | N6 = 1.84666 | ν6 = 23.9 |
| R10 = −2717.151 | D10 = Variable | | |
| R11 = −276.943 | D11 = 11.36 | N7 = 1.69680 | ν7 = 55.5 |
| R12 = 15112.848 | D12 = Variable | | |
| R13 = 621.683 | D13 = 47.73 | N8 = 1.71300 | ν8 = 53.8 |
| R14 = −310.849 | D14 = 2.27 | | |
| R15 = 0.0 | D15 = 68.18 | | |
| R16 = 0.0 | D16 = 77.84 | | |
| R17 = 424.196 | D17 = 34.09 | N9 = 1.74400 | ν9 = 44.7 |
| R18 = −4610.598 | D18 = 32.50 | | |
| R19 = −234.035 | D19 = 11.36 | N10 = 1.84666 | ν10 = 23.9 |
| R20 = −833.803 | D20 = 1.70 | | |
| R21 = 288.535 | D21 = 44.32 | N11 = 1.69680 | ν11 = 55.5 |
| R22 = −4401.660 | D22 = 129.66 | | |
| R23 = 6543.000 | D23 = 91.66 | N12 = N12 (h) | |
| R24 = −468.554 | D24 = 22.73 | | |
| R25 = 0.0 | D25 = 62.50 | N13 = 1.51633 | ν13 = 64.1 |
| R26 = 0.0 | | | |

| f | 100 | 280 | 570 |
|---|---|---|---|
| D5 | 21.50 | 196.44 | 269.14 |
| D10 | 257.50 | 60.72 | 29.30 |
| D12 | 37.91 | 59.75 | 18.47 |

| | λ | $N_0$ | $N_1$ | $N_2$ |
|---|---|---|---|---|
| N12 (h) | d | 1.85 | $-6.97515 \times 10^{-6}$ | $2.84305 \times 10^{-10}$ |

According to the invention described above, because the number of constituent lens elements of each unit of the zoom lens can be reduced, the weight and size can be reduced. Also because the overall axial thickness of each unit can be reduced by decreasing the necessary number of constituent lens elements, room is created for the spacing between the successive two of the lens units. This allows for an increase of the axial movement of each zoom unit and, therefore, makes it possible to readily increase the zoom ratio. Further, because the air separations between the lenses each can be reduced when the number of lens elements in each lens unit is decreased, it is made possible to remarkably shorten the total length.

When the first or second lens unit has a refractive index distribution type lens, because the interval between the principal points of the first and second units can be decreased, also when such lens is used in the first unit, because the thickness of the first unit can be decreased, the maximum diameter necessary to admit of oblique beams can be reduced, and the outer diameter of the lens mounting or the filter for use therewith can be reduced.

On the other hand, because the aberrations of each lens unit can be improved in itself, it is made possible to achieve realization of a zoom lens having an improved stability of aberration correction throughout the zooming range. Also, because there is no need to use a compound eyes like optical system, high grade imagery can be preserved.

Because the Petzval sum is small, the power of each lens unit can be strengthened, thereby shortening of the total length is facilitated. Because the Petzval sum does not increase largely, there is no need to introduce strong surface curvatures for correction of the curvature of field, or to employ a very unbalanced power arrangement. Thus, higher order aberrations are hardly produced.

Because the total number of constituent lens elements of the complete zoom lens can be largely decreased, a remarkable improvement of ghost, which was heretofore impossible to remove, can be achieved. Further, because the light loss due to the surface reflection and internal absorption is small, the F-number can be made faster. Because the number of constituent lens elements is decreased, the number of exposed lens surfaces decreases and, therefore, the number of multi-layer anti-reflection coatings decreases. For this reason alone, the price of the complete objective can be considerably lowered. (The transmittances of the conventional zoom lenses are generally below 90%, and, as the number of constituent elements increases, it rapidly drops below 80%).

Also, because the number of constituent elements of each lens unit decreases, the production cost can be reduced, and the assembling and adjusting operations become easy operations.

Even in the field of ultra small size optical instruments, such as sub-miniature cameras and gastroscopes, there has been a demand for incorporation of zoom lenses, but this has been thought impossible since the total number of constituent lens elements is very large, and each element is very small in size, and therefore, since no manufacturing techniques amenable thereto have been available. If the refractive index distributive lens is used, however, since any lens unit can be formed by not more than two elements, the required production technique will be so simple as to realize the application of the zoom lens to the ultrasmall size optical instruments.

What is claimed is:

1. A varifocal objective comprising a plurality of lens units and a lens unit variable in its front and rear side spacing for variation of the focal length, whereby
said lens unit has at least one refractive index distribution type lens having only one optical axis common to other lenses.

2. A varifocal objective according to claim 1, wherein
said plurality of lens units include a first lens unit of positive refractive power, a second lens unit of negative refractive power and a third lens unit, the separation between said first and said second lens units and the separation between said second and said third lens units being varied at the same time to effect zooming.

3. A varifocal objective according to claim 1, wherein
of said plurality of lens units, a first lens unit counting from front has a positive refractive power and a second lens unit has a negative refractive power, and
said first lens unit includes at least one refractive index distribution type lens.

4. A varifocal objective according to claim 3, wherein said refractive index distribution type lens has a radial type refractive index distribution such that the refractive index gradually decreases as the height from the optical axis increases.

5. A varifocal objective according to claim 4, wherein
said refractive index distribution type lens has a weaker gradient of refractive index for short wavelengths in the paraxial region than that for long wavelengths.

6. A varifocal objective according to claim 1, wherein
of said plurality of lens units, a first lens unit counting from front has a positive refractive power, and a second lens unit has a negative refractive power, whereby
said second lens unit includes at least one refractive index distribution type lens.

7. A varifocal objective according to claim 6, satisfying the following condition:

$$\phi \cdot N_1 < 0$$

where $\phi$ is the refractive power of said refractive index distribution type lens, and the refractive index distribution is expressed by $N_i(h) = N_0 + N_1 h^2 + N_2 h^4 + \ldots$.

8. A varifocal objective according to claim 1, wherein
of said plurality of lens units, a first lens unit has a positive refractive power, a second lens unit has a negative refractive power, and a third lens unit has a positive refractive power, the air separation between said first and said second lens units being longer in the telephoto end than in the wide angle end, and the air separation between said second and said third lens units being shorter, and said third lens unit including at least one refractive index distribution type lens.

9. A varifocal objective according to claim 8, wherein the overall focal length of said first, said second and said third lens units is always positive over the entire zooming range.

10. A varifocal objective according to claim 1, wherein
of said plurality of lens units, a rearmost lens unit includes at least one refractive index distribution type lens.

11. A varifocal objective according to 10, wherein
said rearmost lens unit is stationary during zooming.

12. A varifocal objective according to claim 11, wherein
said rearmost stationary lens unit includes, from front to rear, a positive lens part and a negative lens part with a longest air separation therebetween, said negative lens part including at least one refractive index distribution type lens in which the refractive index increases as the height from the optical axis increases.

13. A varifocal objective according to claim 11, wherein
said rearmost stationary lens unit is a substantially telecentric optical system, and has a positive lens part in the rearmost position thereof, of which the refractive index distribution is such that the refractive index decreases as the height from the optical axis increases.

14. A varifocal objective according to claim 7, wherein said reflective index distribution type lens is a negative lens.

15. A varifocal objective according to claim 1, wherein said refractive index distribution type lens is of an axial type.

16. A varifocal objective according to claim 15, wherein said refractive index type lens has a maximum refractive index value at an intermediate point between its object-side surface and its image-side surface.

17. A varifocal objective according to claim 1, wherein said refractive index distribution type lens is of a radial type.

18. A varifocal objective according to claim 17, wherein said refractive index distribution type lens has a positive power transit.

19. A varifocal objective according to claim 17, wherein said refractive index distribution type lens has a negative power-transit.

20. A varifocal objective having an optical axis, and comprising a plurality of movable lens units which move along the optical axis for varying the focal length, said movable lens units including a refractive index distribution type lens having only one optical axis common to said optical axis.

21. A varifocal objective according to claim 20, wherein said refractive index distribution type lens compensates the Petzval sum of the whole lens system by a decrease in the Petzval sum caused by the refractive behavior of the light beam due to the refractive index distribution in the lens.

22. A varifocal objective according to claim 20, wherein said refractive index distribution type lens compensates the spherical aberration of the whole lens system by a decrease in the Petzval sum caused by the refraction behavior of the light beam due to the refraction index distribution in the lens.

23. A varifocal objective having an optical axis and having a plurality of lens units including a movable lens unit which moves along the optical axis for varying the focal length, said movable lens unit including at least one refractive index distribution type lens having only one optical axis common to said optical axis.

24. A varifocal objective according to claim 23, wherein said refractive index distribution type lens compensates the Petzval sum of the whole lens system by a decrease in the Petzval sum caused by the refractive behavior of the light beam due to the refractive index distribution in the lens.

25. A varifocal objective according to claim 23, wherein said refractive index distribution type lens compensates the spherical aberration of the whole lens system by a decrease in the Petzval sum caused by the refraction behavior of the light beam due to the refraction index distribution in the lens.

26. A varifocal objective according to claim 23, wherein said plurality of lens units including a first lens unit of positive refractive power, a second lens unit of negative refractive power and a third lens unit, the separation between said second and said third units being varied by the same time to effect zooming.

27. A varifocal objective according to claim 23, wherein of said plurality of lens units, a first lens unit counting from front has as positive refractive power and a second lens unit has a negative refractive power, and said first lens unit includes at least one refractive index distribution type lens.

28. A varifocal objective having an optical axis, comprising:
a lens unit stationary relative to said optical axis and a front-most lens unit movable along said optical axis, said front-most lens unit including at least one refractive index distribution type lens having only one optical axis common to said optical axis.

29. A varifocal objective according to claim 28, wherein said refractive index distribution type lens compensates the Petzval sum of the whole lens system by a decrease in the Petzval sum caused by the refractive behavior of the light beam due to the refractive index distribution and the lens.

30. A varifocal objective according to claim 28, wherein said refractive index distribution type lens compensates the spherical aberration of the whole lens system by a decrease in the Petzval sum caused by the refraction behavior of the light beam due to the refraction index distribution in the lens.

31. A varifocal objective according to claim 30, wherein said refractive index distribution type lens has a maximum refractive index value at a position of one of its object-side surface and image-side surface.

* * * * *